US005920356A

United States Patent [19]

Gupta et al.

[11] Patent Number: 5,920,356
[45] Date of Patent: Jul. 6, 1999

[54] CODING PARAMETER ADAPTIVE TRANSFORM ARTIFACT REDUCTION PROCESS

[75] Inventors: Smita Gupta, Sunnyvale; Yi Tong Tse, San Jose, both of Calif.

[73] Assignee: Compressions Labs, Inc., San Jose, Calif.

[21] Appl. No.: 08/659,849

[22] Filed: Jun. 6, 1996

Related U.S. Application Data

[63] Continuation-in-part of application No. 08/486,279, Jun. 6, 1995.

[51] Int. Cl.[6] .................................................. H04N 5/21
[52] U.S. Cl. .......................... 348/606; 348/607; 382/269
[58] Field of Search ................................... 348/606, 625, 348/607, 420, 384, 390, 699, 720; 382/268, 269, 199; 358/464; H04N 7/13, 7/133, 7/137, 5/21

[56] References Cited

U.S. PATENT DOCUMENTS

| | | | |
|---|---|---|---|
| 5,359,676 | 10/1994 | Fan ............................................. | 382/56 |
| 5,367,629 | 11/1994 | Chu et al. ................................. | 395/162 |
| 5,384,849 | 1/1995 | Jeong ........................................ | 380/49 |
| 5,473,384 | 12/1995 | Jayant et al. ............................. | 348/470 |
| 5,512,956 | 4/1996 | Yan .......................................... | 348/606 |
| 5,555,028 | 9/1996 | Kim ......................................... | 348/607 |
| 5,696,851 | 12/1997 | Rao ......................................... | 382/266 |

FOREIGN PATENT DOCUMENTS 0 659 019 6/1995 European Pat. Off. .

OTHER PUBLICATIONS

Liu et al: "Adaptive Post–Processing Algorithms for Low Bit Rate Video Signal", Apr. 19 1994, ICASSP–94, IEEE, New York XP000533748.

Okada, et al.: "An Adaptive Image Quality Improvement Method for DCT Coding Schemes" Mar. 17 1993, PCS'93 1993 Picture Coding Symposium Proceedings, Swiss Federal Institute of Technology, Lausanne (CH) XP000346472.

*Primary Examiner*—Chris Grant
*Attorney, Agent, or Firm*—Skjerven, Morrill, MacPherson, Franklin & Friel LLP

[57] ABSTRACT

A post-processor for a decoded video sequence includes a digital noise reduction unit and an artifact reduction unit which significantly reduce blocking artifacts and mosquito noise in a video image. The post-processor uses both temporal and edge characteristics of the video image to enhance the displayed image. A coding parameter from a decoder is used in a coding parameter adaptive filter unit within an artifact unit to further enhance the perceived quality of the displayed image. The coding parameter for a particular macroblock is selected using a characteristic of that macroblock. The post-processor operates on a current frame of pixel data using information from the immediately preceding post-processed frame that is stored in a frame memory of the post-processor. The post-processor uses artifact reduction only on portions of the image that are not part of an edge, and are not part of a texture or fine detail area. Since artifact reduction is not utilized on these areas, the post-processed image is not softened in regions where it is easily noticed by the human eye.

40 Claims, 24 Drawing Sheets

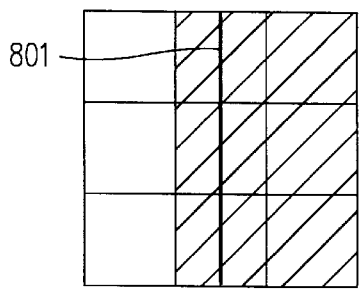
FIG. 7
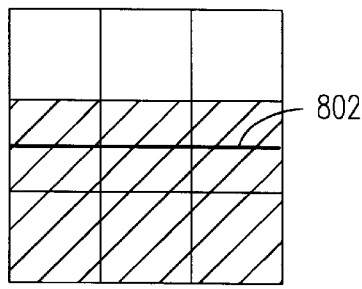
FIG. 8A
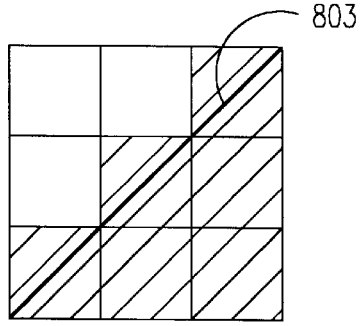
FIG. 8B
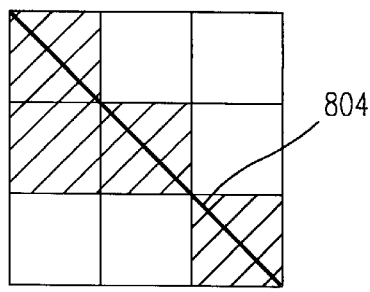
FIG. 8C
FIG. 8D

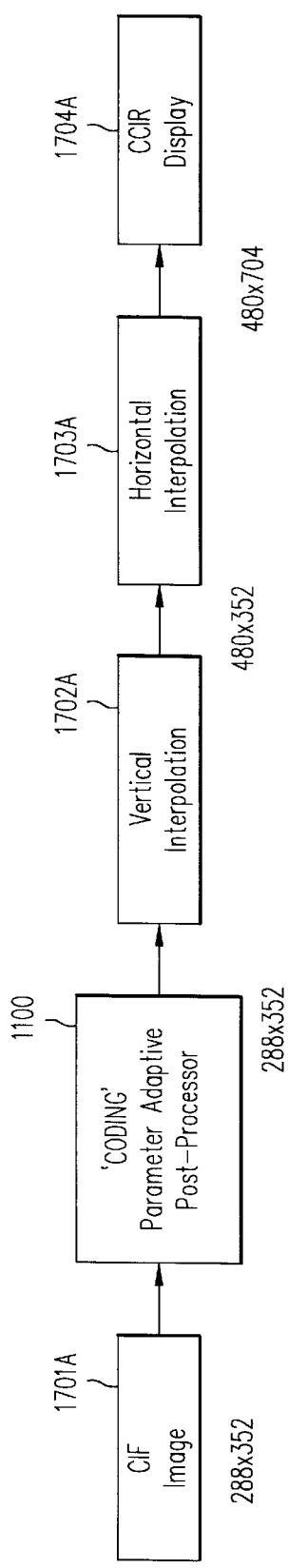
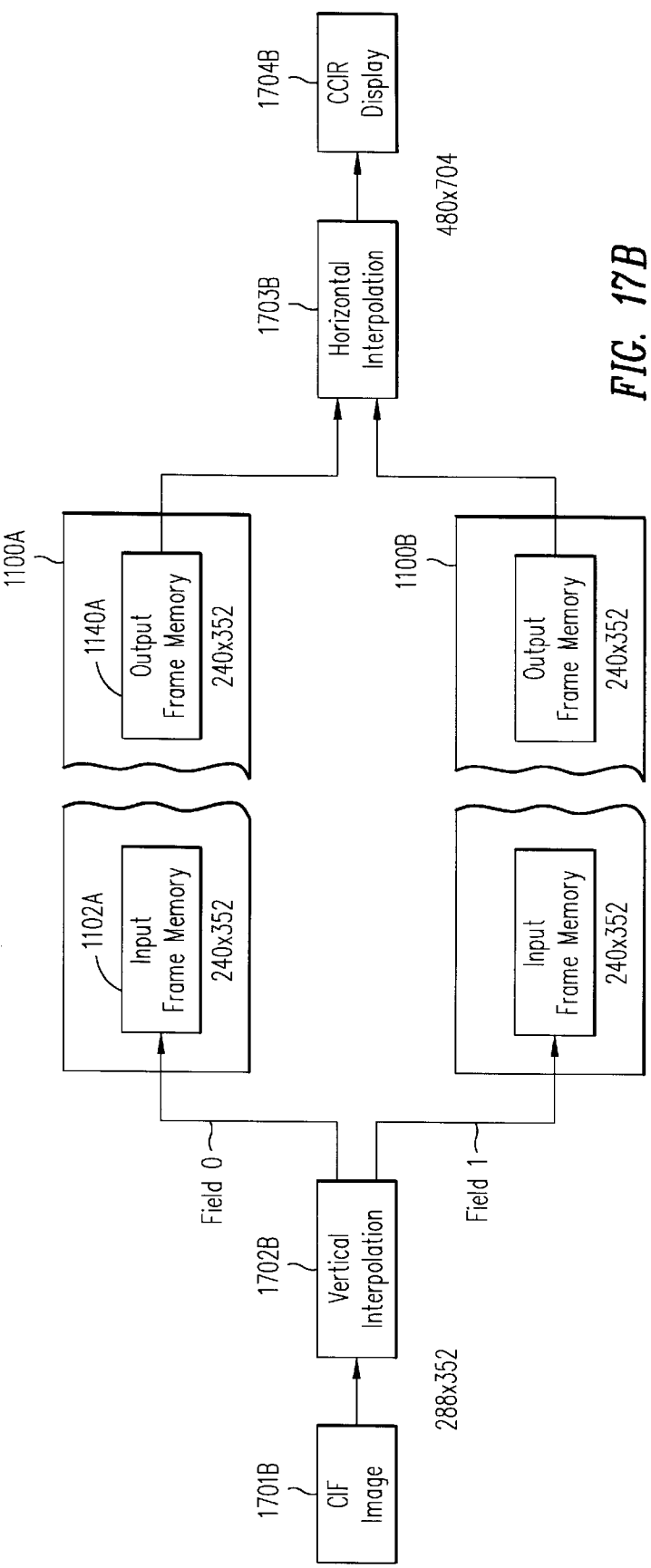
FIG. 17A
FIG. 17B

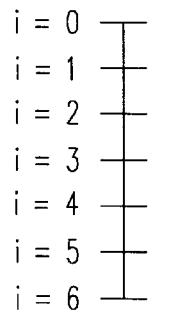
CIF Image
FIG. 18A
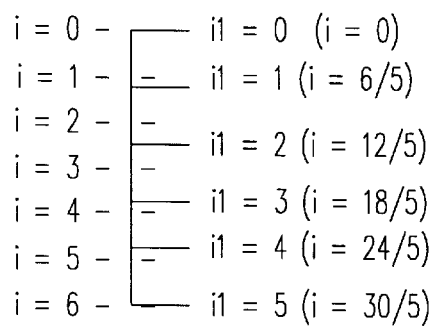
Field 0
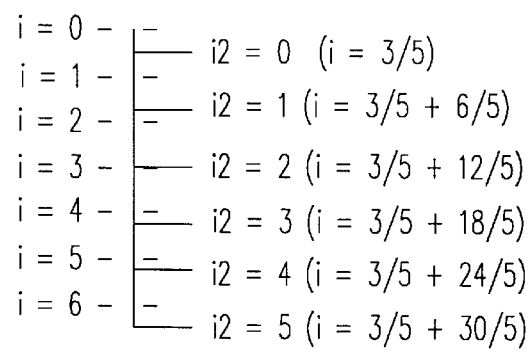
Field 1
CCIR Image
FIG. 18B  FIG. 18C

CODING PARAMETER ADAPTIVE TRANSFORM ARTIFACT REDUCTION PROCESS

CROSS REFERENCE TO RELATED APPLICATION

This application is a continuation-in-part of copending and commonly assigned U.S. patent application Ser. No. 08/486,279, entitled "Transform Reduction Process" of S. Gupta and Y. T. Tse filed on Jun. 6, 1995.

FIELD OF THE INVENTION

This invention relates generally to post processing of a decoded digital image and in particular to post-processing that significantly reduces blocking artifacts and mosquito noise without compromising the overall perceived quality of the image.

DESCRIPTION OF RELATED ART

Low bit rate video encoding introduces visually objectionable quantization artifacts in reconstructed images. The perceived quality of reconstructed images can be improved by post-processing of the decoded data. In a video communication system 100 without post-processing, a video image signal 101 drives a video encoder 102. Video encoder 102 typically encodes a frame in video signal by processing blocks of pixels within the frame. Video encoder 102 typically divides each frame into non-overlapping blocks of data and then transforms these blocks of data. In most applications, a discrete cosine transform is used. The transformed data is quantized, and the quantized data is driven onto a communication channel 103.

Decoder 104 receives the quantized data from communication channel 103 and performs operations that are the inverse of those performed by encoder 102 to reconstruct a video image that represents original video image signal 101 for display on display unit 106. In particular, an inverse discrete cosine transform is used if encoder 102 employed a discrete cosine transform.

Discrete cosine transformation based compression, especially at low and moderate bit rates, results in two distinct type of artifacts in the reconstructed video image. A first type of artifacts is referred to as mosquito noise that is ringing around sharp edges in the video image that results from attenuation of high frequency transform coefficients. These artifacts show up as high frequency noise patterns around the edges of the decoded images.

A second type of artifacts is referred to as blocking. Blocking is visible tiling in a smooth area of the reconstructed video image since smooth transitions are replaced by abrupt changes introduced by the quantization. The size of tiles is the same as the block size used in the transform coding, typically eight-by-eight pixels.

Since both of the above artifacts are high frequency in nature, an intuitive way to reduce the artifacts is by low pass filtering the decoded image with a space-invariant filter in a post-processor 205 (FIG. 2) prior to providing the reconstructed video signal to display unit 106. Such an approach often referred to as "spatially invariant filtering" has the undesirable side-effect of blurring details such as sharp edges. Blurring severely degrades the overall perceived quality of the image.

Clearly, a more sophisticated approach is needed to clean up the artifacts while preserving the sharpness in the decoded image. Spatially-variant filtering has been previously utilized in post-processing to address the shortcomings of spatially-invariant filtering. See, for example, "Nonlinear space-variant postprocessing of block coded images," by Ramamurthi and Gersho in *IEEE transactions on Acoustics, Speech, Signal Processing,* vol. ASSP-34, pages 1258–1264, October 1986, and "Contour based Post Processing of Coded Images" by Y. S. Ho and Allen Gersho in *SPIE Vol. 1119 Visual Communicatons and Image Processing IV,* November 1989, pages 1440–1449 and "Edge Based Post Processing" by William E. Lynch, Ph.D. thesis, Dept. of Electrical Engineering, Princeton University, 1993, pp. 51–76. However, such filtering processes require sophisticated processors and have significant memory requirements. The complexity of this approach severely limits the applications for which spatially-variant filtering is practical. In particular, these solutions are not well-suited for either real-time applications or moderately priced systems. Additionally, these post-processors are for still images and do not use temporal characteristics. These post-processors also do not use coding parameters to clean up the artifacts.

Nevertheless, post-processing is desirable. Since post-processing is performed on the decoded image, no modifications are made to the encoded bit-stream transmitted over communication channel 103. Therefore a video receiver with post-processor 205 can provide better performance than decoder 104 without a post-processor (shown in FIG. 1) while remaining compatible with existing encoders. Post-processing can be applied to any system including those which are standard compliant to gain a competitive advantage over other nominally standard compliant systems. However, a post-processing method is needed that requires neither excessive processing performance nor memory storage, but provides an enhanced picture quality without blurring of edges and edge boundary regions.

SUMMARY OF THE INVENTION

According to the principles of this invention, a post-processor for a decoded video sequence includes a digital noise reduction unit and an artifact reduction unit which significantly reduce blocking artifacts and mosquito noise in a video image. Preferably, the post-processor uses both temporal and edge characteristics of the video image to enhance the displayed image. However, post-processing based only upon edge characteristics, according to the principles of this invention, represents a significant improvement over the prior art post-processors that utilized spatially invariant filtering.

The post-processor of this invention operates on a current frame of pixel data using information from the immediately preceding post-processed frame that is stored in a frame memory of the post-processor. Since the human eye can easily discern textures and fine details in stationary areas within an image sequence, the post-processor preserves textures and low-level details in these stationary areas. Only stationary areas are of concern, because motion masking is such that texture loss is not noticed in the moving areas.

Specifically, in one embodiment, the post-processor first identifies texture and fine detail areas in the decoded image, hereinafter, image. The post-processor uses artifact reduction only on portions of the image that are not part of an edge, and are not part of a texture or fine detail area. Since artifact reduction is not utilized on these areas by the post-processor, the post-processed image is not softened in regions where the softening is easily noticed by the human eye. In another embodiment, the post-processor uses information contained in the coding parameters, that are used by the decoder, to vary the extent of post-processing. Specifically, coarsely quantized areas are post-processed more heavily than finely quantized areas.

The digital noise reduction unit in the post-processor attenuates small differences between each arriving pixel and the corresponding pixel from the preceding frame in the frame memory. Preferably, the digital noise reduction is recursive.

The artifact reduction unit first identifies a pixel as one of an edge pixel and a non-edge pixel and then sets an edge flag for the pixel in an edge map if the pixel was identified as an edge pixel. Using the edge map information for a current pixel and the pixels in a window surrounding the current pixel, the artifact reduction unit classifies the current pixel as one of an edge pixel, an edge border pixel, and a shade pixel. Edge pixels are not filtered by the artifact reduction unit. Edge border pixels are filtered with a one-dimensional filter, and shade pixels are filtered with a two dimensional filter.

Controlling this spatially-variant filtering by only information in an edge map for a window about the current pixel provides a significant reduction in blocking artifacts. The combination of digital noise reduction and the spatially-variant filtering of the artifact reduction unit provides an even better reduction in blocking artifacts and mosquito noise.

Thus, according to the principles of this invention, a transform artifact reduction method for decoded video pixel data includes performing digital noise reduction on a block of pixels to obtain a digitally noise reduced block of pixels, and filtering the digitally noise reduced block of pixels using a spatially-variant filter. To generate the edge map used in this method, a pixel gradient for the pixel is compared with a threshold. The edge flag for the pixel in the edge map is set upon the pixel gradient being greater than the threshold. In one embodiment, the pixel gradient is compared with an adaptive edge threshold. In another embodiment, the pixel gradient is compared with a luminance threshold. In yet another embodiment, the pixel gradient is compared with both an adaptive edge threshold and a luminance threshold. The edge flag for the pixel is set only upon the pixel gradient being greater than the adaptive edge threshold, and being greater than the luminance threshold.

To generate the luminance threshold, a background luminance measure for the pixel is generated. The luminance threshold is proportional to the background luminance measure. The background luminance measure is generated by averaging luminance components in a window about the pixel. In one embodiment, the window is a three pixels-by-three pixels window with the pixel centered in the three pixels-by-three pixels window. The luminance threshold is defined as the maximum of a minimum luminance threshold and an adjusted luminance measure.

The pixel gradient is generated from a plurality of spatial gradients for the pixel again using pixels in the window about the pixel. In one embodiment the plurality of spatial gradients comprises two spatial gradients and in another embodiment four spatial gradients. The plurality of spatial gradients is combined to obtain the pixel gradient.

The adaptive edge threshold is generated by first generating an edge estimator for a plurality of edges through the pixel to obtain a plurality of edge estimators. Again, pixels in a window about the pixel are used to generate the plurality of edge estimators. In one embodiment, the plurality of edge estimators is two pixel texture estimators and in another embodiment four pixel texture estimators. The edge estimators in the plurality are combined to obtain the adaptive edge threshold.

The plurality of edge classifications used in the filtering process includes an edge classification, and the pixel is assigned to edge classification if the edge flag for the pixel in the edge map indicates that the pixel is an edge pixel. A pixel assigned an edge classification is unchanged by the filtering process.

Another classification in the plurality of edge classifications is an edge border classification. A pixel is assigned the edge border classification if (i) the edge flag for at least one pixel in a window of pixels about the pixel is not set; (ii) the edge flag for at least three pixels in a window of pixels about the pixel are not set; and (iii) the pixel is in a line of pixels in the window and the edge flag for each pixel in the line is not set. A pixel assigned the edge border classification is filtered in a one-dimensional filter that processes the line of pixels.

Yet another classification in the plurality of edge classifications is a shade classification. A pixel is assigned the shade classification if the edge flag for the pixel and each pixel in a window of pixels about the pixel is not set. A pixel assigned the shade classification is filtered in a two-dimensional filter that processes the window of pixels.

The novel method for spatially-variant filtering to reduce transform artifacts includes:

assigning a pixel in a block of pixels one classification in a plurality of edge classifications using edge flags in an edge map for pixels in a window about the pixel wherein an edge flag for a pixel is set in the edge map to indicate the pixel is in an edge of a video image; and filtering each pixel in the block of pixels based upon the assigned classification to reduce transform artifacts in the video image.

In the filtering process pixels directly adjacent to edges are not processed with a two-dimensional filter because such a filter would include pixels from either side of an edge. However, it is desirable to clean up the area next to edges (edge border areas) to the maximum extent possible without smearing the edges since this results in clean sharp edges which are critical to the perceived quality of an image. Thus, if at least three pixels in the window including the current pixel are not edge pixels and at least one pixel in the current window is an edge pixel, the window is examined to see if all the pixels lying along one of the four possible axes through the window are not edge pixels. If an axis is made up of non-edge pixels, the pixels on that axis are processed with a one-dimensional filter. The four possible axes are checked sequentially and the one-dimensional filtering is performed along the first axis for which all the pixels are not-edge pixels. Axis examination is stopped after the first axis along which filtering is allowed is found. Although adjacent pixels are not examined for continuity of direction, axis examination always proceeds in a predetermined order. This ensures that adjacent pixels are classified similarly if ambiguity in classification exists.

This process of axis selection and resultant one-dimensional directional filtering is equivalent to finding pixels adjacent to the edges, i.e, finding edge border areas, and filtering pixels in the edge border areas along a direction parallel to the edges. This technique also provides edge enhancement.

Edge pixels and pixels directly adjacent to the edge pixels that are not selected for one-dimensional directional filtering are not post-processed. Leaving these pixels unchanged ensures that sharpness of edges in the decoded image is not degraded by post-processing. This implies that the pixels adjacent to edges which do not qualify for one-dimensional directional filtering are also treated like edges. This is equivalent to coalescing edge segments with a small discontinuity (1 to 2 pixels) into continuous contours. To this extent, the pixel classification process in the filtering process compensates for the lack of edge linking and tracing and allows the post-processor to effectively use an edge map equivalent to those generated by more complex edge detectors.

In one embodiment, only a spatially-variant filter was used in the artifact reduction unit. However, further enhancements in both picture quality and performance are obtained by taking advantage of knowledge of a coding parameter or coding parameters used in the decoder for pixel filtering in the artifact reduction unit. In this embodiment a coding parameter adaptive filter is included in the artifact reduction unit.

A coding parameter adaptive post-processor adapts to the coding parameters available at the decoder, e.g., a quantizer scale is used in a coding parameter adaptive filter. Further, a characteristic or characteristics of a macroblock are used in selecting a specific coding parameter for use in the coding parameter adaptive filter. Thus, the post-processor is adapted to each macroblock.

Since the quantizer scale coding parameter is indicative of the degree of quantization, the quantizer scale also is indicative of the amount of post-processing that is needed. In addition, to using the quantizer scale in the post-processing, the components in this embodiment of the quantizer scale adaptive post-processor have been simplified to assist in real-time implementation.

If quantization errors are minimal, coding artifacts are also minimal, and therefore the post-processing should be minimal. However if quantization errors are large, the coding artifacts are severe and the sequence should be heavily post-processed. One embodiment of the coding parameter adaptive post-processor utilizes digital noise reduction, edge detection, switched filtering and a coding parameter adjustment, e.g., a quantization parameter adjustment.

The artifact reduction unit of this invention was successful in eliminating most of the coding artifacts while preserving edges. The visual improvement in the quality of low to medium bit rate coded images was striking. Extensive simulations show that the artifact reduction unit substantially and dramatically improves the performance of low to medium bit rate video decoders by cleaning coding artifacts while preserving edge sharpness. The post-processor can be added to any video receiver between decoder and display modules to enhance the displayed image.

BRIEF DESCRIPTION OF THE DRAWINGS

FIG. 7 illustrates the representations used for the pixels in the 3×3 windows utilized in this invention.

FIGS. 8A to 8D illustrate the various edges that are detected in the 3×3 window according to the principles of this invention.

FIG. 15 is a diagram that illustrates the pixel used in generating the weighted three pixel horizontal and vertical spatial gradient factors.

FIG. 17A is a first application of the quantizer scale adaptive post-processor of this invention in conjunction with translating a frame in a first format to a frame in a second format.

FIG. 17B is a second application of the quantizer scale adaptive post-processor of this invention in conjunction with translating a frame in a first format to a frame in a second format.

FIGS. 18A to 18C are diagrams that illustrate the various scales used by the vertical interpolation unit of FIG. 17B.

DETAILED DESCRIPTION

According to the principles of this invention, a post-processor 300 overcomes the limitations of both spatially invariant filtering and spatially-variant filtering of prior art post-processors. This novel post-processor 300 cleans up mosquito noise and reduces blocking artifacts while preserving image sharpness. Preferably, post-processor 300 uses both temporal and edge characteristics of a video image to enhance the displayed image. However, post-processing based only upon edge characteristics, as described more completely later, represents a significant improvement over the prior art post-processors that utilized spatially invariant filtering.

Figure 1:
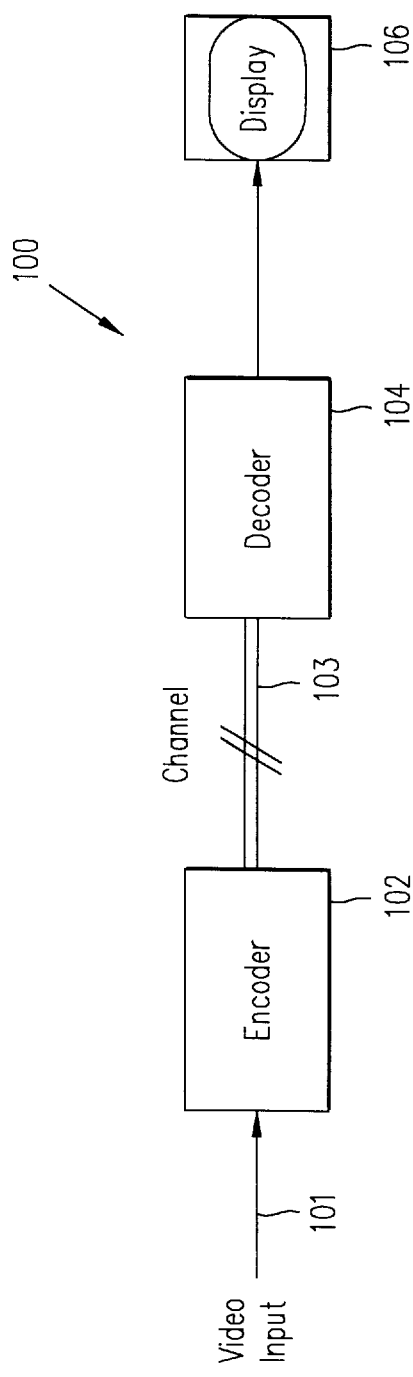
FIG. 1 is a block diagram of a prior art video communication system without post-processing.
Figure 2:
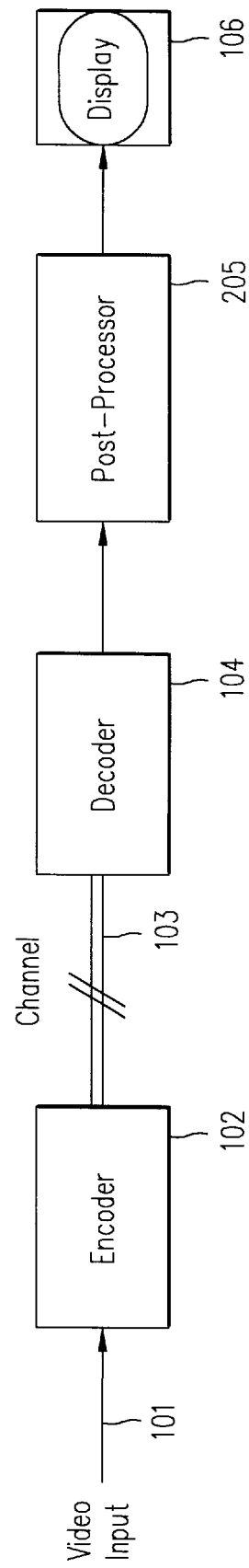
FIG. 2 is a block diagram of a prior art video communication system with post-processing.
Figure 3:
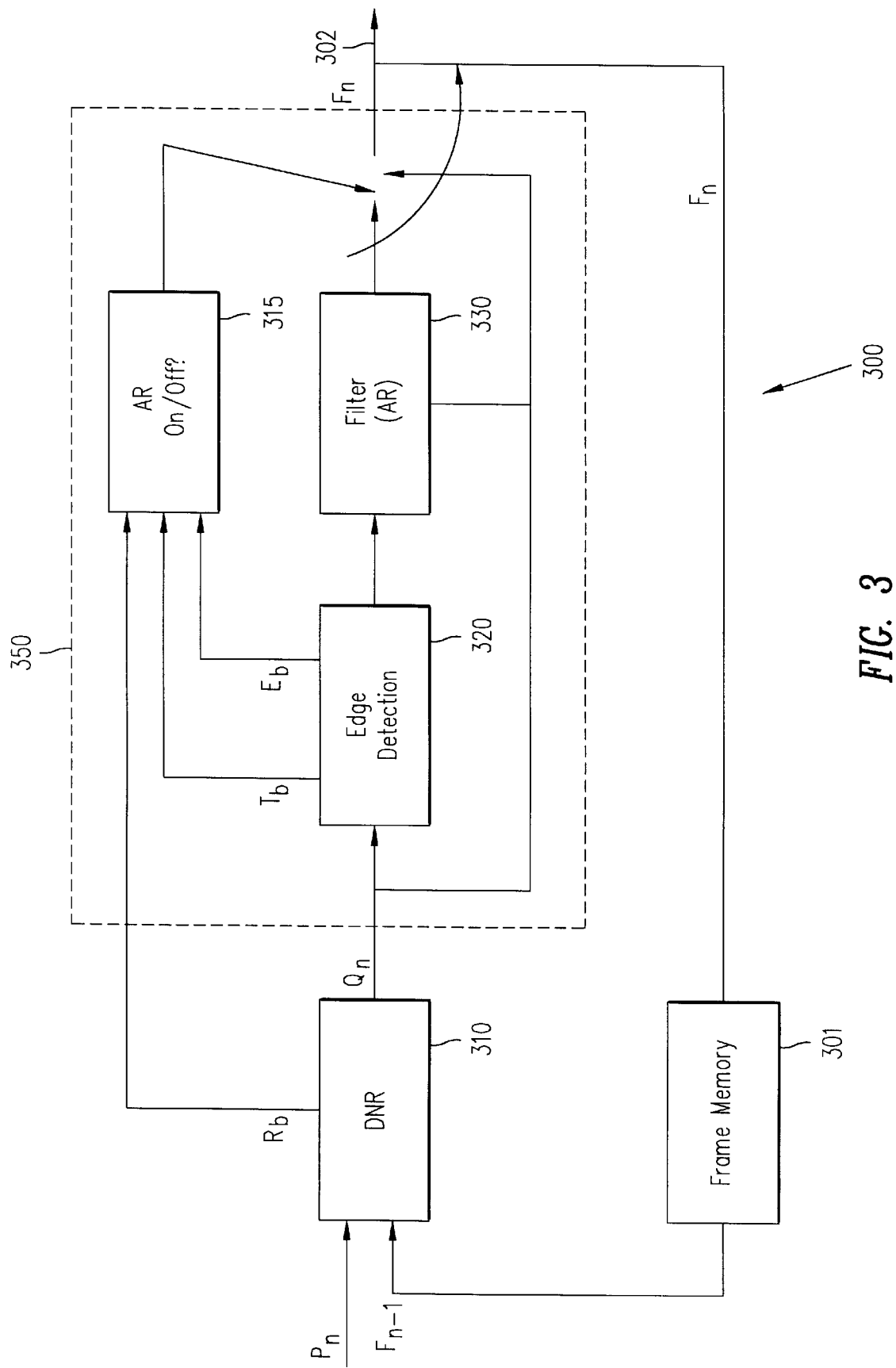
FIG. 3 is a block diagram of a novel post-processor according to the principles of this invention for use in video communication systems such as those illustrated in FIG. 1.

FIG. 3 is a block diagram of one embodiment of post-processor 300 of this invention. Post-processor 300 operates on a current frame of pixel data Pn using information from the immediately preceding post-processed frame Fn_1 that is stored in a frame memory 301. Since the human eye can easily discern textures and fine details in stationary areas within an image sequence, post-processor 300 preserves textures and low-level details in these stationary areas. Only stationary areas are of concern, because motion masking is such that texture loss is not noticed in the moving areas.

Specifically, post-processor 300, as explained more completely below, first identifies texture and fine detail areas in the decoded image, hereinafter, image. Post-processor 300 uses artifact reduction only on portions of the image that are not part of an edge. As described more completely below, post-processor 300 also uses texture information to ensure that the artifact reduction is not utilized in regions where image softening is easily noticed by the human eye.

Post-processor 300 has two major components, a digital noise reduction unit 310 and an artifact reduction unit 350. As explained more completely below, digital noise reduction unit 310 attenuates small differences between each arriving pixel and the corresponding pixel from preceding frame Fn_1 in frame memory 301.

Artifact reduction unit 350 first identifies a pixel as one of an edge pixel and a non-edge pixel and sets an edge flag for the pixel in an edge map if the pixel is identified as an edge pixel. The edge map is a plurality of edge flags where for each pixel, the edge flag is set if the pixel is on an edge and is cleared otherwise.

Using the edge map information for a current pixel and the pixels in a window surrounding the current pixel, artifact reduction unit 350 classifies the current pixel as one of an edge pixel, an edge boundary pixel, and a shade pixel. Edge pixels are not filtered by artifact reduction unit 350. Edge boundary pixels are filtered with a one-dimensional filter, and shade pixels are filtered with a two-dimensional filter.

Performing this spatially-variant filtering using only information in an edge map for a window about the current pixel provides a significant reduction in blocking artifacts and mosquito noise, as described more completely below. The combination of digital noise reduction and the spatially-variant filtering of artifact reduction unit 350 provides an even better reduction in blocking artifacts and mosquito noise.

Thus, in this embodiment, post-processor 300 first uses a digital noise reduction unit 310 to attenuate small differences between each arriving pixel and the corresponding pixel from preceding frame Fn_1 in frame memory 301. Digital noise reduction unit 310 treats small differences between pixels in corresponding frames as noise and minimizes these small differences. Larger pixel differences are treated as signal and are not attenuated by digital noise reduction unit 310.

As is known to those skilled in the art, frame Fn_1 is a two-dimensional array of pixel data in frame memory 301 and (n_1) is a temporal index that denotes the (n−1)th frame in a time sequence of frames where n can take on any value from one for the second frame in the time sequence to (N) where N is the last frame in the time sequence. Pixel Fn_1(i,j) is a pixel in the frame for the temporal time (n−1) in the with row and jth column. In this embodiment, frame Fn_1 in memory 301 has been processed by post-processor 300.

Similarly frame Pn is a two-dimensional array of decoded pixel data that is available from the decoder where again n is a temporal index that denotes the nth frame from the decoder in a time sequence of frames where n can take on any value from 1 for the first frame in the time sequence to N for the last frame in the time sequence. Pixel Pn(i,j) is a pixel in the frame for the temporal time n in the ith row and jth column.

Output pixel Qn(i,j) from digital noise reduction unit 310 for input pixel Pn(i,j) is:

$$Qn(i,j) = Fn\_1(i,j) + f(dn(i,j)) \qquad (1)$$

where f ( ) is a predetermined digital noise reduction function; and $$dn(i,j) = (Pn(i,j) - Fn\_1(i,j)) \qquad (2)$$

The value of digital noise reduction function f(dn(i,j)) is obtained from a stored look-up table, in this embodiment, based on digital pixel difference dn(i,j). Since digital noise reduction unit 310 uses frame Fn_1(i,j) from post-processor 300 rather than the previous frame Pn_1(i,j) from the decoder, the digital noise reduction is recursive.

One embodiment of a look-up table suitable for use with this invention is given in Table 1. If the absolute value of digital pixel difference dn(i,j) is less that sixteen, digital noise reduced output pixel Qn(i,j) is closer to Fn_1(i,j) than Pn(i,j). Conversely, if the absolute value of digital pixel difference dn(i,j) is greater than or equal to sixteen, digital noise reduced output pixel Qn(i,j) is the same as input pixel Pn(i,j). Thus, where the difference between current input pixel Pn(i,j) and the corresponding pixel in the previous post-processed frame, i.e, pixel Fn_1(i,j) is between −16 and +16, current input pixel Pn(i,j) is modified so that frame-to-frame pixel differences are reduced.

Table 1 gives the values of digital noise reduction function f(dn) for positive digital pixel differences dn(i,j). Corresponding values of digital noise reduction function f(dn) for negative digital pixel differences dn(i,j) are obtained by placing negative signs on digital pixel difference dn and digital noise reduction function f(dn) in Table 1.

TABLE 1

Digital Noise Reduction Look-Up Table

| dn | f(dn) |
|---|---|
| 0 | 0 |
| 1 | 0 |
| 2 | 1 |
| 3 | 1 |
| 4 | 2 |
| 5 | 2 |
| 6 | 3 |
| 7 | 3 |
| 8 | 4 |
| 9 | 5 |
| 10 | 7 |
| 11 | 8 |
| 12 | 9 |
| 13 | 11 |
| 14 | 12 |
| 15 | 14 |
| 15> | $d_n$ |

Digital noise reduction unit 310 also identifies unchanged (stationary) areas in the image in this embodiment. The unchanged areas are replenished blocks which are generated simply by copying the block at the same location from the previous frame in the decoder. Thus, in this embodiment, post-processor 300 sub-divides each frame into blocks and digital noise reduction unit 310 classifies each block individually as stationary or non-stationary, i.e., as a replenished or non-replenished block.

In this embodiment of digital noise reduction unit 310, an absolute value of digital pixel difference dn(i,j) is tested against a replenished threshold. If the absolute value of digital pixel difference dn(i,j) is less than the replenished threshold for all pixels in the block, a replenished block flag Rb is set for the block and otherwise, replenished block flag Rb is cleared. Thus, in this embodiment, replenished blocks are identified by examining pixel differences between current frame Pn from the decoder and previous frame Fn_1 from post-processor 300.

After digital noise reduction unit 310 processes a block and the block is flagged as replenished or non-replenished, the block is available for further processing. Initially, in the further processing, the noise reduced block is processed in an edge detection unit 320 within artifact reduction unit 350. As indicated above, each pixel in the noise reduced block is classified either as an edge pixel or a non-edge pixel, i.e., an edge map is generated, by edge detection unit 320. Specifically, edge detection unit 320 determines whether a pixel is on an edge in a block of frame Qn. Herein, an edge refers to a characteristic of the video image represented by the frame and not a physical edge of the frame.

As explained more completely below, in one embodiment, edge detection unit 320 first compares a pixel gradient for the current pixel with a threshold, preferably an adaptive edge threshold. An edge flag in the edge map for the current pixel is set if the pixel gradient is greater than the threshold.

In the process of generating the pixel gradient, a set of edge estimators are generated. In this embodiment, the edge estimators include pixel texture estimators T1(i,j) and T2(i,j). Specifically, as every block is processed by edge detection unit 320, pairwise pixel texture estimators T1(i,j) and T2(i,j) along a first axis and a second axis, respectively, are generated for the pixel. Here, the second axis is perpendicular to the first axis. In this embodiment, the pairwise pixel texture estimators T1(i,j) and T2(i,j) for a pixel are combined to form a texture estimator. If the texture estimator is greater than a texture pixel threshold, and the pixel is not an edge pixel, a texture pixel counter is incremented for the block, i.e, the pixel is identified as a texture pixel.

After every pixel in the block is processed in edge detection unit 320, edge detection unit 320 sets an edge block flag Eb for a block when the block has more edge pixels than an edge block threshold. The state of edge block flag Eb distinguishes blocks with edges from blocks without edges. Since blocks with edges have substantial mosquito noise, blocks with the edge block flag set are always post-processed, even though these blocks may have fine details or textures.

Also after each pixel in the block is processed in edge detection unit 320, if the value of texture pixel counter is greater than a texture block threshold, a block texture flag Tb is set for the block.

Thus, after a block is processed by edge detection unit 320, a replenish flag Rb, a block texture flag Tb, and a edge block flag Eb have either been set or left cleared, and each pixel has been identified as an edge pixel or a not edge pixel. The three flags are provided to an artifact reduction control unit 315 in artifact reduction unit 350.

If both the replenish and texture block flags are set and the edge block flag is not set, artifact reduction control unit 315 connects digital noise reduction unit 310 to frame memory 301 and to post-processor 300 output bus 302 to an output buffer. Thus, the digitally noise reduced block is copied to the output buffer and frame memory 301 without modification.

In all other cases, artifact reduction control unit 350 connects the output bus of switched filter unit 330 to frame memory 301 and to post-processor output bus 302. Thus, the block copied to frame memory 301 has had both artifact reduction, that is described more completely below, and digital noise reduction.

Switched filter unit 330 in artifact reduction unit 350 uses the edge map generated by edge detection unit 320 to determine the filtering applied to each pixel in each block. Specifically, as explained more completely below, a decision is made on the processing applied to each pixel in the block by examining the edge map of pixels within a three pixels-by-three pixels (3×3) window surrounding the current pixel. The use of edge information in a 3×3 window requires edge information for the pixels that form a one pixel border around the current window. Thus, edge detection unit 320 must provide edge information for both the current block and a one pixel boundary surrounding the current block. Consequently, overlapping blocks are used by post-processor 300, as explained more completely below.

Switched filter unit 330 performs the pixel classification described above. Specifically, switched filter unit 330 classifies a pixel as either from an edge, edge boundary, or "shade" (smooth) area. Pixels along edges are left unchanged by unit 330. Pixels along edge boundaries are directionally filtered with a one-dimensional filter. Shade pixels are low pass filtered with a two-dimensional filter by unit 330. Thus, pixels are selectively filtered depending on their classification. To prevent edge smearing, the filtering ensures that pixels from different sides of an edge are not mixed. Thus, artifact reduction unit 350 utilizes "spatially-variant switched filtering".

Figure 4:
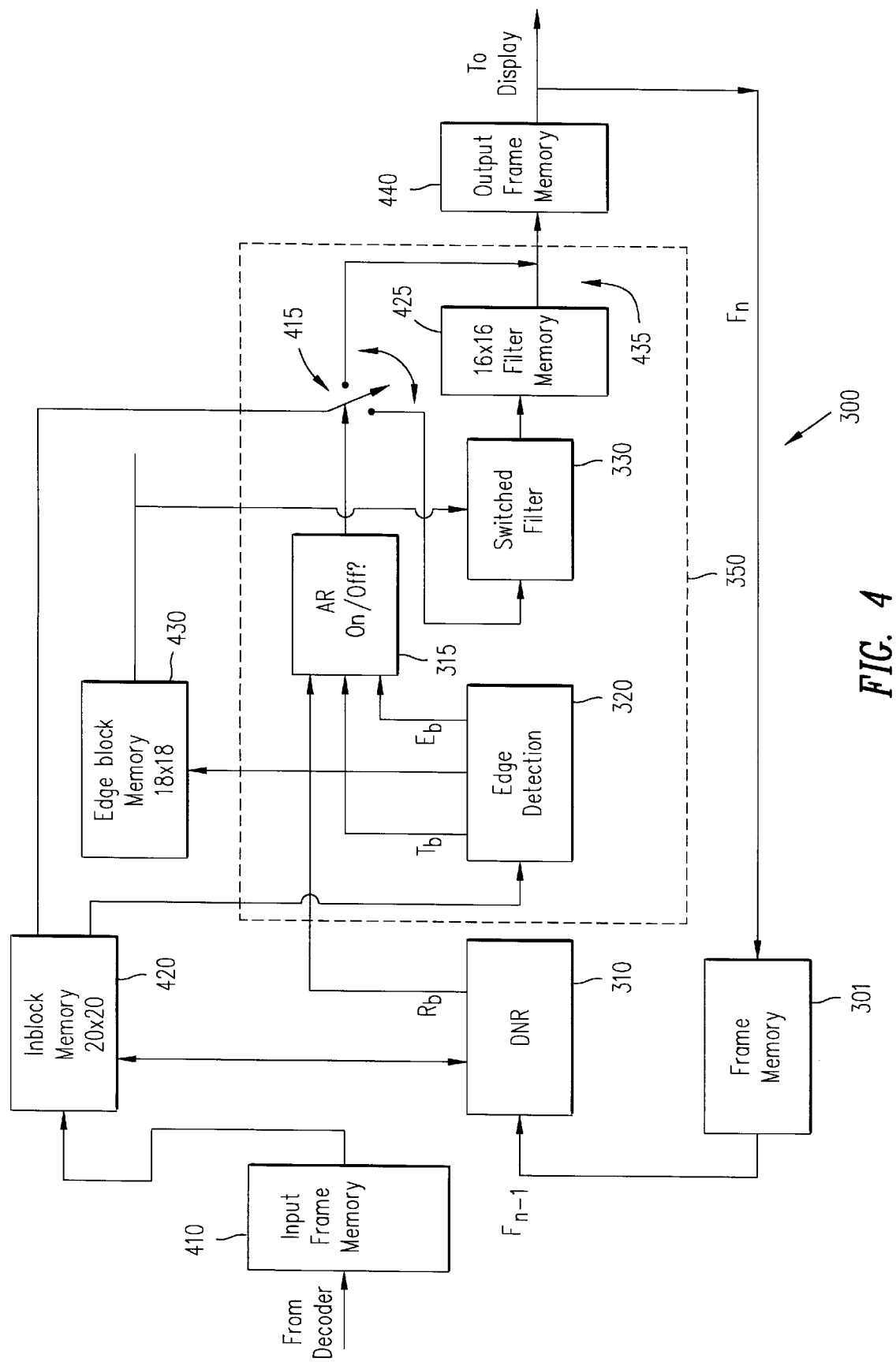
FIG. 4 is a more detailed block diagram of one embodiment of the post-processor of this invention.

FIG. 4 is a more detailed block diagram of one embodiment of post-processor 300 that combines digital noise reduction and artifact reduction with block classification. FIGS. 5A to 5D are process flow diagrams of one embodiment of the operations performed by the various units in FIG. 4.

When post-processor 300 starts to process a sequence of frames in a sequence, the zeroth frame is written to an input frame memory 410. Initialize frame memory process 501 detects that a new sequence is starting and copies the zeroth frame from input frame memory 410 to output frame memory 440 and to frame memory 301. Thus, the zeroth frame is not processed by digital noise reduction unit 310 and artifact reduction unit 350.

After the zeroth frame is processed in initialize frame memory process 501, post-processor 300 transfers to initialize frame process 502. Each subsequent frame in the sequence is processed by post-processor 300 as described below.

In this embodiment, a block size of sixteen pixels-by-sixteen pixels is used since standard codecs (H.261, MPEG) use this block size for motion compensation and replenishment decisions, and is referred to as the current block. However, those of skill in the art can select another block size to optimize the performance for a particular application. Thus, the use of a block size of sixteen pixels-by-sixteen pixels is illustrative only and is not intended to limit the invention to this particular size. Thus, for this embodiment, initialize frame process 502 divides the frame in input frame memory 410 into sixteen pixels-by-sixteen pixels blocks for subsequent processing and transfers to load block process 503.

Load block process 503 copies the current sixteen pixels-by-sixteen pixels block from input frame memory 410 to in-block memory 420. The size of in-block memory 420 is determined by the block size selected for processing and the requirements of edge detection unit 320 and switched filter unit 330.

As explained above, switched filter unit 330 requires edge information in a one pixel border about the current block and so edge information is required for an eighteen pixels-by-eighteen pixels block. As explained more completely below, edge detection unit 320 uses a three pixels-by-three pixels window about the current pixel to determine whether the current pixel is an edge pixel. Consequently, in this embodiment, a two pixel border is required about the current block and so load block process 503 copies a twenty-by-twenty pixel block within which the current block is centered from input frame memory 410 to in-block memory 420 for all blocks that are not along the frame boundary.

If the current block lies along the frame boundary, load block process 503 can not copy a full twenty-by-twenty pixel block to in-block memory 420 within which the current block is centered. Rather, a different size block is copied that contains the current block and then pixels in in-block memory 420 for which no pixel data is available are initialized either by using pixel information in the copied block, or by setting the pixel locations to a known value, for example zero. Each of the situations in which a full twenty-by-twenty pixel block can not be copied to in-block memory 420 are described below.

When the current sixteen pixels-by-sixteen pixels block is located in a corner of the frame, only an eighteen pixels-by-eighteen pixels block is copied. A twenty pixel wide-by-eighteen pixel high block is copied if the current block is not a corner block and is along either the top or bottom edge of the frame. An eighteen pixel wide-by-twenty pixel high block is copied if the current block is not a corner block and is along either side edge of the frame. In each of these cases, the copied block is appropriately located within in-block memory 420. Upon completion of load block process 503, processing transfers to frame boundary check 504.

If the current block lies along an edge of the frame, frame boundary check 504 transfers processing to replicate pixels process 505 and otherwise to initialize edge map 506. If the current block lies along a frame boundary, some of the pixel locations within in-block memory 420 contain arbitrary values. Thus, replicate pixels process 505 copies the pixels along the frame boundary into the two rows, two columns, or both of pixel locations within in-block memory 420 that are outside of the frame boundary. The corner pixel of the current block is used to fill in the pixel border in the corner regions. After the appropriate pixels are replicated, replicate pixel process 505 also transfers to initialize edge map process 506.

In initialize edge map process 506, each location in edge-block memory 430 is set to a predetermined value, i.e., edge-block memory 430 is initialized. Specifically, if the pixel in in-block memory 420 corresponding to the location in edge-block memory 430 is a replicated pixel, the location in edge-block memory 430 is set to indicate an edge pixel, i.e., an edge flag is set, and otherwise the location in edge-block memory 430 is set to indicate not an edge pixel. Also, in this embodiment, a replenishment flag Rb is set, i.e, replenishment flag Rb is set to a first predetermined state.

The size of edge-block memory is determined by the current block size and the number of pixels required to classify each pixel in switched filter 330. Since, in this embodiment, the current block size is sixteen pixels-by-sixteen pixels, and edge information in a three pixel-by-three pixel window about the current pixel is required, edge-block memory 430 is eighteen pixels-by-eighteen pixels.

Upon completion of initialize edge map 506 all the necessary initialization for processing of a block is complete, and so digital noise reduction unit 310 initiates processing of the information in in-block memory 420, in this embodiment. Of course, if digital noise reduction is either unnecessary or unwanted, digital noise reduction unit 310 could be eliminated. In this case, artifact reduction unit 350 would initiate processing of the information in in-block memory 420, as described more completely below.

Figure 5A:
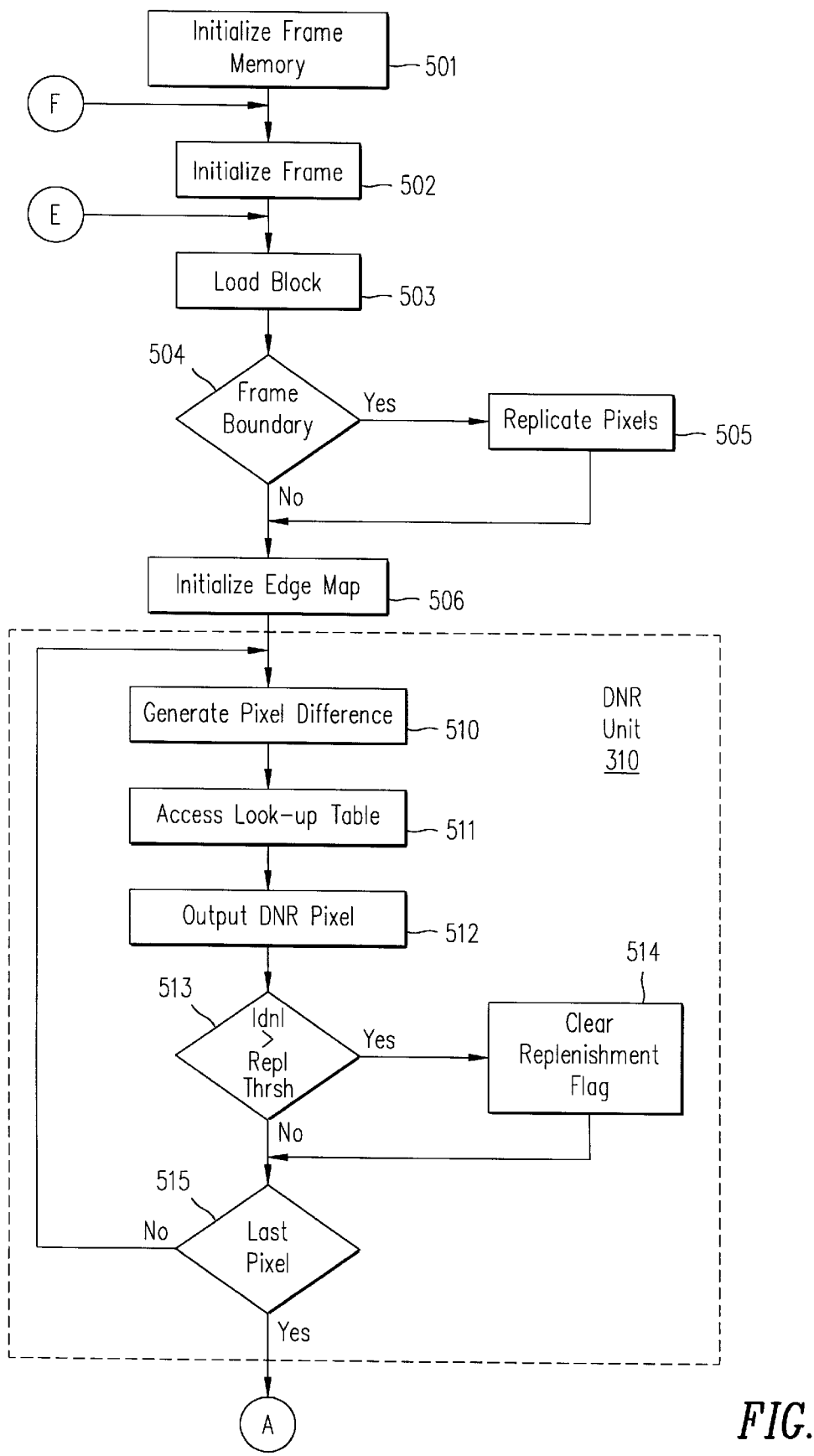
FIG. 5A is a process flow diagram of the initialization process of the post-processor of FIG. 4 and of one embodiment of the operations of the digital noise reduction unit.

One embodiment of the process performed by digital noise reduction unit 310 is illustrated in FIG. 5A. Generate pixel difference process 510 generates digital pixel difference $dn(i,j)$, as defined above, using the current pixel from in-block memory 420 and the corresponding pixel from frame memory 301. Upon generation of digital pixel difference $dn(i,j)$ processing transfers to access look-up table 511.

In this embodiment, Table 1 as defined above is stored in a memory of post-processor 300. Thus, in process 511, digital pixel difference $dn(i,j)$ is used as an index to access the appropriate value of digital noise reduction function $f(dn)$ in the look-up table memory. Upon completion of access look-up table 511, processing transfers to output DNR pixel process 512.

In output DNR pixel process 512, output pixel $Qn(i,j)$ is generated according to expression (1) above and loaded in the appropriate location of in-block memory 420. Thus, the pixel in in-block memory 420 is replaced by a noise reduced pixel and processing transfers to digital pixel difference check 513.

In digital pixel difference check 513, an absolute value of digital pixel difference $dn(i,j)$ for the current pixel is compared with a replenished threshold REPLTHRSH. If the absolute value of digital pixel difference $dn(i,j)$ is greater than replenished threshold REPLTHRSH, the current pixel is assumed to be a new pixel and processing transfers to clear replenishment flag process 514, which in turn changes the state of replenishment flag Rb to cleared, i.e., to a second state, and then transfers to last pixel check 515.

Conversely, if the absolute value of digital pixel difference dn(i,j) is less than replenished threshold REPLTHRSH, processing transfers directly from check 513 to last pixel check 515. In this embodiment, replenishment threshold REPLTHRSH is taken as five. Recall that frame memory 301 contains post-processed pixels rather than pixels from the original previous frame. Since the post-processed pixels are different from the pixels in input frame memory 410, replenishment threshold REPLTHRSH is preferably taken as a small positive threshold rather than zero. Alternatively, the replenishment processing in DNR unit 310 could be eliminated and other techniques used by post-processor 300 to identify replenished blocks.

Last pixel check 515 determines whether each pixel within the current sixteen pixels-by-sixteen pixels block in in-block memory 420 has been processed by digital noise reduction unit 310. If an additional pixel or pixels remain to be processed, processes 510 to 515 are repeated until all pixels within the current block in memory 420 are processed. When all these pixels in memory 420 have been processed, the current block of pixels has been replaced with digitally noise reduced pixels. Also, if the absolute value of the digital pixel difference between every pixel in the current block and the corresponding pixel in reference frame memory 301 is less than replenishment threshold REPLTHRSH, replenishment flag Rb is set, and otherwise replenishment flag Rb is cleared.

Figure 5B:
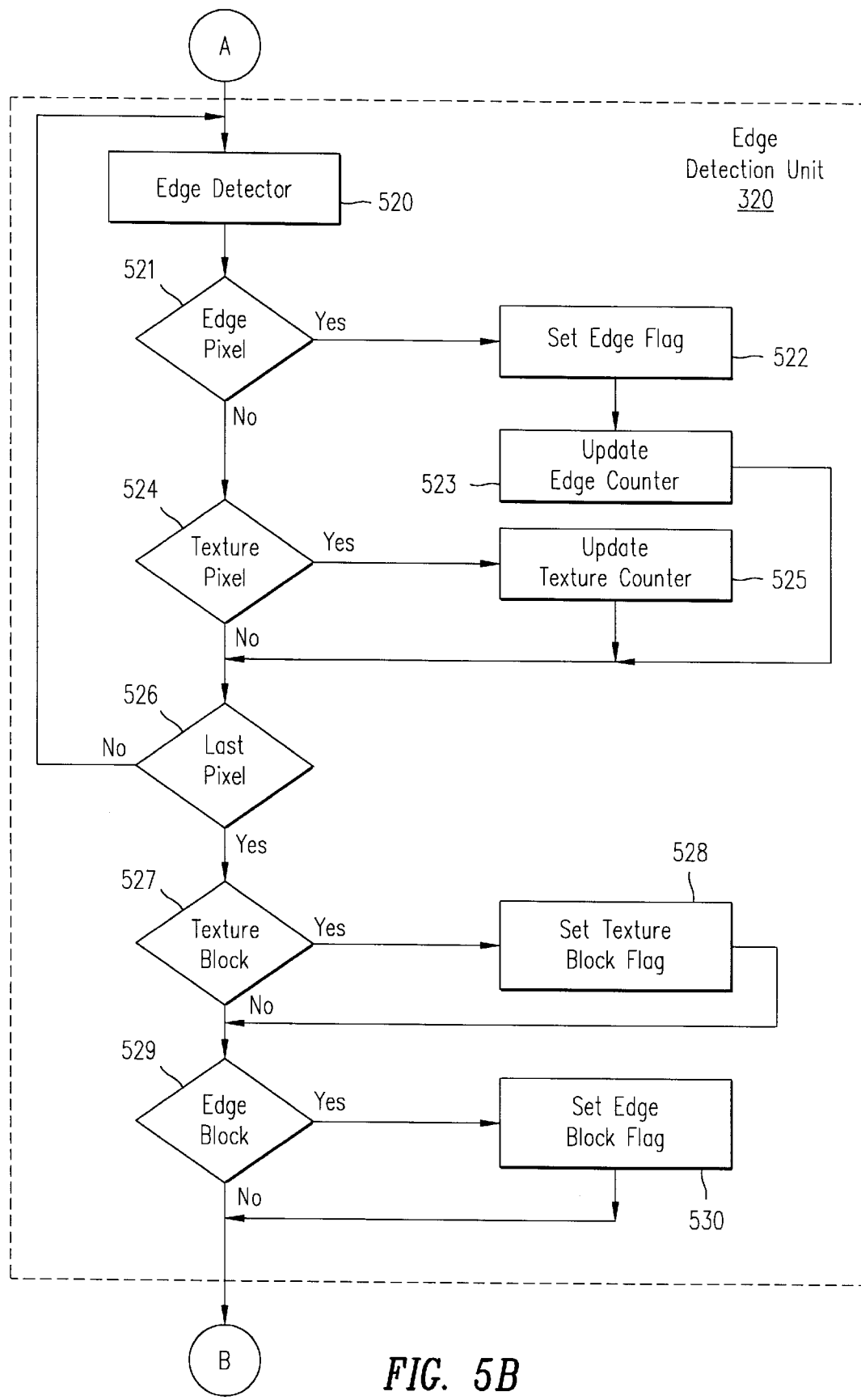
FIG. 5B is a continuation of the process flow diagram of FIG. 5A that illustrates one embodiment of the operations of the edge detection unit.

One embodiment of the process performed by edge detection unit 320 is illustrated in FIG. 5B. In this embodiment, upon entry to edge detection unit 320, an edge counter and a texture counter are initialized, and a texture block flag Tb and an edge block flag Eb are both cleared, i.e., set to a first predetermined state. Each pixel within an eighteen-by-eighteen pixel window centered within in-block memory 420 is processed by edge detection unit 320.

Initially, the current pixel within the eighteen pixels-by-eighteen pixels window is processed by edge detector process 520, as described more completely below, unless the edge flag for the pixel in edge-block memory 430 is already set. If the edge flag is already set, a pointer to the current pixel is incremented, and edge detector process 520 is initiated again. Thus, edge detector process 520 as well as processes 521 to 526 are performed only for pixels that do not have the edge flag already set, i.e, only for non-replicated pixels.

Edge detector process 520 uses a three pixels-by-three pixels window about the current pixel, i.e., a total of nine pixels, to determine whether there is an edge of the image that goes through the current pixel. A plurality of spatial gradients is generated for the current pixel. The spatial gradients in the plurality are combined to generate a pixel gradient.

The pixel gradient is compared to a threshold, that preferably includes an adaptive edge threshold, to identify the pixel as either an edge pixel or a not-edge pixel. If the pixel gradient is greater than the threshold, the pixel is identified as an edge pixel.

As explained more completely below, to generate the adaptive edge threshold, the pixel information in the window about the current pixel is used to generate an edge estimator for each of a plurality of possible edges through the current pixel. In one embodiment, the edge estimators are pairwise pixel texture estimators T1(i,j) and T2(i,j) for the current pixel along a first axis and a second axis, and the adaptive edge threshold is called an adaptive texture threshold. The edge estimators in the plurality are combined to form the adaptive edge threshold.

In this embodiment, the pixel information in the three pixels-by-three pixels window about the current pixel is also used to generate a luminance threshold. Thus, a pixel is identified as an edge pixel if the pixel gradient for the pixel is greater than both the adaptive edge threshold and the luminance threshold.

Thus, if an edge goes through the current pixel, the current pixel is identified as an edge pixel by edge detector process 520 and otherwise the current pixel is identified as a not-edge pixel. Upon completion of processing of a pixel by edge detector process 520, processing transfers to edge pixel check 521. If the current pixel is an edge pixel, check 521 transfers processing to set edge flag 522 and otherwise to texture pixel check 524.

Set edge flag 522 sets the edge flag for the current pixel in edge-block memory 430 and transfers processing to update edge counter 523. Update edge counter 523 changes the value of the edge counter, e.g., increments the edge counter, to indicate the number of edge pixels in the current block including the current pixel. Update edge counter 523 also transfers processing to last pixel check 526, that is described below.

If the current pixel is not an edge pixel, edge pixel check 524 transfers processing to texture pixel check 524. If the sum of the pairwise pixel texture estimators T1(i,j) and T2(i,j) for the current pixel is greater than a texture pixel threshold VARTHRSH, the pixel is classified as a texture pixel, and so texture pixel check transfers processing to update texture counter 525 and otherwise to last pixel check 526.

In this embodiment, texture pixel threshold VARTHRSH is a function of the location of the current pixel with the current block. Typically, an eight-by-eight pixel block size is used for transform coding. Thus, within the current block, there may be blocking artifacts along the edges of the eight-by-eight pixel block. To prevent these blocking artifacts from contributing to texture pixels, texture pixel threshold VARTHRSH is set to five for pixels not on eight-by-eight pixel block borders, and is set to eight for pixels on eight-by-eight pixel block borders.

In update texture counter 525, the value of the texture counter is changed, e.g.,incremented, to indicate the number of texture pixels in the current block including the current pixel that are not edge pixels. Update texture counter 525 transfers processing to last pixel check 526.

Last pixel check 526 determines whether each pixel in the eighteen-by-eighteen pixel block centered in in-block memory 420 has been processed by edge detection unit 320. If an additional pixel or pixels remain to be processed, processes 520 to 526 are repeated, as appropriate, until all pixels within the eighteen-by-eighteen pixel block are processed. When all pixels in the block have been processed, last pixel check 526 transfers to texture block check 527.

Upon entering texture block check 527, the edge map in edge-block memory 430 is updated for the current block and the edge and texture counters reflect the number of edge pixels and texture pixels, respectively within the current block. If the value of the texture counter is greater than a block texture pixels threshold NUMVARTHRSH, check 527 transfers processing to set block texture flag 528, which in turn sets the block texture flag Tb, and otherwise to edge block check 529. In this embodiment, block texture pixels threshold NUMVARTHRSH is taken as sixteen. Herein, block texture pixels threshold NUMVARTHRSH was determined empirically. Experiments were performed on a set of images and the threshold which provided results most consistent with human perception was selected. Upon completion of set texture block flag 528, processing transfers to edge block check 529.

In edge block check 529, edge block check 529 determines whether the value of the edge counter is greater than a block edge pixels threshold NUMEDGETHRSH. If the value of the edge counter is greater than block edge pixels threshold NUMEDGETHRSH, check 529 transfers processing to set edge block flag 530, which in turn sets edge block flag Eb, and otherwise to artifact control unit 315. In this embodiment, block edge pixel threshold NUMEDGETHRSH is taken as eight. Block edge pixel threshold NUMEDGETHRSH also was determined empirically. Experiments were performed on a set of images and the threshold which provided results most consistent with human perception was selected. Upon completion of set edge block flag 530, processing transfers to artifact reduction control unit 315.

Figure 5C:
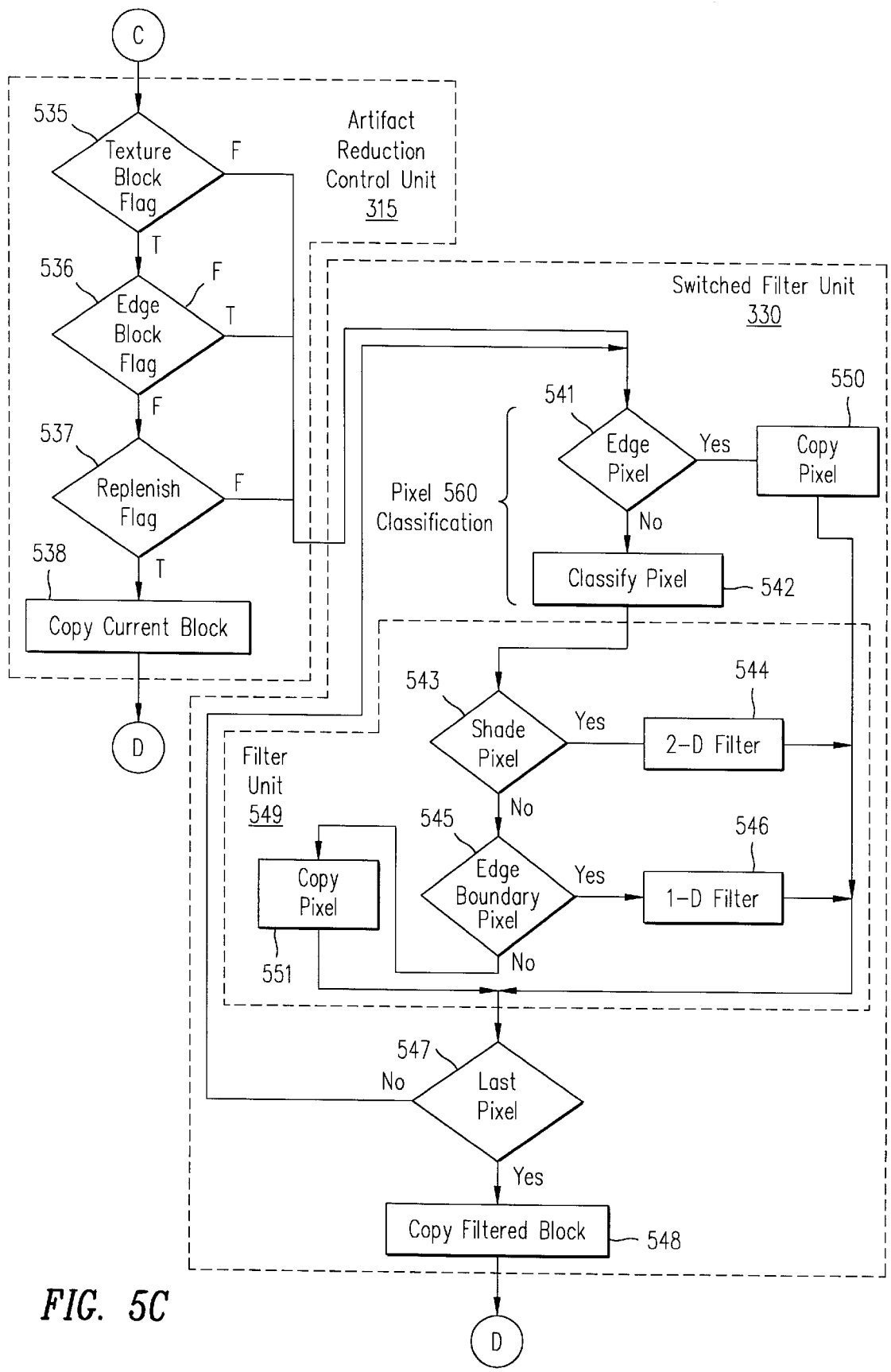
FIG. 5C is a continuation of the process flow diagram of FIGS. 5A and 5B that illustrates one embodiment of the operations of the artifact reduction control unit and the switched filter unit.

FIG. 5C illustrates one embodiment of the process performed by artifact reduction control unit 315. Initially, in texture block flag check 535, the state of texture block flag Tb is analyzed. If texture block flag Tb is true processing transfers from check 535 to edge block flag check 536, and otherwise to switched filter unit 330.

In edge block flag check 536, the state of edge block flag Eb is analyzed. If edge block flag Eb is false processing transfers from check 536 to replenishment flag check 537, and otherwise to switched filter unit 330.

In replenish flag check 537, the state of replenishment flag Rb is analyzed. If replenishment flag Rb is true, processing transfers from check 537 to copy current block 538, and otherwise to switched filter unit 330.

Figures 5D, 6:
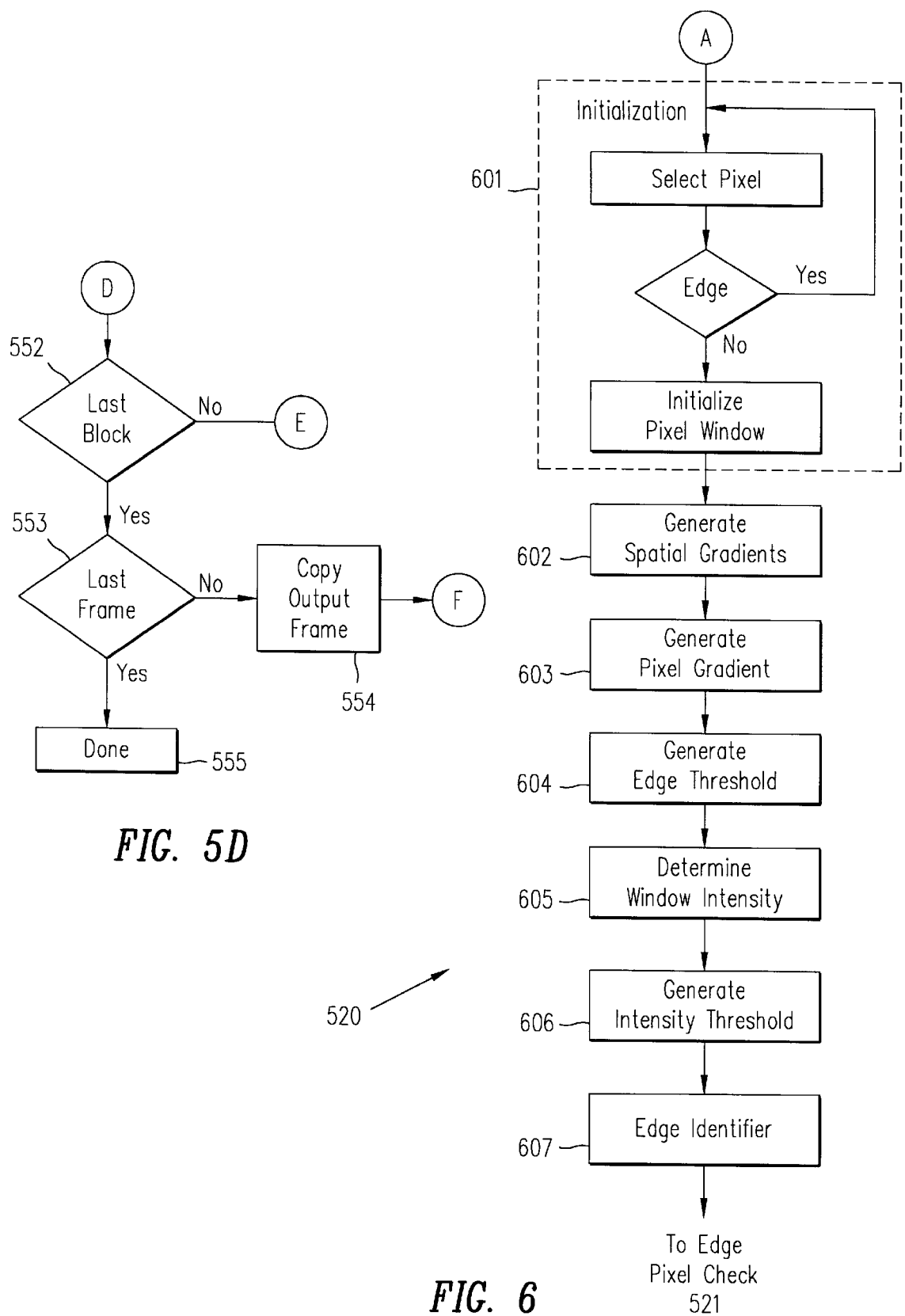
FIG. 5D is a continuation of the process flow diagram of FIGS. 5A, 5B, and 5C.
FIG. 6 is a more detailed process diagram of the operations in the edge detector of FIG. 5B.

In copy current block 538, the digitally noise reduced current sixteen-pixels by-sixteen pixels block centered in in-block memory 420 is copied to output frame memory 440. When the copy is complete, copy current block 538 transfers to last block check 552 (FIG. 5D). This is illustrated in FIG. 4 by switch element 415, which is positioned to form a closed path from in-block memory 420 to output frame memory 440.

FIG. 5C also illustrates one embodiment of the process in switched filter unit 330. Upon entry of switched filter unit 330, switch element 415 connects switched filter unit 330 to in-block memory 420. Switched filter unit 330 processes each of the pixels in the current block pixel-by-pixel.

In switched filter unit 330, each pixel is first classified as one of an edge pixel, an edge boundary pixel, and a shade pixel. Specifically, edge pixel check 541 determines whether the current pixel was identified as an edge pixel. If the current pixel is an edge pixel, no filtering is done and so check 541 transfers to copy pixel process 550. Copy pixel process 550 copies the current pixel to the appropriate location in sixteen pixels-by-sixteen pixels filter block memory 425 and transfers processing to last pixel check 547. If the current pixel is not an edge pixel, check 541 transfers to classify pixel process 542.

In classify pixel process 542, the current pixel is processed to determine whether the current pixel is one of an edge boundary pixel and a shade pixel. As explained more completely below, the edge flag information in edge-block memory 430 for a three pixels-by-three pixels window about the current pixel is used by classify pixel process 542. After the current pixel is classified, processing transfers to a filter unit 549 within switched filter unit 330.

In shade pixel check 543, if the current pixel is a shade pixel, processing transfers to two-dimensional filter 544, and otherwise to edge boundary pixel check 545. In two-dimensional filter 544, the filtered output pixel of a two-dimensional filter is written in the appropriate location of sixteen pixels-by-sixteen pixels filter block memory 425, as described more completely below. Two-dimensional filter 544, after outputting the filtered pixel, transfers processing to last pixel check 547.

In edge boundary pixel check 545, if the current pixel is an edge boundary pixel, processing transfers to one-dimensional filter 546, and otherwise to copy pixel process 551. In one-dimensional filter 546, an appropriate one-dimensional directional filter, as described more completely below, writes a filtered output pixel to the appropriate location in sixteen pixels-by-sixteen pixels filter block memory 425. One-dimensional filter 546, upon writing the filtered output pixel, transfers processing to last pixel check 547.

Copy pixel process 551 copies the current pixel to the appropriate location in sixteen pixels-by-sixteen pixels filter block memory 425 and transfers processing to last pixel check 547. Last pixel check 547 determines whether all the pixels in the current block have been processed by switched filter unit 330. If a pixel or pixels remain for processing, last pixel check 547 returns to edge pixel check 541 and processes 541 to 547 are repeated for the next pixel in the block.

When all the pixels in the current block have been processed, last pixel check 547 transfers to copy filtered block 548. Copy filtered block 548 positions switch element 435 so that digitally noise reduced and artifact reduced sixteen pixels-by-sixteen pixels block in sixteen pixels-by-sixteen pixels filter block memory 425 is copied to output frame memory 440. Upon completion of the copy, copy filtered block 548 opens switch element 435 and then transfers to last block check 552.

Upon entry to last block check 552, the post-processing of the current block is complete. Thus, last block check 552 determines whether there is an additional block in the frame in input frame memory 410 that remains to be post-processed. If there is at least one additional block in memory 410, last block check 552 transfers to load block process 503 (FIG. 5A) and the next block is processed as described above in references to FIGS. 5A to 5C. If there are no additional blocks in memory 410 that require processing, the post-processing of the current frame is complete and so processing transfers to last frame check 553.

Last frame check 553 determines whether there is an additional frame in the current sequence of frames that remains to be post-processed. If there is at least one additional frame in the sequence, last frame check 553 transfers to copy output frame process 554, which in turn copies the post-processed frame in output frame memory 440 to frame memory 301. Upon completion of the copy, process 554 transfers to initialize frame process 502 (FIG. 5A) and the next frame is processed as described above in references to FIGS. 5A to 5C. If there are no additional frames that require processing, the post-processing of the current sequence is complete and so processing transfers to done 555.

The performance of post-processor 300 on data from codecs operating at 128 kbps has shown a significant reduction in artifacts and mosquito noise. Several standard CIF test sequences were coded at 96 kbps. One hundred fifty frames from each test sequence were coded and post-processed. The decoded and post-processed frames were then interpolated to CCIR 601 resolution and displayed side-by-side for comparison.

Substantial improvements were seen in all the test sequences. The combination of digital noise reduction and artifact reduction showed that mosquitoes were distinctly reduced around moving edges compared with use of artifact reduction only. Furthermore, textured stationary areas in the background were not post-processed. Overall post-processor 300 provides a substantial improvement in the quality of coded sequences with a perceptual effect judged as equivalent to almost doubling the data rate. Improvements over artifact reduction alone are obtained by incorporating previous frame memory. Therefore, temporal information in the coded sequences is used to improve performance.

In edge detector 520, each block is processed by a set of linear or nonlinear spatial operators which measure luminance changes along different directions, i.e., a plurality of spatial gradients are generated, for each pixel. The spatial gradients in the plurality are combined to obtain a gradient. If the gradient of a pixel is sufficiently large, the pixel is classified as an edge pixel otherwise the pixel is classified as a not edge pixel.

FIG. 6 is a process diagram that illustrates one embodiment of the process that edge detector 520 uses for each pixel in a block to determine whether the pixel lies on an edge in the image contained in the current frame. Specifically, each pixel, Q(i,j), where index i identifies the row and index j identifies the column, written in in-block memory 420 is processed. In this embodiment, indices i and j range from one to eighteen because, as explained above, an edge characterization is required for a one pixel border about the current sixteen pixels-by-sixteen pixels block. The pixels in a three pixels-by-three pixels window 700 about pixel Q(i,j) are shown in FIG. 7.

In initialization process 601, pixel Q(i,j) is selected where indices i and j initially point to the first pixel, that is not a replicated pixel within the eighteen pixels-by-eighteen pixels block centered in in-block memory 420 and the three-by-three window of pixels. Specifically, in this embodiment, indices are set to address the appropriate location within in-block memory 420. Recall that for each replicated pixel, load block process 503 sets the edge flag in edge-block memory 430 and so it is not necessary for edge detector 520 to process these pixels. Upon each subsequent entry to initialization process 601, the next pixel in raster scan order is selected. Upon completion of initialization process 601, edge detector 520 transfers processing to generate spatial gradients process 602.

In this embodiment, differential operators are utilized within generate spatial gradients process 602 to obtain a plurality of spatial luminance gradients Gk(i,j), where index k represents a particular edge orientation within three pixels-by-three pixels window 700. Specifically, these differential operators perform discrete differentiation on the pixels in three pixels-by-three pixels window 700 to measure the luminance change along different directions.

Specifically, a plurality of differential operators Hk(i,j) are based on Sobel differential operators. The Sobel differential operators used are given in expression (3).

$$H1 = \begin{bmatrix} 1 & 0 & -1 \\ 2 & 0 & -2 \\ 1 & 0 & -1 \end{bmatrix} \quad H2 = \begin{bmatrix} 1 & 2 & 1 \\ 0 & 0 & 0 \\ -1 & -2 & -1 \end{bmatrix} \quad (3)$$

$$H3 = \begin{bmatrix} 2 & 1 & 0 \\ 1 & 0 & -1 \\ 0 & -1 & -2 \end{bmatrix} \quad H4 = \begin{bmatrix} 0 & 1 & 2 \\ -1 & 0 & 1 \\ -2 & -1 & 0 \end{bmatrix}$$

Operators H1(i,j) and H2(i,j) measure the magnitude of horizontal gradient, i.e., a vertical edge 801 (FIG. 8A), and the vertical gradient, i.e., a horizontal edge 802 (FIG. 8B), respectively whereas operators H3(i,j) and H4(i,j) measure the diagonal gradients, i.e., diagonal edges 803 and 804 illustrated in FIGS. 8C and 8D, respectively.

Thus, this plurality of operators measures all possible combinations of edges through three pixels-by-three pixels window 700. Hence, in this embodiment of generate spatial gradients process 602, operators Hk(i,j), where k takes on values of one to four, sometimes referred to as masks Hk(i,j), are applied to current window 700 centered on pixel Q(i,j) to generate four spatial gradients Gk(i,j) for current pixel Q(i,j). After the spatial gradients are generated, processing transfers from process 602 to generate pixel gradient process 603.

In generate pixel gradient process 603, a point wise operator combines the spatial gradients in the plurality to obtain a pixel gradient A(i,j) for pixel Q(i,j). However, in the embodiment, the magnitude of pixel gradient A(i,j) is of interest, and so either the squared sum or the absolute sum of the spatial gradients in the plurality can be used. Thus, the absolute sum of the spatial gradients in the plurality is taken as the point operator. Therefore, pixel gradient A(i,j) is:

$$A(i,j) = \tfrac{1}{16}(|G1(i,j)| + |G2(i,j)| + |G3(i,j)| + |G4(i,j)|) \quad (4)$$

where $\tfrac{1}{16}$ is used for normalization. Upon completion of generate pixel gradient process 603, processing transfers to generate texture threshold process 604.

In generate texture threshold process 604, two different processes can be used to generate the threshold that is used to determine whether the pixel is an edge pixel. The first process is to simply set the threshold to a fixed sufficiently large value. The second process utilizes an adaptive edge threshold process. In this embodiment, generate texture threshold process 604 utilizes an adaptive edge threshold process.

Specifically, the first operation in this embodiment of generate texture threshold process 604 is to generate a plurality of edge estimators that in this embodiment are pixel texture estimators Tk(i,j) where k takes on values from one to four. A pixel texture estimator is generated for each of the four possible edges directions through three pixels-by-three pixels window 700, as shown in FIGS. 8A to 8D. Each pixel texture estimator is generated by adding absolute values of pairwise differences of pixels lying on either side of an edge for the four distinct edges. The various pixels in three pixels-by-three pixels window 700 are weighted with the same weights as in the corresponding operator used to generate the spatial gradient, i.e., the weights given in expression (3). Weighting based on the Sobel operators has been widely tested and reported in the literature as providing good performance. This weighting was empirically tested and demonstrated to provide good performance.

For clarity, each of the pixel texture estimators are generated as follows. Pixel texture estimator T1(i,j), which corresponds to the vertical edge detected by Sobel operator H1, is:

$$T1(i, j) = |Q(i-1, j-1) - Q(i-1, j+1)| + $$
$$|2Q(i, j-1) - 2Q(i, j+1)| + |Q(i+1, j-1) - Q(i+1, j+1)|$$

If a vertical edge is present through pixel Q(i,j), the magnitude of spatial gradient G1(i,j) is the same as pixel texture estimator T1(i,j).

Pixel texture estimator T2(i,j), which corresponds to the horizontal edge detected by Sobel operator H2, is:

$$T2(i, j) = |Q(i-1, j-1) - Q(i+1, j-1)| +$$
$$2|Q(i-1, j) - Q(i+1, j)| + |Q(i-1, j+1) - Q(i+1, j+1)|$$

If a horizontal edge is present through pixel Q(i,j), the magnitude of spatial gradient G2(i,j) is the same as pixel texture estimator T2(i,j).

Pixel texture estimator T3(i,j), which corresponds to the forty-five degree diagonal edge detected by Sobel operator H3, is:

$$T3(i, j) = |Q(i, j-1) - Q(i+1, j)| +$$
$$2|Q(i-1, j-1) - Q(i+1, j+1)| + |Q(i-1, j) - Q(i, j+1)|$$

If a forty-five degree diagonal edge is present through pixel Q(i,j), the magnitude of spatial gradient G3(i,j) is the same as pixel texture estimator T3(i,j).

Pixel texture estimator T4(i,j), which corresponds to the one hundred and thirty-five degree diagonal edge detected by Sobel operator H4, is:

$$T4(i, j) = |Q(i-1, j) - Q(i, j-1)| +$$
$$2|Q(i-1, j+1) - Q(i+1, j-1)| + |Q(i, j+1) - Q(i+1, j)|$$

If an one hundred thirty five degree diagonal edge is present through pixel Q(i,j), the magnitude of spatial gradient G4(i, j) is the same as pixel texture estimator T4(i,j).

After each of the plurality of pixel texture estimators is generated, generate texture threshold process 604 uses the pixel texture estimators to generate an adaptive texture threshold TEXTHRS(i,j). In this embodiment, adaptive texture threshold TEXTHRS(i,j) is a fraction of the sum of pixel texture estimators T1(i,j), T2(i,j) T3(i,j), and T4(i,j). Specifically, $$TEXTHRS(i, j) = (t/16) * (T1(i, j) + T2(i, j) + T3(i, j) + T4(i, j))$$

where $1/16$ is used for normalization, and threshold adjustment factor t is determined as described below.

Transform coded images at low data rates show blocking artifacts. Since block boundaries are low contrast edges, care is taken to ensure that edge detector 520 does not classify blocking artifacts as edges. In one embodiment of edge detector 520, variable thresholding is utilized. Specifically, a larger adaptive texture threshold TEXTHRS(i,j) is used for classification of pixels along block boundaries, because the blocking artifacts result in block boundaries typically having higher spatial gradients. Hence, in this embodiment, a first threshold adjustment factor t1 is used for pixels on transform block boundaries, and a second threshold adjustment factor t2 is used for all pixels other than those on transform block boundaries. First threshold adjustment factor t1 is greater than second threshold adjustment factor t2.

The particular levels selected for first threshold adjustment factor t1 and second threshold adjustment factor t2 were selected empirically. A representative set of images is processed with various levels of these thresholds. The particular levels selected are those which provide performance consistent with observations made by human observers. The level selected for first threshold adjustment factor t1 ensures that pixels on block boundaries in smooth areas are not classified as textured whereas the level selected for second threshold adjustment factor t2 ensures that pixels in textured areas are classified as textured.

Alternatively, or additionally generate pixel gradient process 603 can be modified to mitigate the effects of artificial gradients along block boundaries. The blocking artifacts associated with block boundaries contribute primarily to gradients associated with either a horizontal edge or a vertical edge depending on whether the block boundary is horizontal or vertical. Thus, in generate pixel gradient process 603, the effect of blocking artifacts is mitigated by ignoring the artificial gradients induced by blocking artifacts in generating pixel gradient A(i,j) and adaptive texture threshold TEXTHRS(i,j).

For example, spatial gradient G1(i,j) generated by Sobel operator H1 to detect a vertical edge is discarded in generation of pixel gradient A(i,j) along the vertical block boundaries. Similarly spatial gradient G2(i,j) generated by Sobel operator H2 to detect a horizontal edge is discarded in generation of pixel gradient A(i,j) along the horizontal block boundaries. Consequently, the normalization used in pixel gradient A(i,j) and adaptive texture threshold TEXTHRS(i,j) is $1/12$. At block corners where artificial horizontal as well as vertical gradients are present, the variable adaptive texture threshold, described above, is used. Upon completion of generate texture threshold process 604, processing transfers to determine window intensity process 605.

In determine window intensity process 605, a background luma S(i,j) is estimated using the intensity of the pixels in three pixels-by-three pixels window 700 surrounding current pixel Q(i,j). The background luma is generated because the perceived contrast of an object by the human eye depends on the luminance of the background. This characteristic of the human visual systems (HVS) has been documented in Weber's law. See, for example, A. K. Jain, *Fundamentals of Digital Image Processing*, Prentice Hall, New Jersey, 1989. The difficulty of discerning edges increases with an increase in the average luminance of the background. Thus, luminance masking is utilized by edge detector 520.

In this embodiment, background luma S(i,j) is generated by summing the luminance for each pixel in the 3×3 window and dividing by nine. This weighting is used to generate background luma S(i,j) to provide a measure of the average luminance in the 3×3 window. Also, this measure can be used directly in Weber's law.

Upon generation of background luma S(i,j), processing transfers from determine window intensity process 605 to generate intensity threshold process 606. In generate intensity threshold process 606, luminance threshold B(i,j) is generated that is proportional to background luma S(i,j). In this embodiment, luminance threshold B(i,j) is defined as:

$$B(i,j) = \max(Bmin, p*S(i,j))$$

where p=luminance threshold adjustment factor; and

Bmin=minimum luminance threshold.

Minimum luminance threshold Bmin is used to eliminate spurious edges, which are areas where the luminance contrast is too low for the human eye to perceive an edge. The level of minimum luminance threshold Bmin is empirically selected to prevent such areas from qualifying as edges. Luminance threshold adjustment factor p is empirically selected such that pixels which are perceived as edges by the human eye are appropriately classified. In this embodiment, minimum luminance threshold Bmin is taken as sixteen and luminance threshold adjustment factor p is taken as 0.20.

Upon completion of generate intensity threshold process 606, processing transfers to edge identifier process 607.

In edge identifier process 607, current pixel Q(i,j) is identified as an edge pixel if pixel gradient A(i,j) exceeds both adaptive texture threshold TEXTHRS(i,j) and luminance threshold B(i,j) and otherwise as not an edge pixel. This completes the operation of edge detector 520 in this embodiment.

Each non-replicated pixel in the 18×18 block is processed by edge detector 520 as indicated in FIG. 6. However, the specific operations within a particular process of edge detector 520 can be modified to accommodate factors such as timing constraints, coding data rates, processing power, texture and significance of artifacts, for example.

Specifically, since the complexity of edge detection is an important criterion in real-time implementations, in one embodiment, the process performed by edge detector 520 was a simplified version of the process given above, that is referred to herein as a simplified edge detector 520A.

Specifically, with simplified edge detector 520A, in generate spatial gradients process 602, only Sobel operators H1 and H2 (See expression (3)) were used to generate horizontal spatial gradient G1(i,j) and vertical spatial gradients G2(i,j) in place of all four Sobel operators. The use of only the vertical and horizontal spatial gradients required corresponding changes in each of the subsequent processes.

Specifically, in generate pixel gradient process 603, pixel gradient A(i,j) is defined as:

$$A(i,j) = (1/8) * (|G1(i,j)| + |G2(i,j)|).$$

where (1/8) is used for normalization.

In generate edge threshold process 604, only pixel texture estimators T1(i,j) and T2(i,j) are generated as described above. Thus, in this simplified embodiment, adaptive texture threshold TEXTHRS(i,j) is:

$$TEXTHRS(i,j) = (t/8) * (T1(i,j) + T2(i,j))$$

where threshold adjustment factor t is taken as first threshold adjustment factor t1 and second threshold adjustment factor t2. First threshold adjustment factor t1 is used for pixels on block transform boundaries and is taken as 0.90. Second threshold adjustment factor t2 is used for all pixels other than those on block transform boundaries and is taken as 0.80. The remaining processes in edge detector 520A are the same as those described above.

When tested on sequences, this simplified edge detector generated accurate edge maps identifying areas which would be classified as edges by the human eye. Nevertheless, the above embodiment of simplified edge detector 520A is only one of many embodiments available for edge detection unit 320. Simplifications and modifications to edge detection unit 320 can be made for specific system requirements. Such simplifications could include replacement of adaptive texture threshold TEXTHRS(i,j) by a fixed threshold and elimination of luminance masking through eliminating the test with luminance threshold B(i,j).

When a block has been processed by edge detection unit 320, an edge map is stored for the current block and the one pixel boundary around the current block in edge-block memory 430. The edge map, as described above, is a plurality of edge flags where for each pixel, the edge flag is set if the pixel is on an edge and is cleared if the pixel is not on an edge. In this embodiment, switched filter unit 330 uses the edge map without further processing.

Specifically, switched filter unit 330 determines the filtering applied to each pixel by examining the edge map for pixels within a three pixels-by-three pixels window surrounding the current pixel. As explained above, a pixel is classified as either from an edge, boundary or "shade" (smooth) area. Pixels from edges are left unchanged. Pixels from edge boundaries are directionally filtered with a one-dimensional filter, and shade pixels are low pass filtered with a two-dimensional filter.

Typically, in prior art post-processing systems, edge detection units follow thresholding by edge thinning, edge tests and edge linking to obtain the edge map. These are complex operations. Pixel classification using only the edge map within a three pixels-by-three pixels window has significantly less complexity by linking and coalescing nearby disjoint edge segments for the post-processing. The results are similar to the results obtained using the more complex operations.

Figure 9:
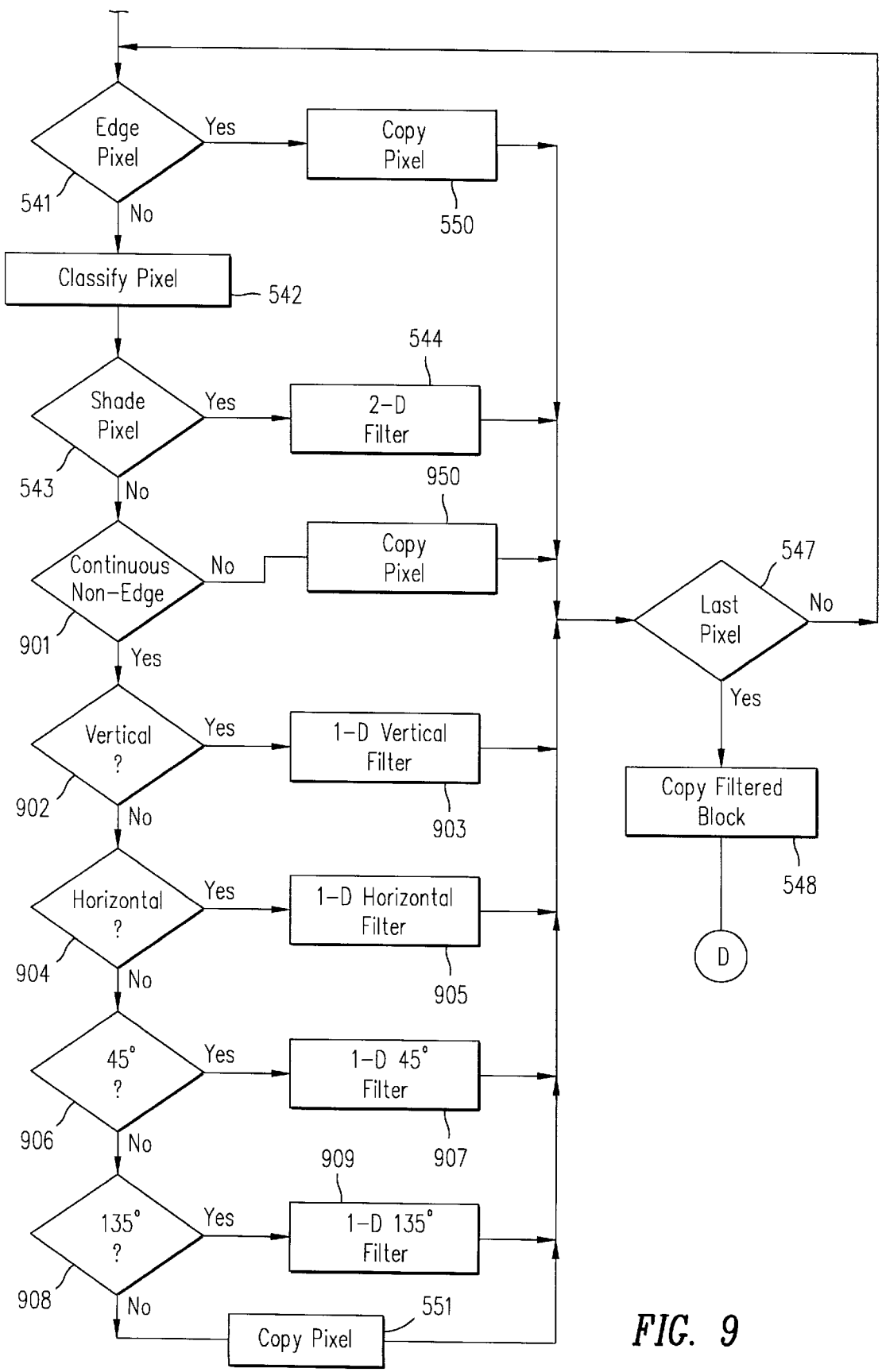
FIG. 9 is a more detailed process flow diagram of the switched filter unit of this invention.

FIG. 9 is one embodiment of a more detailed process performed by switched filter unit 330. As explained above, each pixel in the current block is individually processed in switched filter unit 330.

Initially, edge pixel check 541 determines whether the edge flag is set for the current pixel. As explained above, if the edge flag is set, the current pixel is from an edge in the image and to maintain the sharpness of the edges, edge pixels are not filtered. Thus, if the edge flag is set for the current pixel, the pixel is classified as an edge pixel, and processing transfers from edge pixel check 541 to copy pixel 550 and in turn to last pixel check 547, and otherwise to classify pixel process 542.

Classify pixel process 542 analyzes the edge map for a three pixels-by-three pixels window about the current pixel. A filter control flag is set equal to the number of pixels in the three pixels-by-three pixels window centered on the current pixel that do not have the edge flag set. In this embodiment, the filter control flag ranges from one to nine. Upon completion of classify pixel process 542, processing in switched filter unit 330 transfers to shade pixel check 543.

Shade pixel check 543 transfers processing to two-dimensional filter process 544 if the filter control flag is nine, i.e., if none of the pixels in the three pixels-by-three pixels window have the edge flag set so that, the current pixel is a shade pixel. Ensuring that all pixels in the three pixels-by-three pixels window are not edge pixels implies that all pixels processed by two-dimensional filter process 544 are on the same side of an edge and do not either span or include an edge. Therefore, edges are not smeared by two-dimensional filter process 544. If the filter control flag is less than nine, shade pixel check 543 transfers processing to continuous edge check 901, that is described more completely below.

In this embodiment, two-dimensional filter process 544 utilizes a two-dimensional low pass filter. The low pass filter is a separable three-tap low pass filter (LPF) in each direction with a mask of the form:

$$\begin{bmatrix} \frac{1}{16} & \frac{1}{8} & \frac{1}{16} \\ \frac{1}{8} & \frac{1}{4} & \frac{1}{8} \\ \frac{1}{16} & \frac{1}{8} & \frac{1}{16} \end{bmatrix}$$

Two-dimensional filter process 544 reduces the mosquito noise and the blocking artifacts in image areas at a distance greater than or equal to one pixel horizontally and vertically from edge pixels. The filtered output pixel from the two-dimensional filter is written to the appropriate location in sixteen pixels-by-sixteen pixels filter block memory 425, as explained above, and processing transfers to last pixel check 547.

Recall that if the filter control flag is less than nine, shade pixel check 543 transfers processing to continuous non-edge check 901. Continuous non-edge check 901 determines whether enough non-edge pixels are present in the three pixels-by-three pixels window including the current pixel to perform further directional-filtering without filtering an edge pixel. Specifically, if at least three of the pixels are non-edge pixels, a continuous line of non-edge pixels may exist through the window. However, if less than three of the pixels in the current window are not-edge pixels, any one-dimensional filter along any possible axis through the current window would include an edge pixel. Consequently, if the filter control flag is less than three, continuous non-edge check 901 transfers processing to copy pixel process 950 and otherwise to vertical line of non-edge pixels check 902. Copy pixel process 950 copies the pixel into the proper location in filter block memory 425 and transfers processing to last pixel check 547.

Figure 10A:
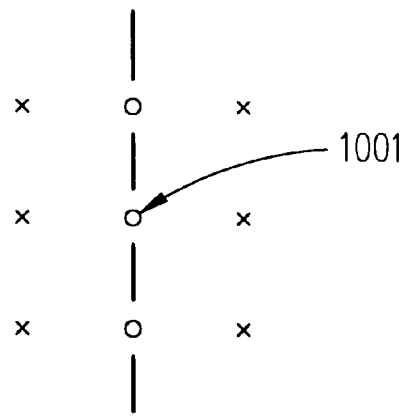
FIGS. 10A to 10D illustrates the various conditions that are checked in the switched filter unit of this invention.

Vertical line of non-edge pixels check 902 determines whether the current window includes a vertical line of non-edge pixels through the current pixel. Specifically, FIG. 10A illustrates the current window configuration in the edge pixel map that is detected by vertical line of non-edge pixels check 902. If the pixel immediately above current pixel 1001, the pixel immediately below current pixel 1001 are non-edge pixels, vertical line of non-edge pixels check 902 is true and otherwise false.

In FIGS. 10A to 10D, a non-edge pixel is represented by a zero to indicate that the edge flag is cleared for that pixel. Pixels that are not on the vertical axis through current pixel are represented by an "x", because the state of the edge flag for these pixels is a don't care state. If vertical line of non-edge pixels check 902 is true, processing transfers to one-dimensional vertical filter process 903 and otherwise to horizontal line of non-edge pixels check 904.

In one-dimensional vertical filter process 903, the vertical line of non-edge pixels in the current window is filtered by a three-tap filter. In this embodiment, the three pixels are processed by a filter of the form [¼, ½, ¼] and the filtered output pixel from the one-dimensional filter is written to the appropriate location in sixteen pixels-by-sixteen pixels filter block memory 425, as explained above. Upon completion of the filtering process, one-dimensional vertical filter process transfers 903 to last pixel check 547.

Figure 10B:
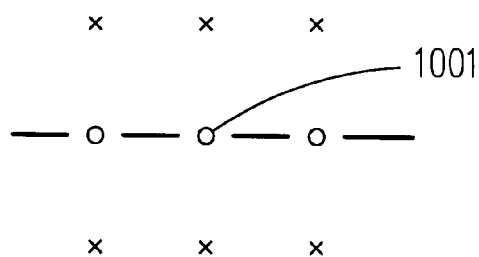

Horizontal line of non-edge pixels check 904 determines whether the current window includes a horizontal line of non-edge pixels through the current pixel. Specifically, FIG. 10B illustrates the current window configuration in the edge pixel map that is detected by horizontal line of non-edge pixels check 904. If the pixel immediately to the left of current pixel 1001, the pixel immediately to the right of current pixel 1001 are non-edge pixels, horizontal line of non-edge pixels check is true and otherwise false. If horizontal line of non-edge pixels check 904 is true, processing transfers to one-dimensional horizontal filter process 905 and otherwise to forty-five degree line of non-edge pixels check 906.

In one-dimensional horizontal filter process 905, the horizontal line of non-edge pixels in the current window are filtered by a three-tap filter. In this embodiment, the three pixels are processed by a filter of the form [¼, ½, ¼] and the filtered output pixel from the one-dimensional filter is written to the appropriate location in sixteen pixels-by-sixteen pixels filter block memory 425, as explained above. Upon completion of the filtering process, one-dimensional horizontal filter process transfers to last pixel check 547.

Figure 10C:
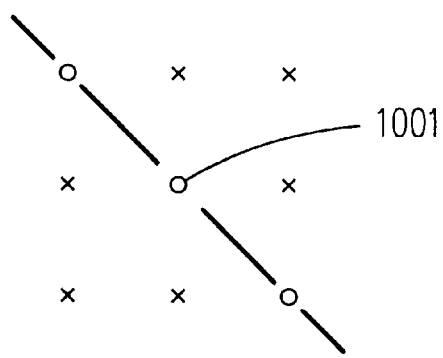

Forty-five degree line of non-edge pixels check 906 determines whether the current window includes a forty-five degree line of non-edge pixels through current pixel 1001. Specifically, FIG. 10C illustrates the current window configuration in the edge pixel map that is detected by forty-five degree line of non-edge pixels check 906. If the pixel diagonally above and to the left of current pixel 1001 and pixel diagonally below and to the right of current pixel 1001 are non-edge pixels, forty-five degree line of non-edge pixels check 906 is true and otherwise false. If forty-five degree line of non-edge pixels check 906 is true, processing transfers to one-dimensional forty-five degree filter process 907 and otherwise to one hundred thirty-five degree line of non-edge pixels check 908.

In one-dimensional forty-five degree filter process 907, the forty-five degree line of non-edge pixels in the current window are filtered by a three-tap filter. In this embodiment, the three pixels are processed by a filter of the form [¼, ½, ¼] and the filtered output pixel from the one-dimensional filter is written to the appropriate location in sixteen pixels-by-sixteen pixels filter block memory 425, as explained above. Upon completion of the filtering process, one-dimensional forty-five degree filter process 907 transfers to last pixel check 547.

Figure 10D:
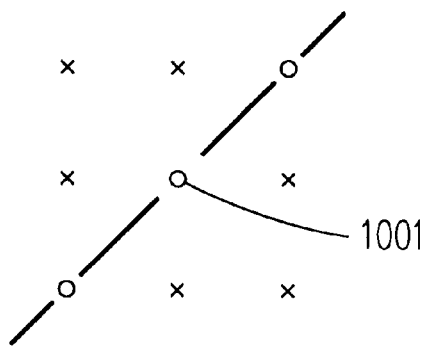

One hundred thirty-five degree line of non-edge pixels check 908 determines whether the current window includes a one hundred thirty-five degree line of non-edge pixels through current pixel 1001. Specifically, FIG. 10D illustrates the current window configuration in the edge pixel map that is detected by one hundred thirty-five degree line of non-edge pixels check 908. If the pixel diagonally below and to the left of current pixel 1001 and the pixel diagonally above and to the right of current pixel 1001 are non-edge pixels, one hundred thirty-five degree line of non-edge pixels check 908 is true and otherwise false. If one hundred thirty-five degree line of non-edge pixels check 908 is true, processing transfers to one-dimensional one hundred thirty-five degree filter process 909 and otherwise to copy pixel process 551 that writes the current pixel to filter block memory 425 and then transfers to last pixel check 547.

In one-dimensional one hundred thirty-five degree filter process 909, the one hundred thirty-five degree line of non-edge pixels in the current window are filtered by a three-tap filter. In this embodiment, the three pixels are processed by a filter of the form [¼, ½, ¼] and the filtered output pixel from the one-dimensional filter is written to the appropriate location in sixteen pixels-by-sixteen pixels filter block memory 425, as explained above. Upon completion of the filtering process, one-dimensional one hundred thirty-five degree filter process 904 transfers to last pixel check 547.

Last pixel check 547 determines whether all the pixels in the current block have been processed by switched filter unit 330. If one or more pixels remain for processing, last pixel check 547 transfers to edge pixel check 541 and otherwise to copy filtered block process 548 that was described above.

Thus, in this embodiment of switched filter unit 330 pixels directly adjacent to edges are not processed with the two-dimensional filter because such a filter would include pixels from either sides of an edge. However, it is desirable to clean up the area next to edges (edge border areas) to the maximum extent possible without smearing the edges since this results in clean sharp edges which are critical to the perceived quality of an image. Thus, as explained above if at least three pixels in the window including the current pixel are not edge pixels, the window is examined to see if all the pixels lying along one of the four possible axes through the window are not edge pixels. If an axis is made-up of non-edge pixels, the pixels on that axis are processed with a one-dimensional filter.

Notice that the four possible axes are checked sequentially and the directional filtering is performed along the first axis along which all the pixels are not-edge pixels. Axis examination is stopped after the first axis along which filtering is allowed is found. Although adjacent pixels are not examined for continuity of direction, axis examination always proceeds in the order shown above. This ensures that adjacent pixels are classified similarly if ambiguity in classification exists.

This process of axis selection and resultant one-dimensional directional filtering is equivalent to finding pixels adjacent to the edges, i.e., finding edge border areas, and filtering pixels in the edge border areas along a direction parallel to the edges. This technique also provides edge enhancement.

Edge pixels and pixels directly adjacent to the edge pixels that are not selected for one-dimensional directional filtering are not post-processed. Leaving these pixels unchanged ensures that sharpness of edges in the decoded image is not degraded by post-processing. This implies that the pixels adjacent to edges which do not qualify for one-dimensional directional filtering are also treated like edges. This is equivalent to coalescing edge segments with a small discontinuity (1 to 2 pixels) into continuous contours. Therefore, the pixel classification process in switched filter unit 330 compensates for the lack of edge linking and tracing and allows post-processor 300 to effectively use an edge map equivalent to those generated by more complex edge detectors.

As is known to those skilled in the art, color video sequences typically consist of three color components, for example, red, green and blue components. Current coding standards, such as H.261 and H.262, use different color components. These standards use one luminance component which carries the gray-scale, or average image intensity corresponding to a black and white video sequence and two chroma components which contain the color information. In this embodiment, color video sequences are post-processed by applying the post-processor to the luminance component.

At low data rates, chroma components show severe blocking. When edge-detector 520 is applied to the chroma components, no edges are detected since the coded chroma has no distinct edges. In the absence of edges, all pixels appear as shade pixels and so post-processor 300 reduces to a two-dimensional low pass filter.

Some improvement in chroma noise is observed by low pass filtering the chroma with the two-dimensional low pass filter. Specifically, the filter mask is:

$$\begin{bmatrix} \frac{1}{16} & \frac{1}{8} & \frac{1}{16} \\ \frac{1}{8} & \frac{1}{4} & \frac{1}{8} \\ \frac{1}{16} & \frac{1}{8} & \frac{1}{16} \end{bmatrix}$$

Both chroma components are low pass filtered with this filter. The improvement in chroma noise is more pronounced for a coded video rate of 96 kbps as opposed to 56 or 48 kbps.

Since the improvement is minimal for the lower video rates, the complexity of post-processor 300 can be reduced by only processing the luminance component. This choice is reasonable since at low to moderate data rates, luma variations mask the chroma artifacts.

Artifact reduction unit 350 was used by itself on a variety of test sequences that included sequences at QCIF resolution and sequences generated at QCTX resolution. The QCIF format is a standard format employed in international standards such as H.261 and H.234. The QCTX format is a proprietary format employed in the AT&T 2500 videophone. The QCTX sequences were coded using a PV2 video coder, that is the same video coder as in AT&T 2500 videophone, at data rates ranging from 10 to 20 kbps. The QCIF sequences were coded using a H.261 coder at data rates ranging from 48 to 112 kbps. Maximum frame rate was set to 10 frames per second. All of these sequences are suitable for personal video communications. In order to ensure that artifact reduction unit 350 does not introduce any degradations in more complex sequences, artifact reduction unit 350 was applied to a widely used test sequence named Mobile at CIF resolution coded open loop with a fixed quantizer scale of 32 at 10 frames per second with a H.261 coder.

Artifact reduction unit 350 was successful in eliminating most of the coding artifacts while preserving edges. The visual improvement in the quality of low to medium bit rate coded images was striking.

These extensive simulations show that the artifact reduction unit 350 substantially and dramatically improves the performance of low to medium bit rate video codecs by cleaning coding artifacts while preserving edge sharpness. The post-processor 300 presented is independent of the encoder. Therefore post-processor 300 can be added to any video receiver between decoder and display modules to enhance the displayed image.

In one embodiment of this invention, the various processes described herein are written in the C++ computer language and are compiled and linked using the CenterLine CC compiler to obtain binary code that can be stored in a non-volatile memory of a decoder. In one embodiment, the binary code was used with a simulated decoder and the output images from post-processor 300 were stored and subsequently displayed using video players.

While post-processor 300 provides a significant enhancement in image quality, further enhancements in both picture quality and performance are obtained by taking advantage of knowledge of one or more coding parameters from the decoder, such as the quantizer scale, for pixel filtering. As explained more completely below, utilizing information about a coding parameter, such as the quantizer step size in the post-processor of this invention introduces coupling between the post-processor and the coder.

This embodiment of a coding parameter adaptive post-processor adapts to the coding parameters available at the decoder, e.g., a quantizer scale is used. Since the quantizer scale is indicative of the degree of quantization, the quantizer scale also is indicative of the amount of post-processing that is needed. In addition, to using the quantizer scale in the post-processing, the components in this embodiment of the quantizer scale adaptive post-processor have been simplified to assist in real-time implementation.

As is known to those skilled in the art, current coding standards such as H.261 and MPEG first apply a DCT to non-overlapping square blocks in the current frame to transform the spatial domain into a transform domain. The resulting transform coefficients for each block are quantized using a matrix W and quantizer scale q. The quantized value $Q(C(i,j))$ of transform coefficient $C(i,j)$ in the ith row and jth column of the block is:

$$Q(C(i,j)) = \frac{C(i,j)}{W(i,j) \times q}$$

Typically, quantizer step size q is defined as:

$$q = \text{const} * QS$$

where

QS=quantizer scale; and const=2.

Therefore, the quantizer scale is a direct measure of the coarseness of quantization.

As demonstrated above, post-processing reduces coding artifacts. If quantization errors are minimal, coding artifacts are also minimal, and therefore the post-processing should be minimal. However if quantization errors are large, the coding artifacts are severe and the sequence should be heavily post-processed. This embodiment of quantizer scale adaptive post-processor, as described more completely below, utilizes digital noise reduction, edge detection, switched filtering and a quantization adjustment.

Figure 11:
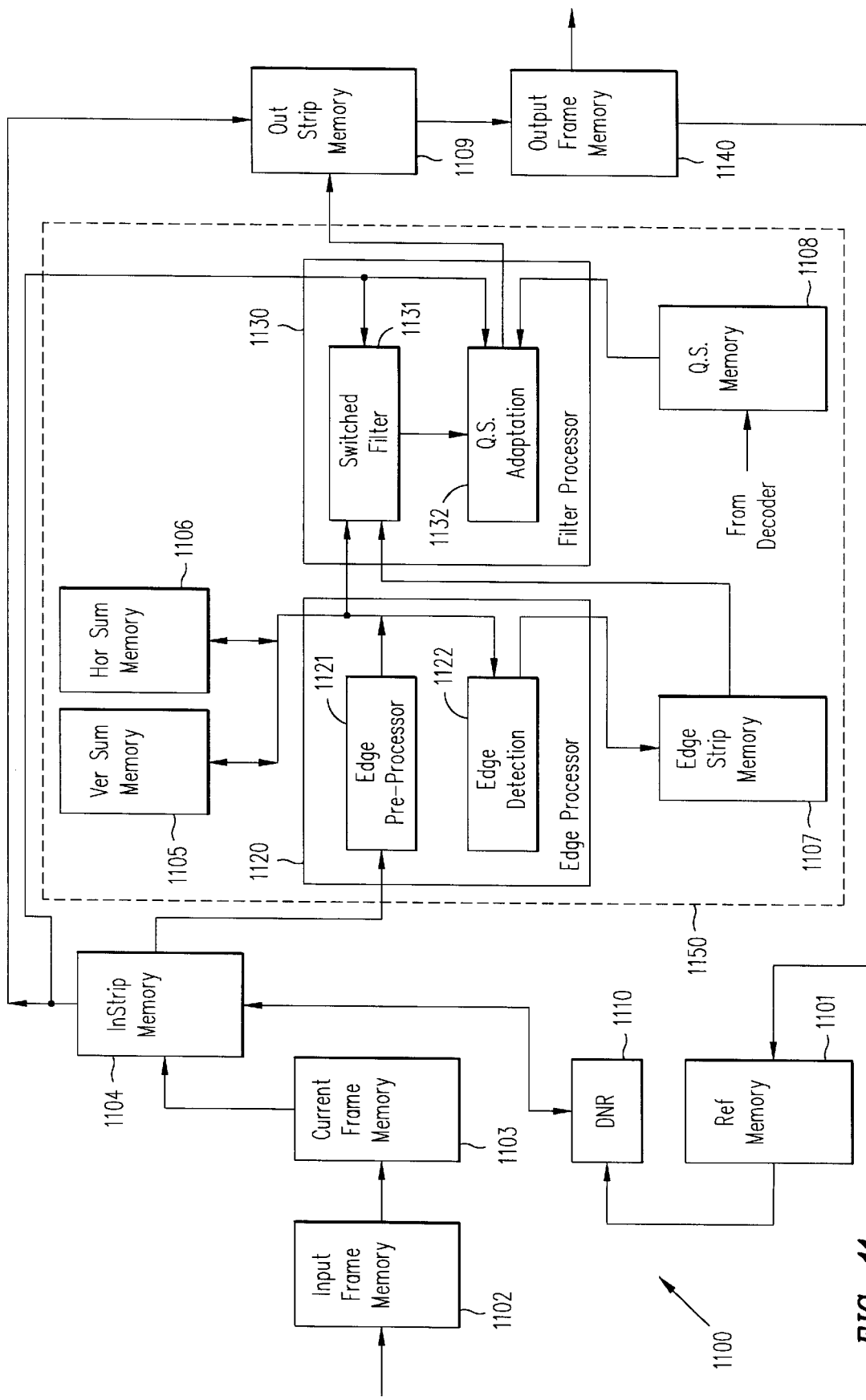
FIG. 11 is a block diagram of a quantizer scale adaptive post-processor, according to the principles of this invention.

FIG. 11 is a block diagram of one embodiment of quantizer scale adaptive post-processor 1100. Post-processor 1100 utilizes a simplified edge detection unit 1122 and switched filter unit 1130 compared to the embodiments described above to assist in real-time implementation.

Initially, post-processor 1100 updates a quantizer scale map for a frame in input frame memory 1102 from the decoder. In this embodiment, the quantizer scale map is transferred a frame at a time. Alternatively, a portion of the frame quantizer scale map could be transferred on a macroblock by macroblock basis. The quantizer scale map, that is stored in a quantizer scale memory 1108 of post-processor 1100, has one entry, i.e., a quantizer scale, for each macroblock in the frame. The quantizer scale for a macroblock in a new frame is updated only if that macroblock is not replenished. Here, replenished means that the macroblock in the current frame is obtained by copying the decoded macroblock at the same spatial location from the immediately preceding decoded frame. Thus, if the macroblock is replenished, the quantizer scale of the corresponding macroblock in the previous frame is used.

As explained more completely below, the quantizer scale is used in a quantizer scale adaptive filter. Thus, specification of the quantizer scale stored in the quantizer scale map for a particular macroblock determines the performance of the filter for that macroblock. Thus, in this embodiment, characteristics of a macroblock are used to adapt the quantizer scale adaptive filter to that macroblock. In view of this disclosure, other characteristics of the macroblock could be used to adapt a coding parameter adaptive filter for a particular macroblock.

Digital noise reduction unit 1110 is similar to digital noise reduction unit 310 except the replenishment flag is not needed. In this embodiment, artifact reduction unit 1150 includes an edge processor 1120 and a filter processor 1130. Edge processor 1120 includes an edge detection unit 1122, and an edge pre-processor 1121. Edge pre-processor 1121 initially generates weighted three pixel horizontal and vertical spatial gradient factors around a pixel and stores the horizontal and vertical spatial gradient factors for subsequent use in horizontal sum memory 1106 and vertical sum memory 1105, respectively. As explained more completely below, the horizontal and vertical spatial gradient factors are used repeatedly in sub-processes within edge detection unit 1122 and switched filter unit 1131.

Since the horizontal and vertical spatial gradient factors are stored, the memory requirements of post-processor 1100 are increased relative to those of post-processor 300. However, the greater memory requirements are offset by the enhanced speed of post-processor 1100 relative to post-processor 300.

After the horizontal and vertical spatial gradient factors are generated by edge pre-processor 1121, the factors are used by edge detection unit 1122 to generate pixel-by-pixel a horizontal spatial gradient and a vertical spatial gradient. The horizontal spatial gradient and vertical spatial gradient for a pixel are combined to form a pixel gradient. The pixel gradient is compared with a single adaptive edge threshold to determine whether the pixel is an edge pixel. If the pixel is an edge pixel, an edge flag for the pixel is set in an edge map stored in edge-strip memory 1107. Consequently, a pixel-by-pixel edge map is generated and stored in edge memory 1107 by edge detection unit 1120. In this embodiment, the use of a single adaptive edge threshold in the edge detection process further simplifies edge detection unit 1122 by replacing the two distinct thresholds used in edge detection unit 320 with a single threshold.

Switched filter unit 1131 in filter processor 1130 again classifies pixels as one of an edge pixel, an edge boundary pixel, and a shade pixel using the edge map for a three pixel-by-three pixel window about the current pixel. As described above, edge pixels are not further processed. Edge boundary pixels are filtered with an appropriate one dimensional filter, and shade pixels are filtered with a two-dimensional low pass filter. Any non-edge pixels that are not classified as either a shade or edge-boundary pixel are not processed by switched filter unit 1131. This process is also simplified by utilizing the stored horizontal and vertical spatial gradient factors, as described more completely below.

After a pixel is processed by switched filter unit 1131, a quantizer scale adaptation unit 1132 utilizes a quantizer scale adaptive filter to adjust the post-processed output pixel from switched filter unit 1131 for the quantizer scale. Specifically, the extent of post-processing is adjusted in quantizer scale adaptation unit 1132 by mixing the post-processor output pixel from quantizer scale adaptation unit 1132 with the digitally noise reduced output pixel from the decoder. As explained more completely below, quantizer scale adaptation unit 1132 does not use a quantizer scale directly, but rather uses a weighting factor that is proportional to quantizer scale QS for the macroblock containing the current pixel. The filtered output pixel from filter processor 1130 is the weighted sum of the digitally noise reduced pixel and the post-processed pixel.

Post-processor 300 had a mechanism for identifying stationary textured blocks which were replenished. These blocks were not post-processed in order to preserve sharpness. Thus, post-processor 300 did not need any parameters from the decoder. In the current implementation, the quantizer scale adaptation, i.e., a coding parameter adaptation, preserves sharpness in well coded areas by minimizing the extent of post-processing. Stationary areas in particular are likely to be replenished. If the stationary areas are quantized finely in a previous frame, the replenished block is close to the original and therefore should not be post-processed. Quantizer scale adaptive post-processor 1100 preserves the sharpness for replenished macroblocks if the macroblocks were quantized using a small step-size in previous frames by using the quantizer scale from the previous frames for the replenished macroblocks. This eliminates the need for identification and separate processing of stationary textured blocks as in post-processor 300. Therefore, post-processor 1100 preserves sharpness by quantizer scale adaptation instead of by textured stationary block identification which is eliminated.

Quantizer scale adaptive post-processor 1100 relies on the decoder to provide a measure of the quality of encoding (quantizer scale) to post-processor 1100. Thus, the decoder and the post-processor are coupled to some extent. However, for present codecs this data is readily available, and so this is not a significant issue.

Quantizer scales are transmitted from the encoder over the communication channel to the decoder and are therefore available in the receiver. In most video-conferencing codecs, the quantizer scale is fixed for a macroblock that typically consists of sixteen pixels by sixteen pixels. Typically, replenished macroblocks and not-replenished macroblocks are easily distinguished. A replenished macroblock has all quantized coefficients equal to zero. This is possible since video codecs employ temporal prediction and code a prediction error rather than the original pixel value. If the current macroblock was represented in the previous frame with sufficient accuracy and/or the quantizer scale is high enough, the prediction error yields all zeroes when quantized. For such blocks the quality of coding is the same as in the previous frame. Therefore, the quantizer scale for the previous frame is an accurate measure of the quality of coding.

Figure 12:
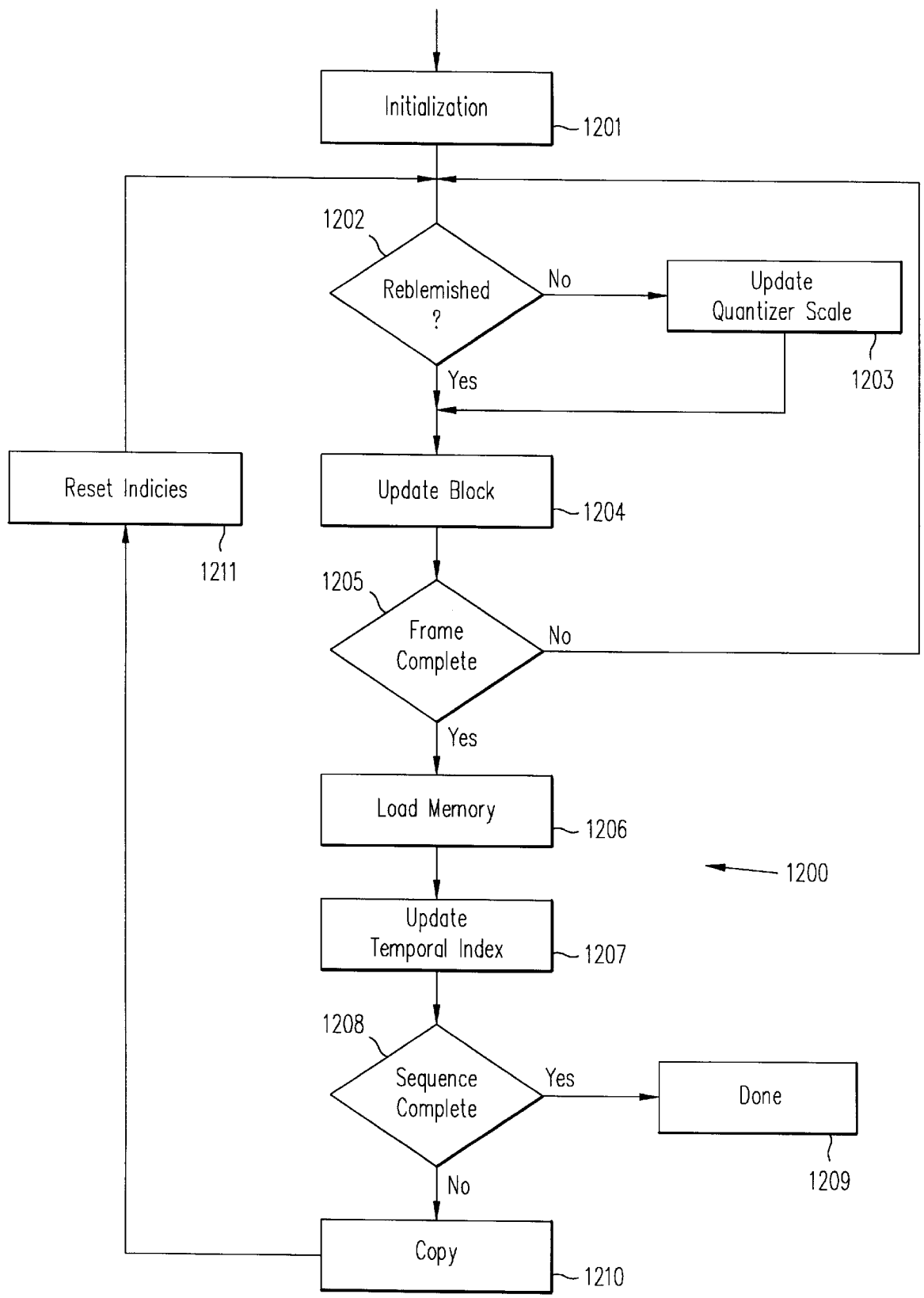
FIG. 12 is a process flow diagram for one embodiment of a procedure for loading quantizer scales in the quantizer scale adaptive post-processor of FIG. 11, according to the principles of this invention.

To utilize quantizer scale adaptive post-processor 1100 with a particular decoder, the decoder is modified to perform process 1200 (FIG. 12.). The decoder records quantizer scales for each frame in a two dimensional array QSMap_n(i,j) in a memory of the decoder, where n denotes the temporal index of the input frame in input frame memory 1102 and (i,j) are the row and column indices of the current macroblock within the input frame. For a frame having NROWS pixel rows and NCOLS pixel columns, and a macroblock size of sixteen pixels-by-sixteen pixels:

$$(0,0) \leq (i,j) < (NROWS/16, NCOLS/16).$$

where (x,y)<(a,b) implies that (x<a) and (y<b). Also, temporal index n is defined as:

$$0 \leq n < N$$

where N is the number of frames in the video sequence.

Specifically, within process 1200 in initialization process 1201, each location in two dimensional quantizer scale map QSMap_n(i,j) for temporal index n equal to zero is set to the lowest possible value, e.g., the minimum value of the quantizer scale. For a H.261 codec, each location in two dimensional array QSMap_0(i,j) is set to one and then indices i and j are set to zero. Processing transfers from initialization process 1201 to replenishment check 1202.

In check 1202, process 1200 determines whether the current macroblock, i.e., the macroblock in the frame having indices (i,j) is replenished. Although this can be done by examining the pixel-to-pixel changes between adjacent frames, in most standard codecs, whether a macroblock is replenished can be determined by examining the transmitted bit-stream. In this embodiment, process 1200 determines whether a macroblock is replenished by examining the macroblock layer in the transmitted bit-stream. If the macroblock is replenished, processing transfers to update block process 1204 and conversely to update quantizer scale process 1203.

In update quantizer scale process 1203, the quantizer scale in quantizer scale map QSMap_n(i,j) is updated, i.e., the present value in the map is replaced with the quantizer scale for the current macroblock. Update quantizer scale process 1203 also transfers processing to update block 1204.

Thus, when processing transfers to update block 1204, the quantizer scale at location (i,j) in quantizer scale map QSMap_n(i,j) is changed only if the macroblock is not a replenished macroblock. Update block process changes indices (i,j) to point to the next block in the frame and transfers processing to frame complete check 1205.

Frame complete check 1205 determines whether all the macroblocks in the frame have been processed. If all the macroblocks have been processed, frame complete check 1205 transfers processing to load memory process 1206 and otherwise to replenished check 1202. Thus, each quantizer scale in quantizer scale map QSMap_n(i,j) is updated or left unchanged when processing reaches load memory process 1206.

In load memory process 1206, quantizer scale map QSMap_n(i,j) is transferred from the decoder to post-processor 1100. The particular type of transfer and the timing of the transfer are determined by the interface between the decoder and post-processor 1100. The important aspect is that prior to post-processor 1100 starting to process a frame, the quantizer scales for the frame are available in post-processor 1100.

Upon transfer of quantizer scale map QSMap_n(i,j) to post-processor 1100, update temporal index process increments temporal index n and transfers processing to sequence complete check 1208. If temporal index n is less than maximum frame number N, check 1208 transfers to copy process 1210 and otherwise to done 1209.

In copy process 1210, quantizer scale map QSMap_n-1(i,j) is copied to quantizer scale map QSMap_n(i,j). This process may not be necessary. If quantizer scale map QSMap_n-1(i,j) is always completely transferred to post-processor 1100 before the earliest possible time that the decoder can start to update the map for the next frame, only a single quantizer scale map must be stored at any given instant. Otherwise, at least two quantizer scale maps are maintained in memory to prevent the possibility of any overwriting.

Copy process 1210 transfers to reset indices process 1211. Reset indices process 1211 resets indices (i,j) to (0,0) and transfers processing to replenished check 1202 to start the processing for the next frame in the sequence.

Process 1200 is illustrative only of one embodiment of a method for providing quantizer scales to post-processor 1100 and is not intended to limit the invention to the particular embodiment described. The important aspect is that when a frame is available for use in input frame memory 1102 (FIG. 11) of post-processor 1100, quantizer scales for each block in the frame are stored in quantizer scale memory 1108.

In the embodiment, an input frame is denoted by Fn where n is the temporal index. As explained above, temporal index n can take on any value in the range:

$$0 \leq n < N$$

Spatial coordinates (i,j) for pixels within frame Fn are in the range:

$$(0,0) \leq (i,j) < (NROWS, NCOLS)$$

where
  NROWS=number of rows in frame Fn; and
  NCOLS=number of columns in frame Fn.
Thus, the input to post-processor 1100 is a sequence of N frames of size NROWS×NCOLS. As explained more completely below, post-processor 1100 generates a sequence of N post-processed frames of size NROWS×NCOLS.

Post-processor 1100 includes a reference frame memory 1101, a current frame memory 1103, an in-strip memory 1104, a vertical sum memory 1105, a horizontal sum memory 1106, an edge-strip memory 1107, a quantizer scale memory 1108, an output-strip memory 1109 and an output frame memory 1140. While these memories are shown in FIG. 11 as separate distinct memories, those skilled in the art will appreciate that the memories can be different regions in one or more memories as well as separate memories.

In this embodiment, current memory 1103 and reference frame memory 1101 are two pixels wider than the input frame along all borders. As explained more completely below, wider memories are needed since post-processing for each pixel requires edge information for pixels in a three pixel-by-three pixel window surrounding the current pixel. Therefore, current frame memory 1103 and reference frame memory 1101 are four pixels larger in each direction than input frame memory 1102.

Figure 13:
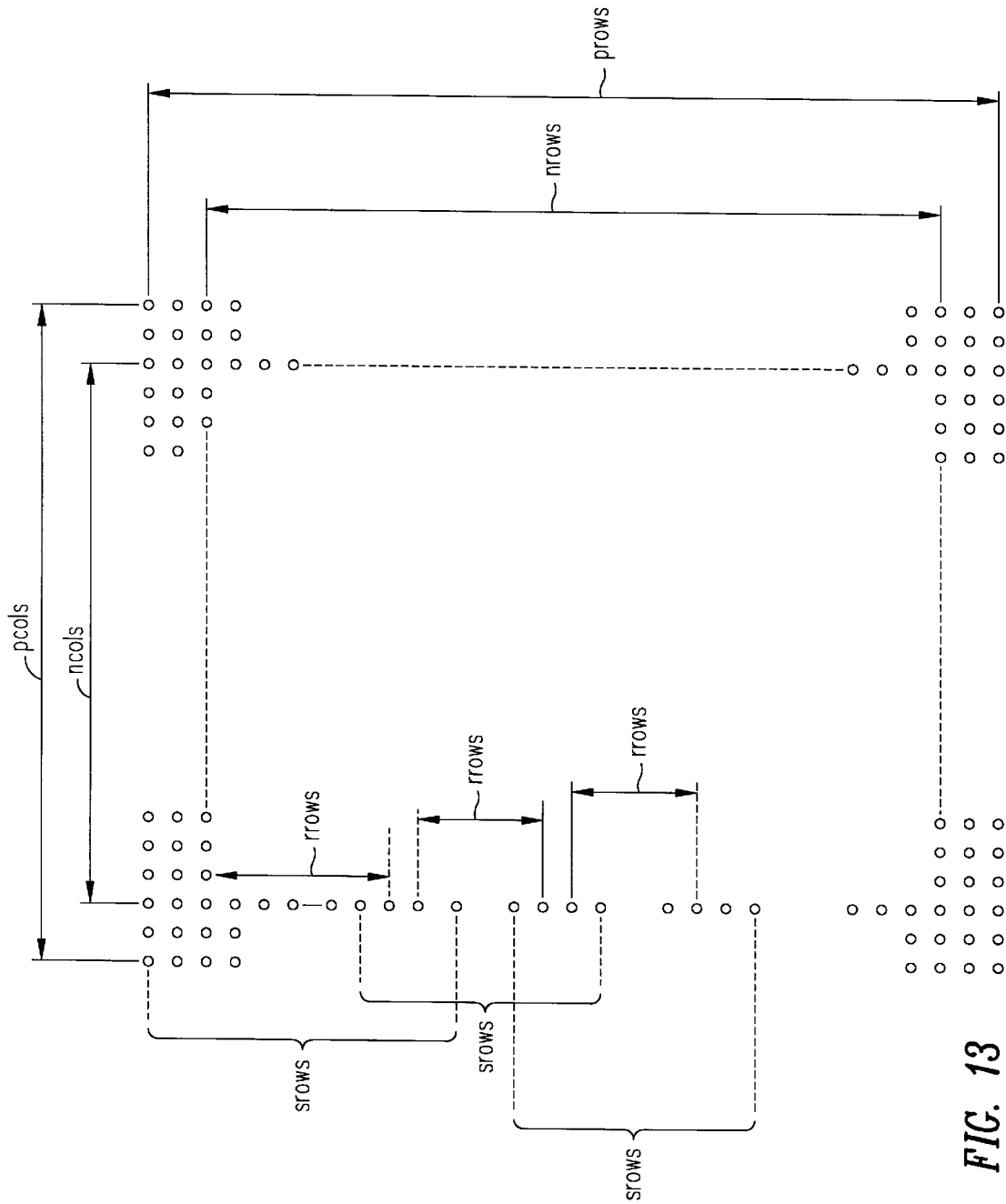
FIG. 13 is a diagram of a frame memory used in the quantizer scale adaptive post-processor of this invention with definitions of the various parameters used in defining the strip of pixels that are post-processed.

FIG. 13 is an illustration of the size of current frame memory 1103 and reference frame memory 1101. Each memory has PCOLS columns and PROWS rows. When the size of the frame is NROWS by NCOLS, PCOLS and PROWS are defined as:

$PROWS=NROWS+4$; and $PCOLS=NCOLS+4$.

As shown in FIG. 13, the input frame is copied to the center of the applicable frame memory in post-processor 1100.

As explained more completely below, the data in current frame memory 1103 are processed a strip at a time. In this embodiment, the data in current frame memory 1103 are divided into overlapping horizontal strips with an overlap of two pixels at the top as well as the bottom of the strip.

As illustrated in FIG. 13, the width of a strip is SROWS rows and the length of a strip is SCOLS columns. SROWS rows is greater than four rows and less than or equal to the total number of rows in the frame NROWS, i.e., $4<SROWS\leq NROWS$.

In the embodiment described more completely below, the value of SROWS was twenty. Also, it was assumed that the total number of rows in the frame was divisible by (SROWS-4). This assumption ensures that the frame can be divided into equal sized strips. If this assumption is not true, slight modifications are needed to post-process the residual lines at the end of the frame.

SCOLS, in this embodiment, is taken equal to PCOLS. Since only a strip of the current frame is processed at a time, in-strip memory 1104, vertical sum memory 1105, horizontal sum memory 1106, output-strip memory 1109 and edge-strip memory 1107 are SROWS rows wide and SCOLS columns long.

FIGS. 14A to 14G are a process flow diagram of one embodiment of the operations performed by the various units of post-processor 1100 (FIG. 11). When post-processor 1100 starts to process a sequence of N frames, the zeroth frame is written to input frame memory 1102 by the decoder. Initialize memory process 1401 detects that a new sequence is starting and initializes temporal index n to zero. Process 1401 also sets the four extra rows and four extra columns of memories 1103 and 1101 to a predetermined state, e.g., zero. Finally, process 1401 copies the zeroth frame from input frame memory 1102 to output frame memory 1140 and to the center of reference frame memory 1101. Thus, the zeroth frame is not processed by digital noise reduction unit 1110 and artifact reduction unit 1150.

After the zeroth frame is processed in initialize memory process 1401, post-processor 1100 transfers to update temporal index process 1402. Update temporal index process 1402 changes the value of temporal index n to indicate the next frame that is processed by post-processor 1100 and then transfers processing to sequence complete check 1403.

In sequence complete check 1403, post-processor 1100 compares temporal index n with number of frames N in the sequence. If temporal index n is greater than or equal to number of frames N, all the frames in the sequence have been post-processed and so processing transfers to done process 1404, which in turn performs all operations necessary to terminate operations of post-processor 1100 for the video sequence. Conversely, if temporal index n is less than number of frames N, all the frames in the sequence have not been post-processed and so processing transfers to frame copy process 1405

In frame copy process 1405, the data in input frame memory 1102 is copied into the center of current frame memory 1103, i.e., so that the frame of data is surrounded by a two pixel border. In this embodiment, the quantizer scale map is updated during decoding and a frame is post-processed only after the frame has been fully decoded. Since decoding is completed before post-processing is initiated, there is no need to check that the quantizer scale map is updated in this embodiment. However, in general, the post-processor should ensure that the quantizer scale map is updated. Upon completion of the copy, processing transfer to initialize strip index process 1406.

Initialize strip index process 1406 sets the value of an initial row strip pointer STRIP_START to a predetermined value, e.g., zero. The predetermined value is selected to that initial row strip pointer STRIP_START identifies the first row in the frame that is processed by post-processor 1100. Upon initialization of initial row strip pointer STRIP_START, process 1406 transfers processing to frame complete check 1407.

In frame complete check 1407, post-processor 1100 compares initial row strip pointer STRIP_START with number of rows NROWS in the current frame. If initial row strip pointer STRIP_START is greater than or equal to number of rows NROWS, the post-processing of the frame is complete and so processing transfers to copy frame process 1473. Copy frame process 1473 copies the frame of post-processed pixel data from output frame memory 1140 to reference frame memory 1101 and transfers processing to update temporal index process 1402, that was described more completely above. Conversely, if initial row strip pointer STRIP_START is less than number of rows NROWS, all the rows in the frame have not been post-processed and so processing transfers to strip copy process 1408

In strip copy process 1408, the data in each row starting with row STRIP_START and ending with row (STRIP_START+SROWS) are copied from current frame memory 1103 to in-strip memory 1104.

Upon completion of strip copy process 1408, all the necessary initialization for processing of a strip is complete, and so digital noise reduction unit 1110 initiates processing of the information in in-strip memory 1104, in this embodiment. Of course, if digital noise reduction is either unnecessary or unwanted, digital noise reduction unit 1110 could be eliminated. In this case, artifact reduction unit 1150 would initiate processing of the information in in-strip memory 1104, as described more completely below.

Figure 14A:
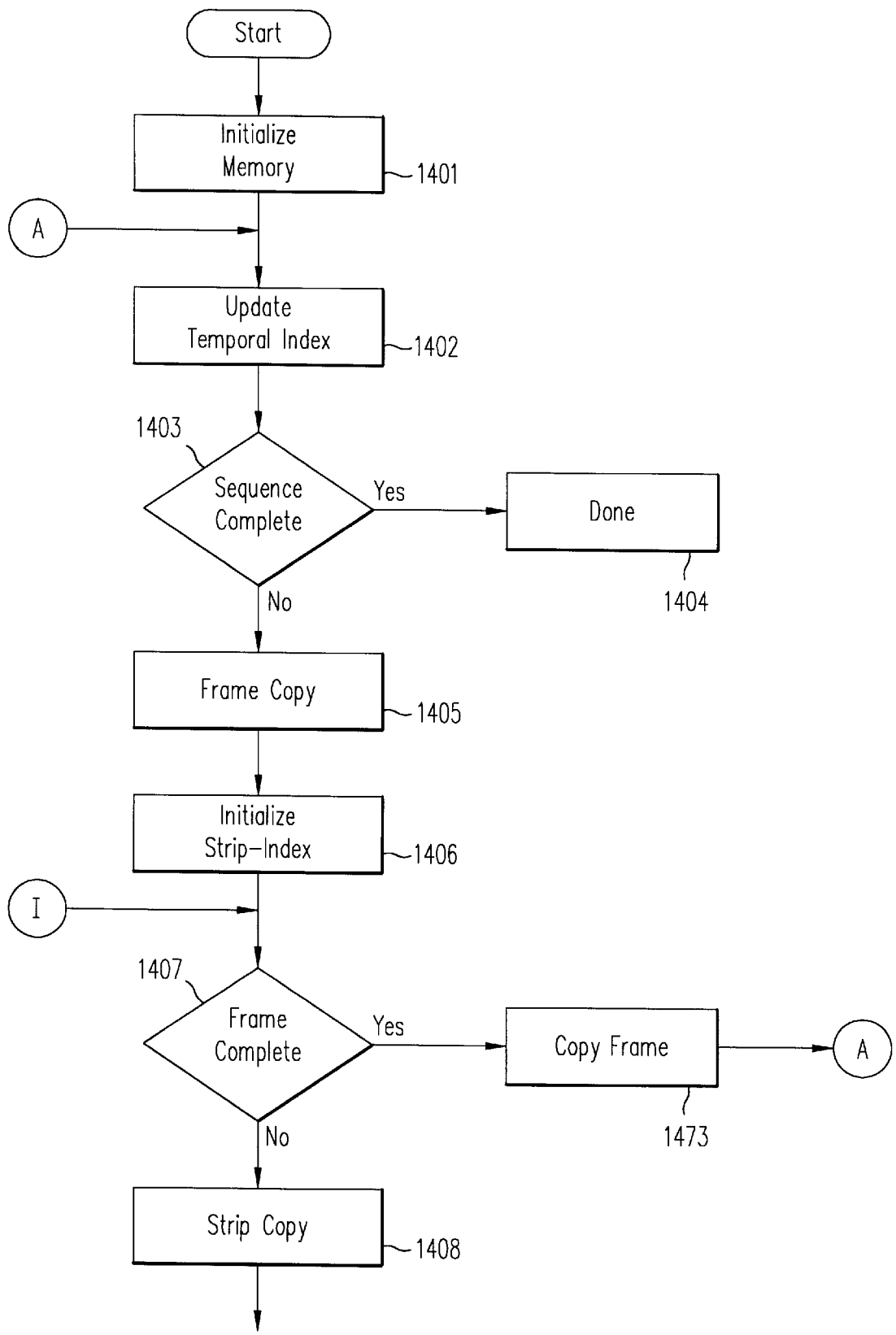
FIG. 14A is a process flow diagram for one embodiment of the initialization procedure for the quantizer scale adaptive post-processor of this invention.
Figure 14B:
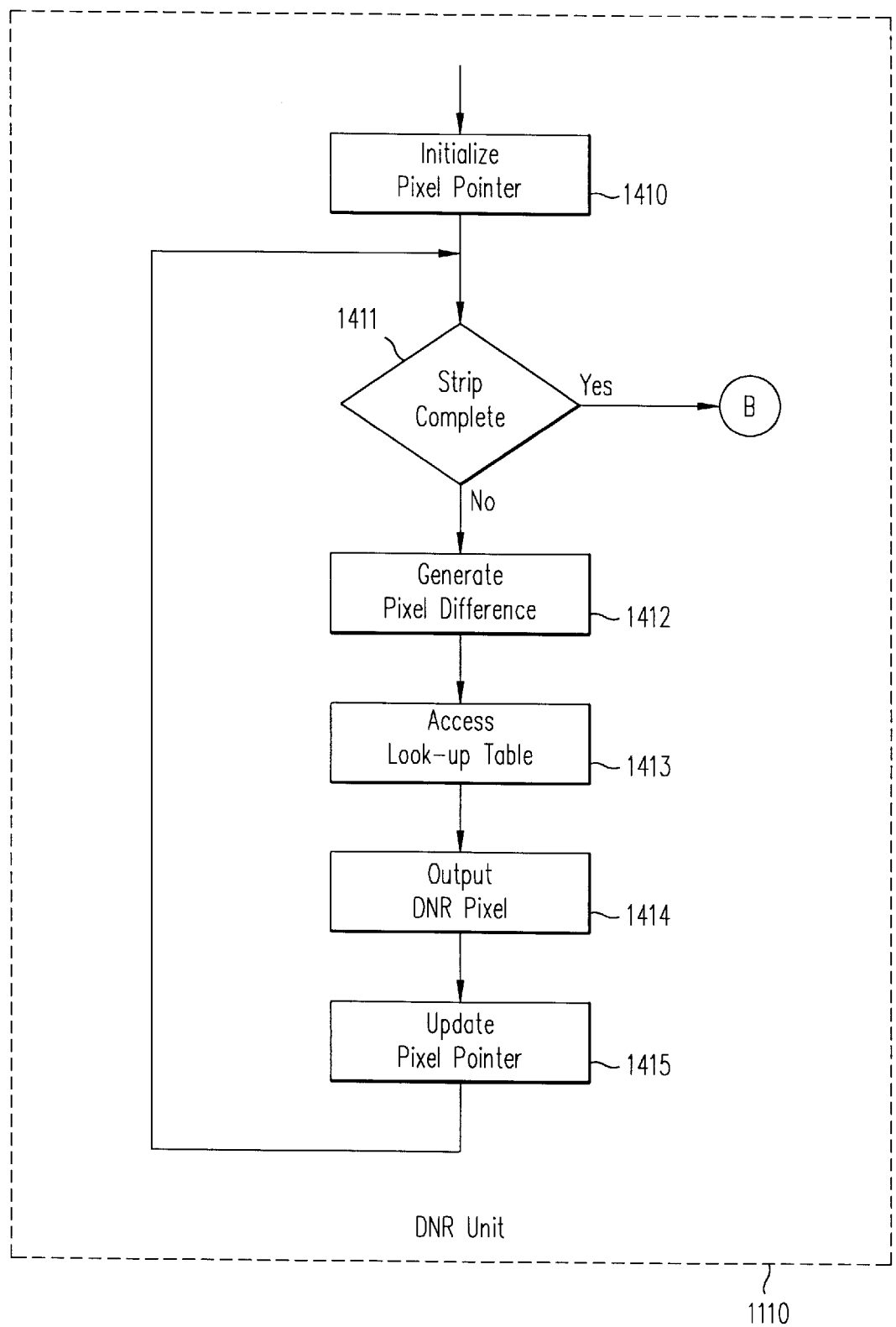
FIG. 14B is a process flow diagram for one embodiment of the operations performed by the digital noise reduction unit in the quantizer scale adaptive post-processor of this invention.

One embodiment of the process performed by digital noise reduction unit 1110 is illustrated in FIG. 14B. Initialize pixel pointer process 1410 sets a pointer to a pixel in in-strip memory 1104 to the first pixel processed by digital noise reduction unit 1110. In this embodiment, initialize pixel pointer process 1410 sets indices (i,j) of the pixel pointer to location (2,2) in in-strip memory 1104, since the first two rows are repeated and the first two columns are not actual pixel data. Upon completion of initialize pixel pointer process 1410, processing transfers to strip complete check 1411.

Strip complete check 1411 determines whether any pixels remain in in-strip memory 1104 that require processing by digital noise reduction unit 1110. In this embodiment, the last pixel processed is at location (SROWS-2, SCOLS-2) because the last two rows are either repeated in the next strip, or are not actual pixel data and the last two columns are not actual pixel data. Thus, in this embodiment, digital noise reduction unit 1110 processes a strip that is RROWS rows (FIG. 13) wide and NCOLS columns long. If indices (i,j) of the pixel pointer are less than (SROWS-2, SCOLS-2), processing transfers to generate pixel difference process 1412 and otherwise to initialize pixel pointer process 1420 (FIG. 14C) in edge pre-processor 1121.

Generate pixel difference process 1412 generates digital pixel difference dn(i,j), as defined above, using current pixel Qn(i,j) from in-strip memory 1104 and corresponding pixel Qn_1(STRIP_START+i, j) from reference frame memory 1101. Thus, the two pixels are retrieved from the respective memories and digital pixel difference dn(i,j) is formed. Upon generation of digital pixel difference dn(i,j) processing transfers to access look-up table process 1413.

In this embodiment, Table 1, as defined above, is stored in a look-up table memory of post-processor 1100. Thus, in process 1413, digital pixel difference dn(i,j) is used as an index to access the appropriate value of digital noise reduction function f(dn) in the look-up table memory. Upon completion of access look-up table process 1413, processing transfers to output DNR pixel process 1414.

In output DNR pixel process 1414, output pixel Qn(i,j) is generated according to expression (1) above and loaded in the appropriate location of in-strip memory 1104. Thus, the pixel in in-strip memory 1104 is replaced by a noise reduced pixel and processing transfers to update pixel pointer process 1415.

Update pixel process 1415 changes indices (i,j) of the pixel pointer to the next pixel to be processed and transfers to strip complete check 1411. If an additional pixel or pixels remain to be processed in the strip, strip complete check 1411 transfers to process 1412 and processes 1412 to 1415 are repeated until all pixels within the RROWS rows (FIG. 13) wide and NCOLS columns long strip, i.e., the current strip, in in-strip memory 1104 are processed. When all the pixels in memory 1104 have been digitally noise reduced by unit 1110, the current strip of pixels has been replaced with digitally noise reduced pixels and processing is transferred to edge processor 1120.

Within edge processor 1120, edge preprocessor 1121 generates a plurality of weighted three pixel horizontal and vertical spatial gradient factors. These spatial gradient factors are used repeatedly in processes described more completely below to reduce the complexity of post-processor 1100 which in turn enhances the real-time performance of post-processor 1100.

Figure 14C:
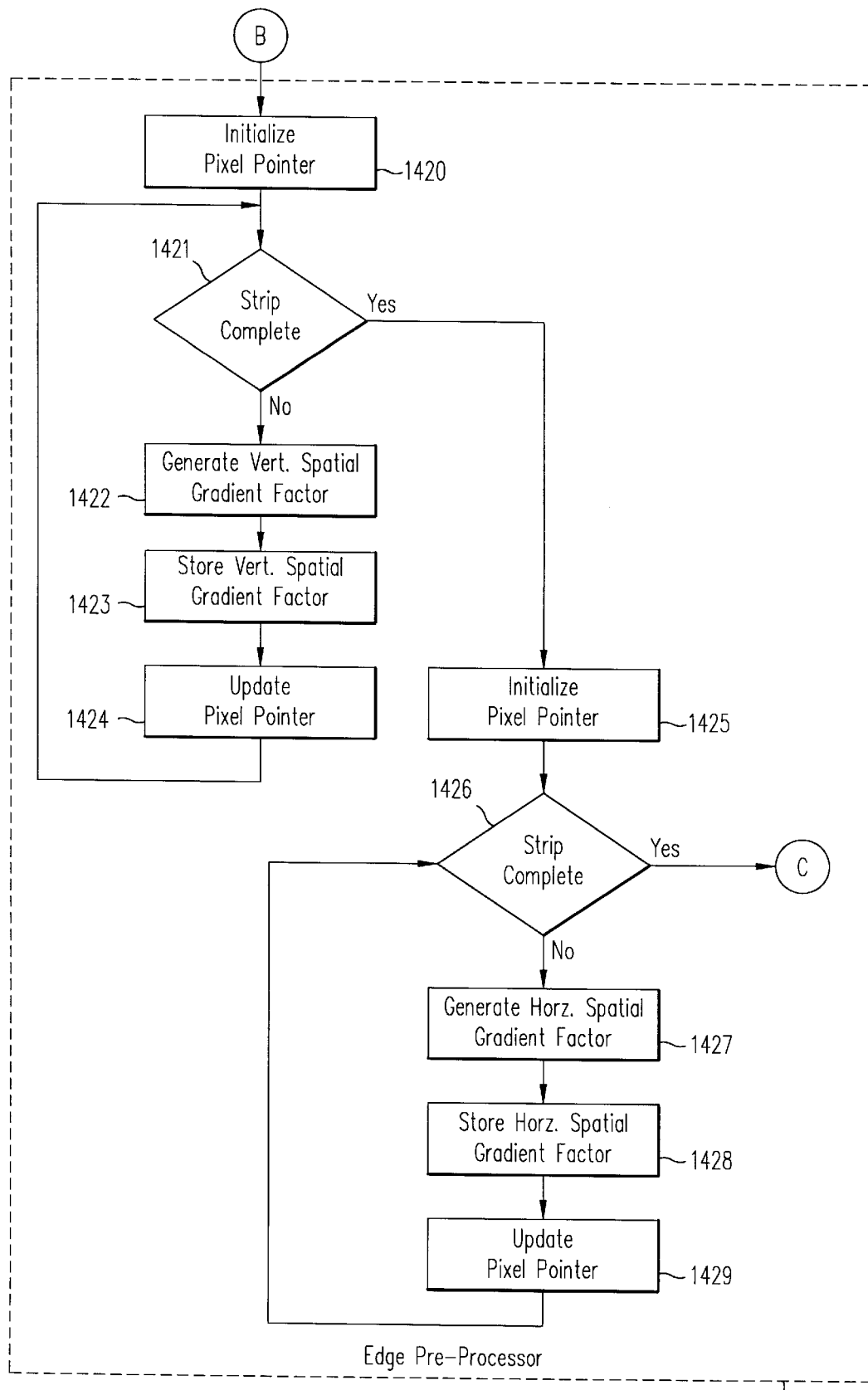
FIG. 14C is a process flow diagram for one embodiment of the operations performed by the edge pre-processor in the quantizer scale adaptive post-processor of this invention.

A process flow diagram for the processes performed by edge pre-processor 1121 is presented in FIG. 14C. In this embodiment, the vertical spatial gradient factors are generated first and then the weighted horizontal spatial gradient factors are generated. Thus, initialize pixel pointer process 1420 sets a pointer to a pixel in in-strip memory 1104 to the first pixel processed by edge pre-processor 1121. In this embodiment, initialize pixel pointer process sets indices (i,j) of the pixel pointer to location (1,0) in in-strip memory 1104, since the second row is the first row having a row of pixels on each side. Upon completion of initialize pixel pointer process 1420, processing transfers to strip complete check 1421.

Strip complete check 1421 determines whether any pixels remain in in-strip memory 1104 that require processing by edge pre-processor 1120 to generate a vertical spatial gradient factor. In this embodiment, the last pixel processed is at location (SROWS-1, SCOLS) because row SROWS-1 is the last row that has a row of pixels on each side. Thus, in this embodiment, edge pre-processor 1121 initially processes a strip that is (SOWS-2) rows (FIG. 13) wide and SCOLS columns long. If indices (i,j) of the pixel pointer are less than (SROWS-1, SCOLS) processing transfers to generate vertical spatial gradient factor process 1422 and otherwise to initialize pixel pointer process 1425.

Generate vertical spatial gradient factor process 1422 generates a three pixel weighted vertical spatial gradient factor for current pixel Qn(i,j). Specifically, in this embodiment, generate vertical spatial gradient factor process 1422 generates a weighted three pixel vertical spatial gradient factor VERSUM (i,j) that is defined as:

$$\text{VERSUM }(i,j)=Qn(i-1,j)+2Qn(i,j)+Qn(i+1,j)$$

where Qn(i,j) is a pixel at location (i,j) in in-strip memory 1104. The relationship between the three pixels used to generate weighted vertical spatial gradient factor VERSUM (i,j) is illustrated in FIG. 15. Specifically, pixel Qn(i-1,j) is immediately above current pixel Qn(i,j) and pixel Qn(i-1,j) is immediately below the current pixel. In FIG. 15, some pixels are indicated by an X to show that the pixel processed are located within in-strip memory 1104.

Upon completion of generate vertical spatial gradient factor process 1422, processing transfers to store vertical spatial gradient factor 1423. Store vertical spatial gradient factor process 1423 stores weighted vertical spatial gradient factor VERSUM(i,j) in vertical sum memory 1105 at location (i,j). Notice that only SROWS-2 by SCOLS are used in vertical sum memory 1105, which, as described above, has a size of SROWS by SCOLS. This simplifies addressing and therefore speed performance although two rows of the memory are not utilized.

Store vertical spatial gradient factor process 1423 transfers processing to update pixel pointer process 1424 that changes indices (i,j) of the pixel pointer to the next pixel to be processed and transfers to strip complete check 1421. If an additional pixel or pixels remain to be processed, strip complete check 1421 transfers to process 1422 and processes 1422 to 1424 are repeated until all pixels within the (SROWS-2) rows (FIG. 13) wide and SCOLS columns long strip in in-strip memory 1104 are processed by edge pre-processor 1121. When all these pixels in memory 1104 have been processed, the weighted three-pixel vertical spatial gradient factor are all stored in vertical sum memory 1105 and processing transfers to initialize pixel pointer process 1425.

Initialize pixel pointer process 1425 sets indices (i,j) of the pixel pointer to location (0,1) in in-strip memory 1104, since the second column is the first column having a column of pixels on each side. Upon completion of initialize pixel pointer process 1425, processing transfers to strip complete check 1426.

Strip complete check 1426 determines whether any pixels remain in in-strip memory 1104 that require processing by edge pre-processor 1120 to generate a horizontal spatial gradient factor. In this embodiment, the last pixel processed is at location (SROWS, SCOLS-1) because column SCOLS-1 is the last column that has a column of pixels on each side. Thus, in this embodiment, edge pre-processor 1121 processes a strip that is (SOWS) rows (FIG. 13) wide and (SCOLS-2) columns long to generate the weighted three pixel horizontal spatial gradient factors. If indices (i,j) of the pixel pointer are less than (SROWS, SCOLS-1), processing transfers to generate horizontal spatial gradient factor process 1427 and otherwise to initialize pixel pointer process 1430 (FIG. 14D) in edge detection unit 1122.

Figure 16:
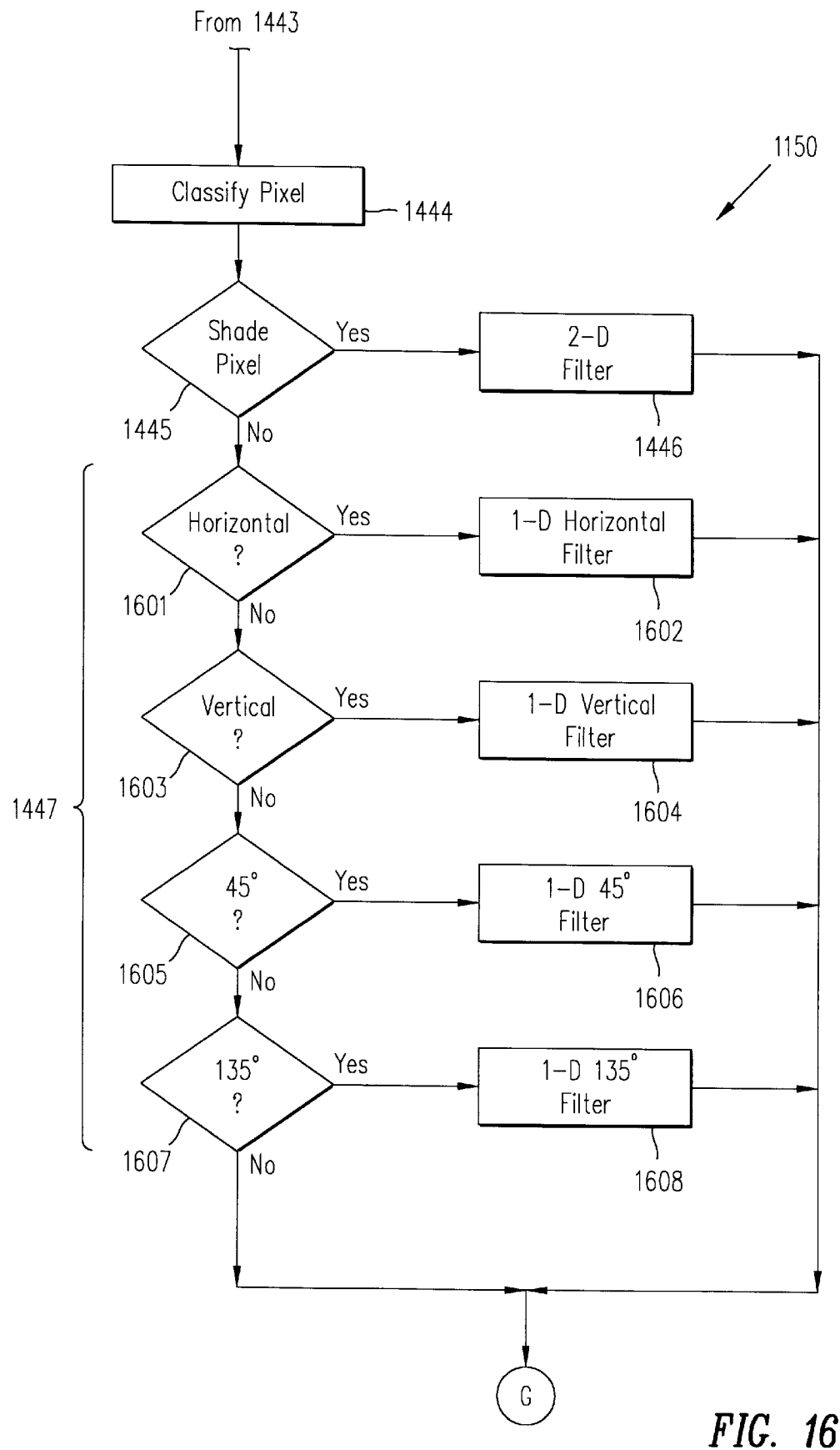
FIG. 16 is a more detailed process flow diagram for the filter unit within the switched filter unit of the quantizer scale adaptive post-processor of this invention.

Generate horizontal spatial gradient factor process 1427 generates a weighted three pixel horizontal spatial gradient factor for the current pixel Q(i,j). Specifically, in this embodiment, generate horizontal spatial gradient factor process 1427 generates a weighted horizontal spatial gradient factor HORSUM(i,j) that is defined as:

$$HORSUM(i,j)=Q(i,j-1)+2Q(i,j)+Q(i,j+1)$$

where Qn(i,j) is a pixel in in-strip memory 1104. The relationship between the three pixels used to generate weighted horizontal spatial gradient factor HORSUM(i,j) also is illustrated in FIG. 16. Specifically, pixel Qn(i,j−1) is immediately to the left of current pixel Qn(i,j) and pixel Q(i,j+1) is immediately to the right of current pixel Q(i,j).

Upon completion of generate horizontal spatial gradient factor process 1427, processing transfers to store horizontal spatial gradient factor process 1428. Store horizontal spatial gradient factor process 1428 stores weighted horizontal spatial gradient factor HORSUM(i,j) in horizontal sum memory 1106 at location (i,j). Notice that only SROWS by SCOLS-2 are used in horizontal sum memory 1106, which, as described above, has a size of SROWS by SCOLS. This also simplifies addressing and therefore speed performance although two columns of the memory are not utilized.

Store horizontal spatial gradient factor process 1428 transfers processing to update pixel pointer process 1429 that changes indices (i,j) of the pixel pointer to the next pixel to be processed in raster scan order and transfers to strip complete check 1426. If an additional pixel or pixels remain to be processed, strip complete check 1426 transfers to process 1427 and processes 1427 to 1429 are repeated until all pixels within SROWS rows (FIG. 13) wide and (SCOLS-2) columns long strip in in-strip memory 1104 are processed. When all these pixels in memory 1104 have been processed, the weighted horizontal spatial gradient factor are stored in horizontal sum memory 1106, and processing is transferred to edge detection unit 1122.

Figure 14D:
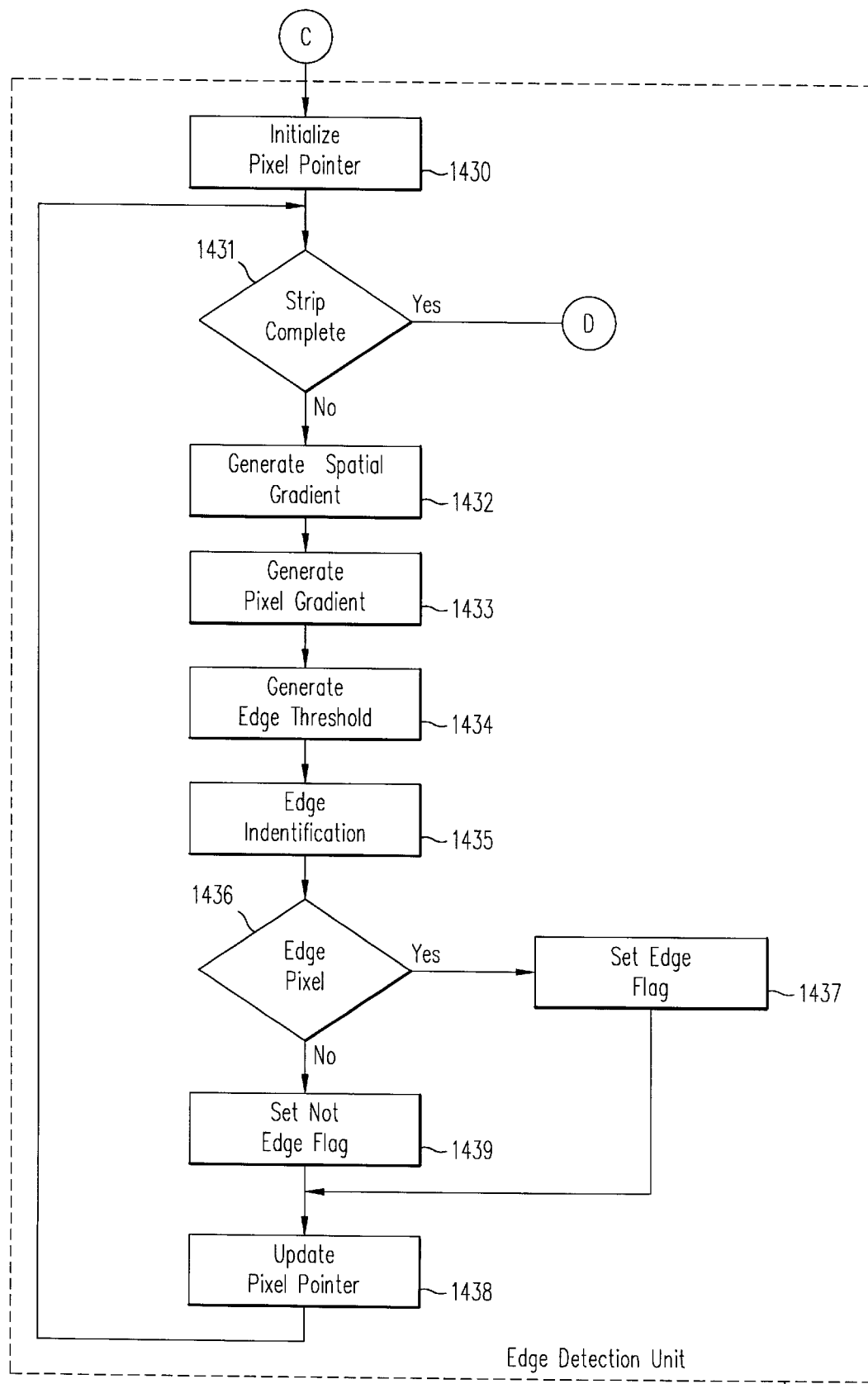
FIG. 14D is a process flow diagram for one embodiment of the operations performed by the edge detection unit in the quantizer scale adaptive post-processor of this invention.
Figure 14E:
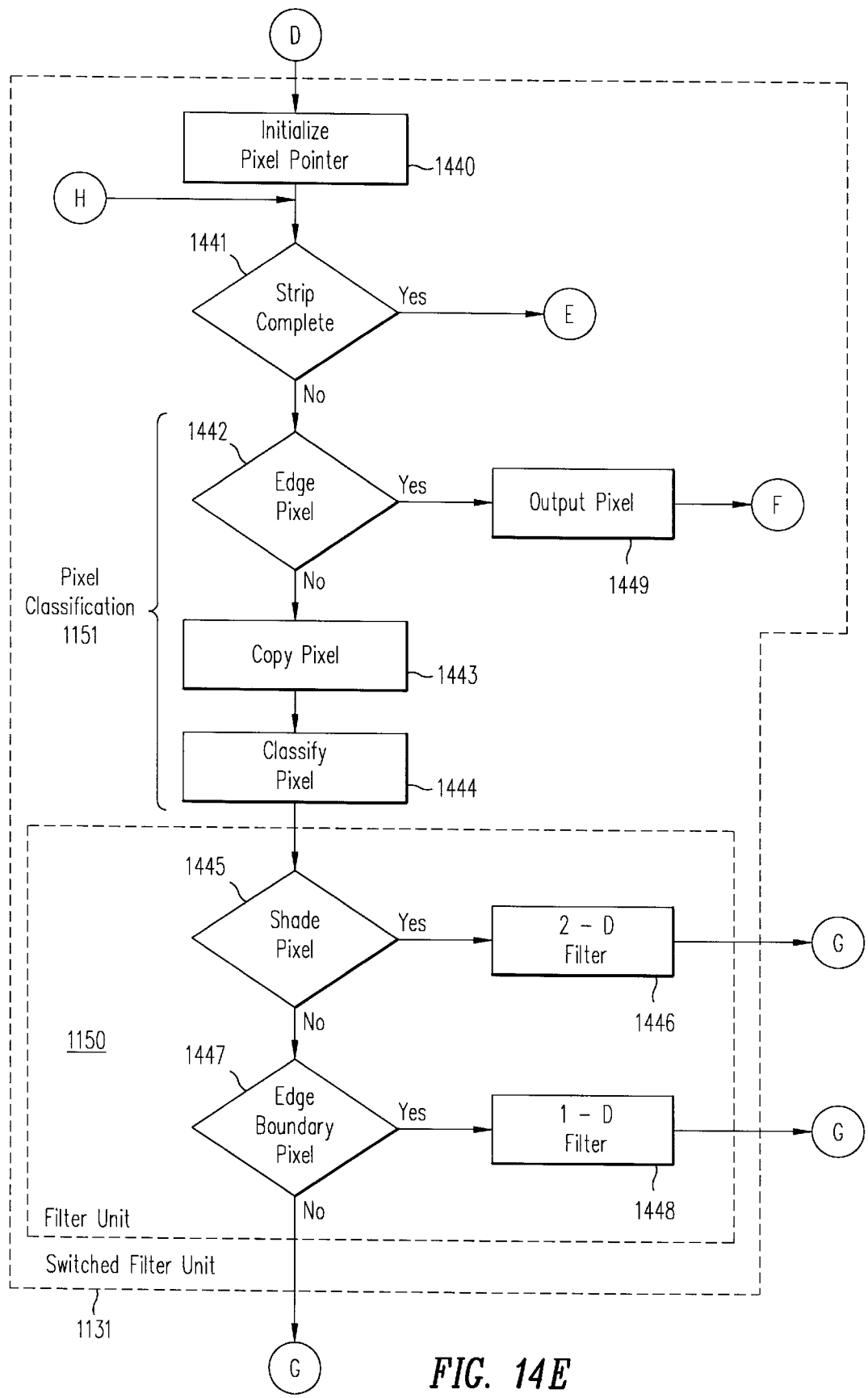
FIG. 14E is a process flow diagram for one embodiment of the operations performed by the switched filter unit in the quantizer scale adaptive post-processor of this invention.
Figure 14F:
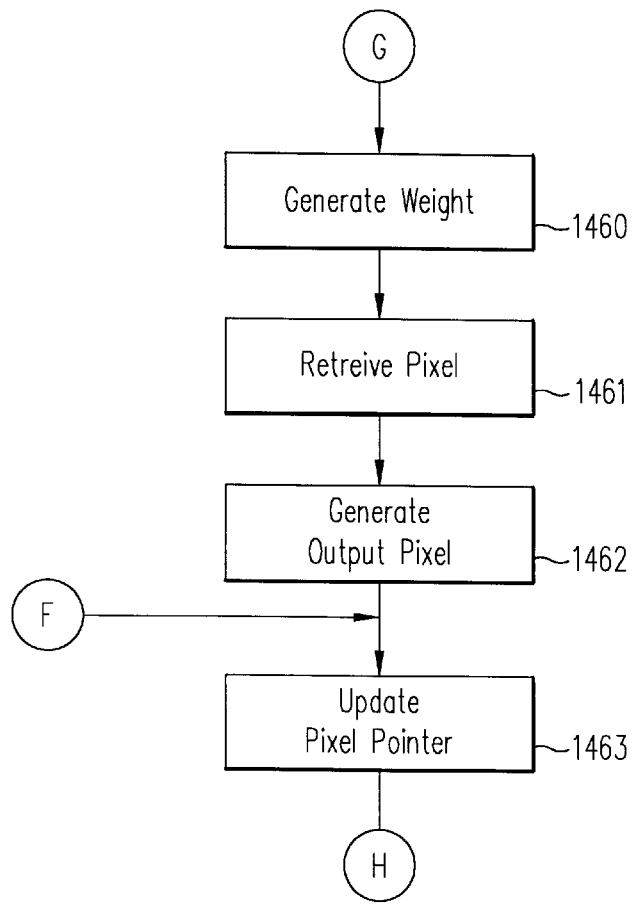
FIG. 14F is a process flow diagram for one embodiment of the operations performed by the quantizer scale adaptation unit in the quantizer scale adaptive post-processor of this invention.

FIG. 14D is a process flow diagram for the operations performed by edge detection unit 1122. As explained more completely below, edge detection unit 1122 utilizes differential operators to obtain a plurality of spatial luminance gradients Gk(i,j), where index k represents a particular edge orientation within a three pixels-by-three pixels window about current pixel Qn(i,j), that is being processed. As explained above, these differential operators perform discrete differentiation on the pixels in the three pixels-bythree pixels window to measure the luminance change along different directions.

Specifically, a plurality of differential operators Hk(i,j) is based on Sobel differential operators. In this embodiment, only Sobel operators H1 and H2 (See expression (3)) are used to generate horizontal spatial gradient G1(i,j) and vertical spatial gradient G2(i,j) which in turn are used to generate a pixel gradient that is used in the edge identification process for pixel Qn(i,j).

Initially, in initialize pixel pointer process 1430, a pointer to a pixel in in-strip memory 1104 is set to the first pixel processed by edge detection unit 1122. In this embodiment, initialize pixel pointer process 1430 sets indices (i,j) of the pixel pointer to location (1,1) in in-strip memory 1104, since this is the first pixel that is in a three pixel-by-three pixel window. Upon completion of initialize pixel pointer process 1430, processing transfers to strip complete check 1431.

Strip complete check 1431 determines whether any pixels remain in in-strip memory 1104 that require processing by edge detection unit 1122. In this embodiment, the last pixel processed is at location (SROWS-1, SCOLS-1) because again, this is the last pixel that is centered in a three pixel-by-three pixel window. Thus, in this embodiment, edge detection unit 1122 processes a strip that is (SOWS-2) rows (FIG. 13) wide and (SCOLS-2) columns long which is a RROWS by NCOLS strip with a one pixel border on all sides. If indices (i,j) of the pixel pointer are less than (SROWS-1, SCOLS-1) processing transfers to generate spatial gradient process 1432 and otherwise to initialize pixel pointer process 1440 in switched filter unit 1131.

In generate spatial gradient process 1432, for pixel Qn(i, j), weighted three pixel vertical spatial gradient factor VERSUM(i,j−1) and VERSUM(i,j+1), that are stored in vertical sum memory 1105, are retrieved. Similarly, weighted three pixel horizontal spatial gradient factor HORSUM(i−1,j) and HORSUM(i+1,j), that are stored in horizontal sum memory 1106, are retrieved. In this embodiment, horizontal spatial gradient G1(i,j), corresponding to a vertical edge through pixel Qn(i,j), is defined as:

$$G1(i,j)=VERSUM(i,j-1)-VERSUM(i,j+1)$$

and vertical spatial gradients G2(i,j), corresponding to a horizontal edge through pixel Qn(i,j), is defined as:

$$G2(i,j)=HORSUM(i-1,j)-HORSUM(i+1,j)$$

Thus, generate spatial gradient process 1432 generates the two spatial gradients using the retrieved spatial gradient factor and the above definitions.

Spatial gradients G1 (i,j) and G2 (i,j) are identical to those defined above. However, in this embodiment the two spatial gradients are generated using the stored weighted three pixel spatial gradient factor. The use of the stored vertical and horizontal weighted three pixel spatial gradient factor reduces the number of operations required for generation of the spatial gradients by approximately a factor of two compared to the embodiments described above.

Upon completion of generate spatial gradients process 1432, edge detection unit 1122 transfers processing to generate pixel gradient process 1433. In generate pixel gradient process 1433, pixel gradient A(i,j) is defined as:

$$A(i,j)=(\tfrac{1}{8})*(|G1(i,j)|+|G2(i,j)|).$$

where (⅛) is used for normalization. This definition is identical to that described above. Thus, the same process, as described above, is used to generate pixel gradient A (i,j) in process 1433 and then processing transfers to generate edge threshold process 1434.

In generate edge threshold process 1434, the two distinct thresholds used in the embodiments of the edge detection unit described above are replaced by a single threshold. In this embodiment, an adaptive edge threshold is defined as:

$$THRSH=(t/8)*(VERSUM(i,j)+HORSUM(i,j)$$

where eight is a normalization constant and t is a threshold adjustment factor that is taken as 0.20. This threshold is modified intensity threshold that facilitates using stored weighted vertical spatial gradient factors and weighted horizontal spatial gradient factors to reduce processing performed by the post-processor. Thus, in generate edge threshold process 1434, the appropriate three pixel weighted spatial gradient factors are retrieved from memories 1105 and 1106 and used to generate adaptive edge threshold THRSH, as defined above. If adaptive edge threshold THRSH is less than 80, adaptive edge threshold is set to 80 in this embodiment. A minimum threshold level is used to eliminate spurious edges, which are areas where the luminance contrast is too low for the human eye to perceive an edge. Upon generation of adaptive edge threshold THRSH, processing transfers from generate edge threshold process 1434 to edge identification process 1435.

In edge identification process 1435, pixel gradient A(i,j) is compared with adaptive edge threshold THRSH. If pixel gradient A(i,j) is greater than adaptive edge threshold THRSH, pixel Qn(i,j) in in-strip memory 1104 is identified as an edge pixel and conversely. Upon identification of pixel Qn(i,j), processing transfers to edge pixel check 1436.

Edge pixel check 1436 transfers processing to set edge flag process 1437 if pixel Qn(i,j) was identified as an edge pixel and to set not edge flag process 1439 otherwise. Set edge flag process 1437 sets an edge flag at a location (i,j) in edge-strip memory 1107 to indicate that pixel Qn(i,j) is an edge pixel. Conversely, set not edge flag process 1439 clears an edge flag at location (i,j) in edge-strip memory 1107 to indicate that pixel Qn(i,j) is not an edge pixel. Thus, the location in edge-strip memory 1107 is set to indicate whether pixel Qn(i,j) is an edge pixel. Consequently, when all the pixels have been processed, edge-strip memory 1107 contains an edge map for the pixels in the current strip.

Both set edge flag process 1437 and set not edge flag process 1439 transfer processing to update pixel pointer process 1438. Update pixel pointer process 1438 adjusts indices (i,j) so that indices (i,j) point to the next pixel in raster scan order that is processed by edge detection unit 1122. Update pixel pointer process 1438 transfers to strip complete check 1431.

As explained above, strip complete check 1431 determines whether any pixels remain in in-strip memory 1104 that require processing by edge detection unit 1122. In this embodiment, the last pixel processed is at location (SROWS-1, SCOLS-1) because again, this is the last pixel that is centered in a three pixel-by-three pixel window. When the strip in in-strip memory 1104 has been processed by edge detection unit 1122, an edge map is stored for a RROWS wide and NCOLS column long strip and a one pixel boundary around the strip in edge-strip memory 1107. The edge map, as described above, is a plurality of edge flags where for each pixel, the edge flag is set if the pixel is on an edge and is cleared if the pixel is not on an edge. In this embodiment, filter processor 1130 uses the edge map without further processing.

Specifically, switched filter unit 1131 in filter processor 1130 determines the filtering applied to each pixel by examining the edge map for pixels within a three pixels-by-three pixels window surrounding current pixel Qn(i,j). As explained above, pixel Qn(i,j) is classified as either from an edge, edge boundary, or "shade" (smooth) area. Pixels along edges are left unchanged. Pixels along edge boundaries are directionally filtered with a one-dimensional filter, and shade pixels are low pass filtered with a two-dimensional filter.

Specifically, in initialize pixel pointer process 1440 (FIG. 14E), a pointer to a pixel in in-strip memory 1104 is set to the first pixel processed by switched filter unit 1131. In this embodiment, initialize pixel pointer process 1440 sets indices (i,j) of the pixel pointer to location (2,2) in in-strip memory 1104, since this is the first pixel in the current strip that is not a border pixel. Upon completion of initialize pixel pointer process 1440, processing transfers to strip complete check 1441.

Figure 14G:
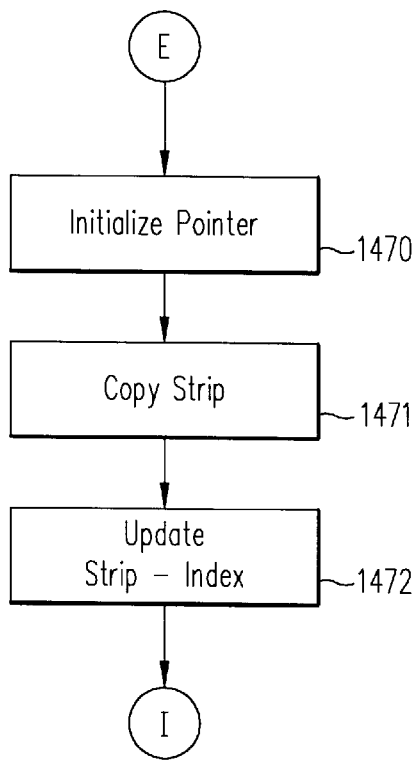
FIG. 14G is a process flow diagram for one embodiment of the operations performed by the quantizer scale adaptive post-processor of this invention upon completion of processing of a strip of data.

Strip complete check 1441 determines whether any pixels remain in in-strip memory 1104 that require processing by switched filter unit 1131. In this embodiment, the last pixel processed is at location (SROWS-2, SCOLS-2) because again, this is the last pixel that is not a border pixel in the strip. Thus, in this embodiment, switched filter unit 1131 processes a strip that is (SOWS-4) rows (FIG. 13) wide and (SCOLS-4) columns long which is a RROWS by NCOLS strip. If indices (i,j) of the pixel pointer are less than (SROWS-2, SCOLS-2) processing transfers from check 1441 to edge pixel check 1442 and otherwise to initialize pixel pointer process 1470 (FIG. 14G).

Edge pixel check 1442 determines whether current pixel Qn(i,j) was identified as an edge pixel by edge detection unit 1122. Specifically, edge pixel check 1442 determines whether the edge flag at location (i,j) in edge-strip memory 1107 is set.

If the edge flag is set, current pixel Qn(i,j) is an edge pixel, and so no filtering is done. Thus, edge pixel check 1442 transfers to output pixel process 1449 (FIG. 14E) which in turn copies current pixel Qn(i,j) from in-strip memory 1104 to output-strip memory 1109. Output pixel process 1449 transfers processing to update pixel pointer process 1463 (FIG. 14F) in quantizer scale adaptation unit 1132.

If the edge flag is not set, current pixel Qn(i,j) is not an edge pixel, and so check 1442 transfers to copy pixel process 1443. Copy pixel process 1443 copies current pixel Qn(i,j) to temporary pixel TEMP_PIXEL and transfers to classify pixel process 1444. In classify pixel process 1444, current pixel Qn(i,j) is processed to determine whether current pixel Qn(i,j) is one of an edge boundary pixel and a shade pixel. As explained more completely below, the edge flag information in edge-strip memory 1107 for a three pixels-by-three pixels window about current pixel Qn(i,j) is used by classify pixel process 1444. After current pixel Qn(i,j) is classified in pixel classification unit 1444, processing transfers to a filter unit 1150 within switched filter unit 1131.

In shade pixel check 1445, if current pixel Qn(i,j) is a shade pixel, processing transfers to two-dimensional filter 1446, and otherwise to edge boundary pixel check 1447. In two-dimensional filter 1446, temporary pixel TEMP_PIXEL is replaced by the output pixel of a two-dimensional filter with current pixel Qn(i,j) as the input pixel, as described more completely below. Two-dimensional filter 1446, upon replacement of temporary pixel TEMP_PIXEL, transfers processing to generate weight process 1460 in quantizer scale adaptation unit 1132.

In edge boundary pixel check 1447, if current pixel Qn(i,j) was classified an edge boundary pixel-by-pixel classification unit 1451, processing transfers to one-dimensional filter 1448, and otherwise to generate weight process 1460 in quantizer scale adaptation unit 1432. In one-dimensional filter 1448, temporary pixel TEMP_PIXEL is replaced by the output pixel of an appropriate one-dimensional filter with current pixel Qn(i,j) as the input pixel, as described more completely below.

In generate weight process 1460 (FIG. 14F), a weight factor A is generated for use in the quantizer scale adaptation filtering. Recall, as described above, a quantizer scale was stored in quantizer scale memory 1108 for each macroblock in the current frame in current frame memory 1103. Thus, generate weight process uses indices (STRIP_START+i, j) to define the macroblock containing current pixel Qn(i,j) and retrieves the quantizer scale of the macroblock. In this embodiment, the quantizer scale is retrieved for each pixel. However, in another embodiment, the quantizer scale could be retrieved only once per macroblock.

After the quantizer scale is retrieved, generate weight process 1460 accesses a weight look-up table stored in a memory of post-processor 1100 to determine weight A. Since the quantizer scale can only take one of a small number of finite values, only a small look-up table is needed Table 2 is one example of a look-up table for use with a H.261 decoder. For a H.261 encoder, the quantizer scale varies from 1 to 31 (quantization step size q equals 2*QS and therefore varies from 2 to 62). Hence, using the look-up table, generate weight process 1160 obtains a weighting factor A for quantizer scale QS for current pixel Qn(i,j). Processing transfers from generate weight process 1460 to retrieve pixel process 1461.

TABLE 2

| Quantizer Scale (OS) | Weighting Factor (A) |
|---|---|
| 1 | 0.00 |
| 2 | 0.10 |
| 3 | 0.20 |
| 4 | 0.40 |
| 5 | 0.50 |
| 6 | 0.80 |
| QS ≧ 7 | 1.00 |

Retrieve pixel process 1461 retrieves current pixel Qn(i,j) from in-strip memory 1104 and transfers processing to generate output pixel process 1462. Generate output pixel process 1462 creates a pixel in output-strip memory 1109 at location (i,j) by forming a weighted combination of post-processed temporary pixel TEMP_PIXEL and current digitally noise reduced pixel Qn(i,j). Specifically, $$\text{Outstrip Pixel}(i, j) = A * TEMP\_PIXEL + (1 - A) * Qn(i, j)$$

Upon generation of outstrip pixel (i,j) process 1462 transfers to update pixel pointer process 1463.

Update pixel pointer process 1463 adjusts indices (i,j) so that indices (i,j) point to the next pixel in raster scan order that is processed by switched filter unit 1131. Update pixel pointer process 1463 transfers to strip complete check 1441.

As explained above, strip complete check 1441 determines whether any pixels remain in in-strip memory 1104 that require processing by switched filter unit 1131. If indices (i,j) of the pixel pointer are less than (SROWS-2, SCOLS-2) processing transfers from check 1441 to edge pixel check 1442 and processes 1442 to 1449 and 1460 to 1463 are performed as required. Thus, each pixel, that is not an edge pixel, is sequentially processed by switched filter unit 1131 and quantizer scale adaptation unit 1132 and the resulting pixel stored in output-strip memory 1109. Edge pixels are stored directly in output-strip memory 1109.

When all the pixel data in in-strip memory 1104 is processed, output-strip memory 1109 contains edge pixels, that have not been filtered; and edge boundary pixels and shade pixels, that have been filtered by both switched filter unit 1131 and quantizer scale adaptation unit 1132. Thus, post-processing of the data in in-strip memory 1104 is complete and so strip complete check 1441 transfers to initialize pixel pointer process 1470.

In initialize pixel pointer process 1470 (FIG. 14G), a pointer to a pixel in output-strip memory 1109 is set to location (2,2), since this is the first pixel in the current strip that is not a border pixel. Upon completion of initialize pixel pointer process 1470, processing transfers to copy strip process 1471.

Copy strip process 1471 copies the rectangular strip of pixels defined by (2,2) <= (i,j) < (SROWS-2, SCOLS-2) to output frame memory 1140. Specifically, out-strip pixel (i,j) is copied to location (STRIP_START+i-2, j-2) in output frame memory 1140. When the copy process is complete, processing transfers to update strip index process 1472.

Update strip index process 1472 updates the value of initial row strip pointer STRIP_START so that the pointer points to the first row in the next strip to be processed. In this embodiment, update strip index process 1472 redefines initial row strip pointer STRIP_START as:

STRIP_START=STRIP_START+(SROWS-4).

Update strip index process 1472 (FIG. 14G) transfers processing to frame complete check 1407 (FIG. 14A). Recall that in frame complete check 1407, post-processor 1100 compares initial row strip pointer STRIP_START with number of rows NROWS in the frame. If initial row strip pointer STRIP_START is greater than or equal to number of rows NROWS, the post-processing of the frame is complete and so processing transfers to copy frame process 1473. Copy frame process 1473 copies the frame of post-processed pixel data from output frame memory 1140 to reference frame memory 1101 and transfers processing to update temporal index process 1402.

If all the frames in the sequence have been post-processed, sequence complete check 1403 transfers to done process 1404 and post-processing is complete. Conversely, each frame is the sequence is processed as described above with respect to FIGS. 14A to 14G.

Quantizer scale adaptive post-processor 1100 with quantizer scale adaptation was tested on a variety of test sequences. The test sequences included CIF as well as SIF sequences coded using a H.261 coder at rates ranging from low (96 kbps) to fairly high (384 kbps). In all cases, post-processor 1100 resulted in a significant improvement in the perceptual quality of the coded sequences while preserving detail in areas coded with low quantizer scales. In particular the quantizer scale adaptation ensured that there was no undesirable softening in finely quantized areas.

FIG. 16 is one embodiment of a more detailed process diagram for filter unit 1150. As explained above, each pixel in the current strip is individually processed in switched filter unit 1131.

As explained above, classify pixel process 1444 analyzes the edge map for a three pixels-by-three pixels window about the current pixel in edge-strip memory 1107. A filter control flag is set equal to the number of pixels in the three pixels-by-three pixels window including the current pixel that do not have the edge flag set. In this embodiment, the filter control flag ranges from one to nine. Upon completion of classify pixel process 1444, processing in switched filter unit 1131 transfers to shade pixel check 1445.

Shade pixel check 1445 transfers processing to two-dimensional filter process 1446 if the filter control flag is nine, i.e., if none of the pixels in the three-by-three window have the edge flag set so that the current pixel is a shade pixel. Ensuring that all pixels in the three pixels-by-three pixels window are not edge pixels implies that all pixels processed by two-dimensional filter process 1446 are on the same side of an edge and do not span an edge. Therefore, edges are not smeared by two-dimensional filter process 1446. If the filter control flag is less than nine, shade pixel check 1446 transfers processing to horizontal edge check 1602, that is described more completely below.

In this embodiment, two-dimensional filter process 1446 utilizes a two-dimensional low pass filter. As explained above, two-dimensional filter process 1446 removes the mosquito noise and the blocking artifacts in image areas at a distance greater than or equal to one pixel horizontally and vertically from edge pixels. The two-dimensional low pass filter is a separable three-tap low pass filter (LPF) in each direction with a mask of the form:

$$\begin{bmatrix} \frac{1}{16} & \frac{1}{8} & \frac{1}{16} \\ \frac{1}{8} & \frac{1}{4} & \frac{1}{8} \\ \frac{1}{16} & \frac{1}{8} & \frac{1}{16} \end{bmatrix}$$

In post-processor 1100, the two dimensional low pass filter is defined as:

$$TEMP\_PIXEL = \frac{VERSUM(i, j-1) + 2VERSUM(i, j) + VERSUM(i, j+1)}{16}$$

Thus, for current pixel Qn(i,j), the three weighted three pixel vertical gradient factors defined above, are retrieved from vertical sum memory 1105 and used to generate the filter output signal from the two-dimensional filter. The use of the stored information to implement the filter reduces the complexity of filtering. The filter output signal replaces the value of temporary pixel TEMP_PIXEL and processing transfers to generate weight process 1460.

Recall that if the filter control flag is less than nine, shade pixel check 543 transfers processing to horizontal line of non-edge pixels check 1601. Horizontal line of non-edge pixels check 1601 determines whether the current window includes a horizontal line of non-edge pixels through the current pixel. Specifically, FIG. 10B illustrates the current window configuration in the edge pixel map that is detected by horizontal line of non-edge pixels check 1601. If the pixel immediately to the left of current pixel 1001, the pixel immediately to the right of current pixel 1001 are non-edge pixels, horizontal line of non-edge pixels check is true and otherwise false. If horizontal line of non-edge pixels check 1601 is true, processing transfers to one-dimensional horizontal filter process 1602 and otherwise to vertical line of non-edge pixels check 1603.

In one-dimensional horizontal filter process 1602, the horizontal line of non-edge pixels in the current window are filtered by a three-tap filter. In this embodiment, the three pixels are processed by a filter of the form [¼,½,¼] and the filter output signal replaces temporary pixel TEMP_PIXEL.

In this embodiment, for current pixel Qn(i,j), one-dimensional filter process 1602 retrieves the stored spatial gradient factor in horizontal sum memory 1106 at location (i,j) and then defines temporary pixel TEMP_PIXEL as:

TEMP_PIXEL=HORSUM(i,j)/4.

Upon completion of the filtering process, one-dimensional horizontal filter process 1602 transfers to generate weight process 1460.

Vertical line of non-edge pixels check 1603 determines whether the current window includes a vertical line of non-edge pixels through the current pixel. Specifically, FIG. 10A illustrates the current window configuration in the edge pixel map that is detected by vertical line of non-edge pixels check 1603. If the pixel immediately above current pixel 1001 and the pixel immediately below current pixel 1001 are non-edge pixels, vertical line of non-edge pixels check 1603 is true and otherwise false.

In FIGS. 10A to 10D, a non-edge pixel is represented by a zero to indicate that the edge flag is not set for that pixel. Pixels that are not on the vertical axis through the current pixel are represented by an "x", because the state of the edge flag for these pixels is a don't care state. If vertical line of non-edge pixels check 1603 is true, processing transfers to one-dimensional vertical filter process 1604 and otherwise to forty-five degree line of non-edge pixels check 1605.

In one-dimensional vertical filter process 1604, the vertical line of non-edge pixels in the current window is filtered by a three-tap filter. In this embodiment, the three pixels are processed by a filter of the form [¼,½,¼] and the filter output signal replaces temporary pixel TEMP_PIXEL.

In this embodiment, for current pixel Qn(i,j), one-dimensional filter process 1604 retrieves the stored vertical spatial gradient factor in vertical sum memory 1105 at location (i,j) and then defines temporary pixel TEMP_PIXEL as:

TEMP_PIXEL=VERSUM(i,j)/4.

Upon completion of the filtering process, one-dimensional vertical filter process transfers 1604 to generate weight process 1640.

Forty-five degree line of non-edge pixels check 1605 determines whether the current three pixels-by-three pixels window includes a forty-five degree line of non-edge pixels through current pixel 1001. Specifically, FIG. 10C illustrates the current window configuration in the edge pixel map that is detected by forty-five degree line of non-edge pixels check 1605. If the pixel diagonally above and to the left of current pixel 1001 and pixel diagonally below and to the right of current pixel 1001 are non-edge pixels, forty-five degree line of non-edge pixels check 1605 is true and otherwise false. If forty-five degree line of non-edge pixels check 1605 is true, processing transfers to one-dimensional forty-five degree filter process 1606 and otherwise to one hundred thirty-five degree line of non-edge pixels check 1607.

In one-dimensional forty-five degree filter process 1606, the forty-five degree line of non-edge pixels in the current window are filtered by a three-tap filter. In this embodiment, the three pixels are processed by a filter of the form [¼,½,¼] and the filter output signal replaces temporary pixel TEMP_PIXEL. Upon completion of the filtering process, one-dimensional forty-five degree filter 1606 process transfers to generate weight process 1460.

One hundred thirty-five degree line of non-edge pixels check 1607 determines whether the current three pixels-by-three pixels window includes a one hundred thirty-five degree line of non-edge pixels through current pixel 1001. Specifically, FIG. 10D illustrates the current window configuration in the edge pixel map that is detected by one hundred thirty-five degree line of non-edge pixels check 1607. If the pixel diagonally below and to the left of current pixel 1001 and the pixel diagonally above and to the right of current pixel 1001 are non-edge pixels, one hundred thirty-five degree line of non-edge pixels check 1607 is true and otherwise false. If one hundred thirty-five degree line of non-edge pixels check 1607 is true, processing transfers to one-dimensional one hundred thirty-five degree filter 1608 process and otherwise to generate weight process 1640.

In one-dimensional one hundred thirty-five degree filter process 1608, the one hundred thirty-five degree line of non-edge pixels in the current window are filtered by a three-tap filter. In this embodiment, the three pixels are processed by a filter of the form [¼,½,¼] and the filter output signal replaces temporary pixel TEMP_PIXEL.

Thus, in this embodiment of switched filter unit 1131, pixels directly adjacent to edges are not processed with the two-dimensional filter because such a filter would include pixels from either sides of an edge. However, it is desirable to clean up the area next to edges (edge border areas) to the maximum extent possible without smearing the edges since this results in clean sharp edges which are critical to the perceived quality of an image. Thus, the window is examined to see if all the pixels lying along one of the four possible axes through the window are not edge pixels. If an axis is made-up of non-edge pixels, the pixels on that axis are processed with a one-dimensional filter.

Notice that the four possible axes are checked sequentially and the directional filtering is performed along the first axis along which all the pixels are not-edge pixels.

Axis examination is stopped after the first axis along which filtering is allowed is found. Although adjacent pixels are not examined for continuity of direction, axis examination always proceeds in the order shown above. This ensures that adjacent pixels are classified similarly if ambiguity in classification exists.

This process of axis selection and resultant one-dimensional directional filtering is equivalent to finding pixels adjacent to the edges, i.e., finding edge border areas, and filtering pixels in the edge border areas along a direction parallel to the edges. This technique also provides edge enhancement.

Edge pixels and pixels directly adjacent to the edge pixels that are not selected for one-dimensional directional filtering are not post-processed. Leaving these pixels unchanged ensures that sharpness of edges in the decoded image is not degraded by post-processing. This implies that the pixels adjacent to edges which do not qualify for one-dimensional directional filtering are also treated like edges. This is equivalent to coalescing edge segments with a small discontinuity (1 to 2 pixels) into continuous contours. Therefore, the pixel classification process in switched filter unit 1131 compensates for the lack of edge linking and tracing and allows post-processor 1100 to effectively use an edge map equivalent to those generated by more complex edge detectors.

While use of quantizer scale adaptive post-processor 1100 utilizes quantizer scales, there is no issue with obtaining the necessary quantizer scales when the decoded image and the display image have the same format. However, in some situations, the decoded image is converted to a different format for display. For example, a CIF image (288 pixels by 352 pixels) may be converted to a CCIR-601 image (480 pixels by 704 pixels). Experiments have shown that post-processor 1100 enhances the image quality if post-processor 1100 is utilized directly on the CIF image, or alternatively, is utilized between the vertical interpolation and the horizontal interpolation from the CIF image to the CCIR-601 image.

FIG. 17A illustrates a first embodiment for translating a CIF image to a CCIR-601 image including quantizer scale adaptive post-processor 1100. CIF image 1701A from the decoder is 288 pixels by 352 pixels. In this embodiment, current frame memory 1103 and reference frame memory 1101 have 292 pixel by 356 pixel storage locations, while input frame memory and output frame memory are 288 pixels by 352 pixels.

Post-processor 1100 processes CIF image 1701A, as described above, and provides frame by frame, a 288 pixel by 352 pixel frame to vertical interpolation unit 1702A. The quantizer scales provided by the decoder are used directly by post-processor 1100 because the quantizer scales and the image being processed are in the same format.

Using techniques known to those skilled in the art, vertical interpolation unit 1702A converts the 288 pixel by 352 pixel frame to a 480 pixel by 352 pixel frame that is provided to horizontal interpolation unit 1703A. Again, using techniques known to those skilled in the art, horizontal interpolation unit 1703A converts the 480 pixel by 352 pixel frame to a 480 pixel by 704 pixel frame that is provided to display unit 1704A.

FIG. 17B illustrates another embodiment for translating a CIF image to a CCIR-601 image including quantizer scale adaptive post-processor 1100. In this embodiment, the frames in the CIF image are not directly available from the decoder. Rather, CIF image 1701B is first vertically interpolated by vertical interpolation unit 1702B. The available output signals from vertical interpolation unit are a 240 pixel-by-352 pixel field zero and a 240 pixel-by-352 pixel field one.

Hence, in this embodiment, a first quantizer scale adaptive post-processor 1100A receives field zero as an input frame and a second quantizer scale adaptive post-processor 1100B receives field one as an input frame. In this embodiment, vertical interpolation unit 1702B re-samples input CIF image 1701A. The positioning of the pixels in CIF image 1701B and CCIR image 1704B is illustrated in FIG. 18A, 18B and 18C. FIG. 18A illustrates the vertical position of seven pixels in CIF image 1701B. FIG. 18B illustrates CIF image pixels with reference numeral i on the left hand side and CCIR image pixels in field zero on the right hand side with reference number i1. FIG. 18C illustrates CIF image pixels with reference numeral i on the left hand side and CCIR image pixels in field one on the right hand side with reference number i2. Here, reference numerals i, i1, and i2 indicate a scale unit.

Successive pixels in the CIF image (FIG. 18A) are a unit distance apart using scale i. On the same scale, successive pixels in each of the CCIR fields (FIGS. 18B and 18C) are (6/5)*i units apart with field one (FIG. 18C) offset from field zero by a distance of (3/5)*i. A CCIR frame 1704B includes both field zero and field one and thus contains pixels obtained by vertically re-sampling CIF image 1701A every (3/5)*i units.

In vertical interpolation unit 1702B, a CCIR pixel located at a non-integer multiple of i is obtained by combining the two CIF pixels nearest the location of the CCIF pixel. The relative weights given to the two CIF pixels to generate the corresponding CCIR pixel by vertical interpolation unit 1702B are inversely proportional to their distance from the CCIR pixel. CCIR pixels at integer locations are obtained by copying the CIF pixel at that location in vertical interpolation unit 1703B.

As explained above, post-processors 1100A and 1100B use the macroblock quantizer scales for varying the extent of postprocessing. The post-processed pixel is a weighted sum of the filtered pixel and digitally noise reduced pixel. The weight given to the filtered pixel increases with an increase in the quantizer scale (quantizer step-size) for the macroblock to which the pixel belongs.

In this embodiment, the quantizer scale used to obtain the weighting factor in generate weight process 1460 (FIG. 14F) for a pixel was the quantizer scale for the pixel in CIF image 1701B closest to that pixel. FIG. 18B illustrates the location of the i1 th pixel in field zero on scale i. As shown in FIG. 18B:

$$i = (6/5) \times i1$$

where i is the vertical position of the pixel in the CIF frame; and i1 is the vertical position of the corresponding pixel in vertically interpolated frame zero.

Therefore, the vertical location of the closest CIF pixel to the i1 th pixel being processed by post-processor 1100A is:

$$\text{Round } ((6/5) \times i1)$$

which can be rewritten as:

$$i = (12 \times i1 + 5)/10$$

Thus, weight process 1460 in post-processor 1100A uses the above expression to convert the vertical position of the current pixel to a vertical position in the CIF image so that the appropriate quantizer scale is retrieved.

Similarly, in generate weight process 1460 in post-processor 1000B for field one, vertical position i of the CIF pixel corresponding to the pixel being processed is:

$$i = 3/5 + (6/5) \times i2$$

where i is the vertical position of the pixel in the CIF frame; and i2 is the vertical position of the corresponding pixel in vertically interpolated frame one.

Therefore, the vertical location of the closest CIF pixel to the i2 th pixel being processed by post-processor 1100B is:

$$\text{Round } (3/5 + (6/5) \times i2)$$

which can be rewritten as:

$$i = (12 \times i2 + 11)/10$$

Thus, weight process 1460 in post-processor 1100B uses the above expression to convert the vertical position of the current pixel to a vertical position in the CIF image so that the appropriate quantizer scale is retrieved. In the above expressions, the operator "/" stands for integer division which truncates any fractional parts.

As an example of the operations performed by generate weight process 1460 in post-processor 1100B, assume that process 1460 must determine the closet pixel to the fourth pixel in field one, i.e., i2 equals four. The closest CIF pixel is:

$$i = (12 * 4 + 11)/10 = 59/10 = 5\text{th pixel}.$$

Note that since the location of this pixel in i units is 27/5, the correct CIF pixel is identified and the correct quantizer scale is retrieved by this process.

Thus, in this embodiment, quantizer scale adaptation unit 1131 includes an extra process within generate weight process 1460 that translates the interpolated location of the current pixel to the location of the closest pixel in the original frame and retrieves the quantizer scale for the closest pixel in the original frame in determining the weight factor.

To test the two embodiments illustrated in FIGS. 17A and 17B, 147 frames of a video-conferencing CIF sequence were used. The CIF sequence was coded at a variety of bit rates and frame rates using a H.261 encoder. A side-by side comparison of the resultant CCIR images was generated and played back in real-time on an Abekas image sequencer. Also, the edge maps from the two methods were generated and displayed on Sun workstations for each frame. The video conferencing sequence was coded at 192 kbps at 15 frames per second, and at 128 kbps at 15 frames per second. The edge-maps as well as the final CCIR sequences were indistinguishable from each other for the two methods demonstrated in FIGS. 17A and 17B. Therefore, post-processor 1100 of this invention can be applied to individual fields after vertical interpolation without compromising performance.

Figure 19:
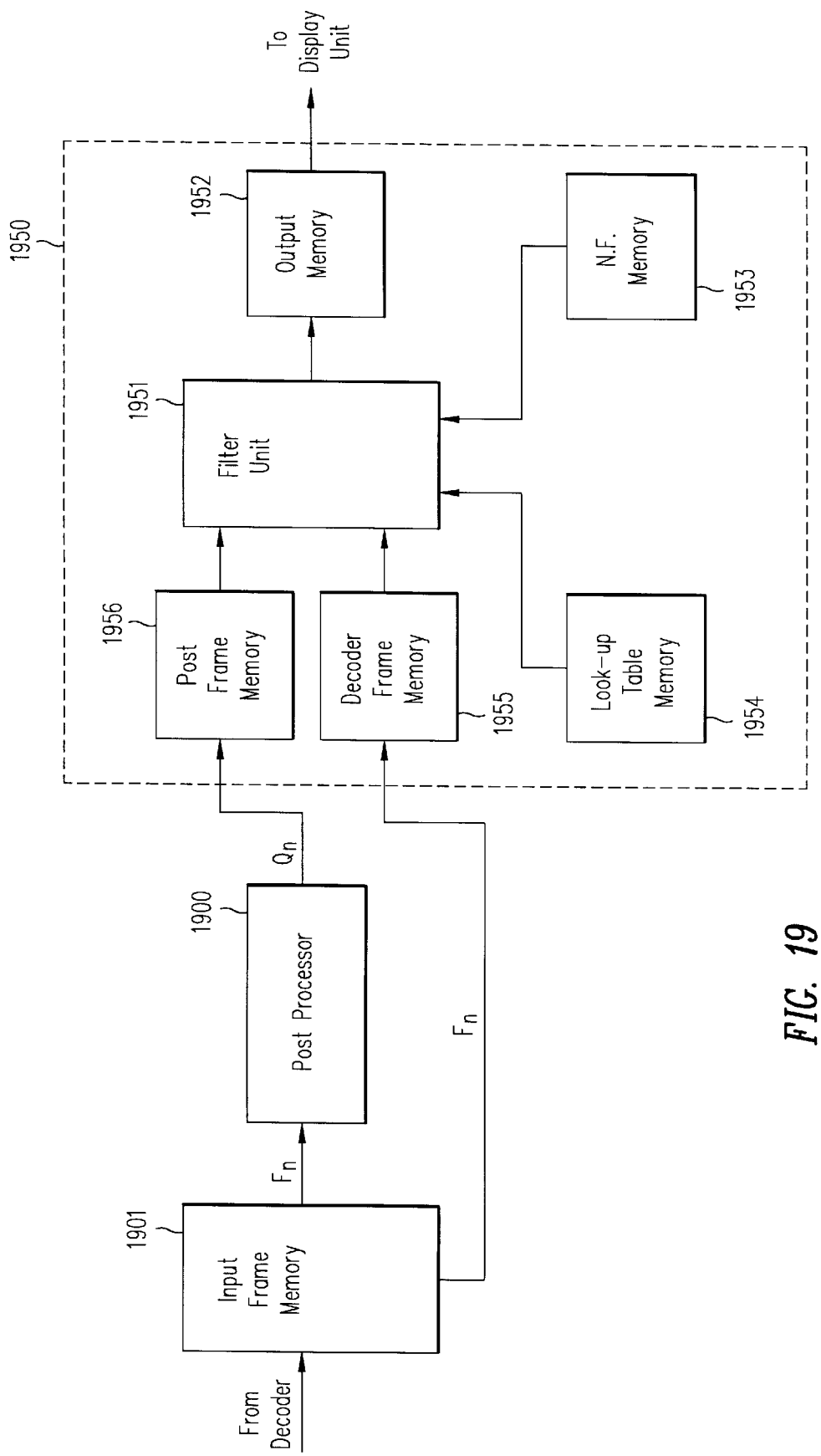
FIG. 19 is a block diagram of another embodiment of the quantizer scale adaptive post-processor of this invention.

In the above embodiment of quantizer scale adaptive post-processor 1100, a particular combination of digital noise reduction and artifact reduction was used. However, the principles of this invention are applicable to any post-processor. For example, as illustrated in FIG. 19, input frame Fn from the decoder is stored in an input frame memory 1901.

Post-processor 1900 generates a post-processed frame Qn. The particular operations in post-processor 1900 are not of particular importance. Post-processor 1900 could perform digital noise reduction only, artifact reduction only, a combination of digital noise reduction and artifact reduction, or any other type of post-processing of interest to the user. For example, post-processor 1900 could be post-processor 300, as described above.

Post-processed frame Qn is stored in a post-processed frame memory 1956 in quantizer scale adaptation unit 1950. Decoded frame Fn is stored in a decoded frame memory 1955. The macroblock quantizer scales for decoded frame Fn are stored in quantizer scale memory 1953, as described above. A look up table for converting quantizer scales to weight factors is stored in look-up table memory 1954.

Filter unit 1951 in quantizer scale adaptation unit 1950, retrieves a decoded pixel Fn(i,j) from memory 1956, and a post-processed pixel (i,j) from memory 1956. Filter unit 1951 generates a weight factor A used in the quantizer scale adaptation filtering.

Filter unit 1951 uses indices (i,j) to define the macroblock containing current pixel Qn(i,j) and retrieves the quantizer scale of the macroblock.

After the quantizer scale is retrieved, filter unit 1951 uses the weight look-up table stored in memory 1954 to determine weight A. The look-up table is the same as that described above. Filter unit 1951 generates a weighted combination of post-processed pixel Qn(i,j) and decoded pixel Fn(i,j). Specifically, $$\text{Output Pixel}(i, j) = A * Qn(i, j) + (1 - A) * Fn(i, j)$$

In this embodiment output pixel(i,j) is stored in output memory 1952. Thus, quantizer scale adaptation unit 1950 filters each pixel based upon the pixels quantization. Specifically, this embodiment of a quantizer scale adaptive post-processor adapts to the coding parameters available at the decoder, e.g., a quantizer scale is used. Since the quantizer scale is indicative of the degree of quantization, the quantizer scale also is indicative of the amount of post-processing that is needed and the quantizer scale post-processing is independent of the particular type of post-processing used in post-processor 1900. Alternatively, as shown above, quantizer scale adaptation unit 1950 can be incorporated into post-processor 1900 to reduce memory requirements and to enhance the overall performance of the post-processing.

In view of this disclosure the various units described herein can be implemented in either software or hardware or a combination of the two to achieve a desired performance level. Therefore, the embodiments described herein are illustrative of the principles of this invention and are not intended to limit the invention to the specific embodiments described. In view of this disclosure, those skilled in the art can implement the combination of a digital noise reduction unit and an artifact reduction unit in a wide variety of ways. Further, the artifact reduction unit can be used independent of digital noise reduction, and both can be used independently or in conjunction with quantizer scale adaptive filtering.

We claim:

1. A transform artifact reduction method for decoded video pixel data, said method comprising:
    filtering selected pixels in a block of pixels in said decoded video pixel data using a spatially-variant filter;
    filtering said selected pixels from said spatially-variant filter using a coding parameter adaptive filter,
    wherein said characteristic of said macroblock is whether said macroblock is a replenished macroblock.

2. A transform artifact reduction method for decoded video pixel data as in claim 1 wherein said coding parameter adaptive filter processes a macroblock of said decoded video pixel data using a coding parameter for said macroblock.

3. A transform artifact reduction method for decoded video pixel data, said method comprising:
    filtering selected pixels in a block of pixels in said decoded video pixel data using a spatially-variant filter:
    filtering said selected pixels from said spatially-variant filter using a coding parameter adaptive filter, the filtering said selected pixels from said spatially-variant filter using a coding parameter adaptive filter including filtering said selected pixels from said spatially-variant filter using a quantizer scale adaptive filter
    adapting said quantizer scale adaptive filter for a macroblock using a characteristic of said macroblock, said characteristic of said macroblock is whether said macroblock is a replenished macroblock.

4. A transform artifact reduction method for decoded video pixel data as in claim 3 wherein said quantizer scale adaptive filter processes a macroblock of said decoded video pixel data using a quantizer scale for said macroblock.

5. A transform artifact reduction method for decoded video pixel data, said method comprising:
    filtering selected pixels in a block of pixels in said decoded video pixel data using a spatially-variant filter; and
    filtering said selected pixels from said spatially-variant filter using a coding parameter adaptive filter;
    wherein filtering selected pixels in a block of pixels in said decoded video pixel data using a spatially-variant filter further comprises:
        generating an edge map for said block of pixels wherein in said edge map, an edge flag for each pixel in said block is configured to identify each pixel as one of an edge pixel and a non-edge pixel; and
        assigning a pixel in said block of pixels one classification in a plurality of edge classifications using edge flags in said edge map for pixels in a window about said pixel.

6. A transform artifact reduction method for decoded video pixel data as in claim 5 wherein said generating an edge map further comprises:
    comparing a pixel gradient for a pixel with a threshold; and
    setting said edge flag for said pixel in said edge map upon said pixel gradient being greater than said threshold.

7. A transform artifact reduction method for decoded video pixel data as in claim 6 wherein said comparing a pixel gradient for a pixel further comprises:
    comparing said pixel gradient with an adaptive edge threshold.

8. A transform artifact reduction method for decoded video pixel data as in claim 7 wherein said setting said edge flag for said pixel in said edge map upon said pixel gradient being greater than said threshold further comprises:
    setting said edge flag only upon said pixel gradient being greater than said adaptive edge threshold.

9. A transform artifact reduction method for decoded video pixel data as in claim 7 further comprising prior to said comparing a pixel gradient with an adaptive edge threshold:
    generating said pixel gradient for said pixel.

10. A transform artifact reduction method for decoded video pixel data as in claim 9 wherein generating said pixel gradient further comprises:
    generating a plurality of spatial gradients for said pixel using pixels in a window about said pixel.

11. A transform artifact reduction method for decoded video pixel data as in claim 10 wherein said window is a three pixels-by-three pixels window with said pixel centered in said three pixels-by-three pixels window.

12. A transform artifact reduction method for decoded video pixel data as in claim 10 wherein said plurality of spatial gradients comprises two spatial gradients.

13. A transform artifact reduction method for decoded video pixel data as in claim 10 wherein generating said pixel gradient further comprises:
    combining said plurality of spatial gradients to obtain said pixel gradient.

14. A transform artifact reduction method for decoded video pixel data as in claim 7 further comprising prior to said comparing a pixel gradient with an adaptive edge threshold:
    generating said adaptive edge threshold.

15. A transform artifact reduction method for decoded video pixel data as in claim 5 wherein said plurality of edge classifications includes an edge classification, and said pixel is assigned the edge classification if said edge flag for said pixel in said edge map indicates that said pixel is an edge pixel.

16. A transform artifact reduction method for decoded video pixel data as in claim 5 wherein said plurality of edge classifications includes an edge border classification.

17. A transform artifact reduction method for decoded video pixel data as in claim 16 wherein said pixel is assigned said edge border classification if (i) the edge flag for at least one pixel in a window of pixels about the pixel is not set; (ii) the edge flag for at least three pixels in a window of pixels about the pixel are not set; and (iii) the pixel is in a line of pixels in the window and the edge flag for each pixel in the line is not set.

18. A transform artifact reduction method for decoded video pixel data as in claim 17 wherein said window is a three pixels-by-three pixels window with said pixel centered in said three pixels-by-three pixels window.

19. A transform artifact reduction method for decoded video pixel data as in claim 17 wherein a pixel assigned said edge border classification is filtered in a one-dimensional filter that processes said line of pixels.

20. A transform artifact reduction method for decoded video pixel data as in claim 19 where said one-dimensional filter is a low pass filter.

21. A transform artifact reduction method for decoded video pixel data as in claim 5 wherein said plurality of edge classifications includes a shade classification.

22. A transform artifact reduction method for decoded video pixel data as in claim 21 wherein said pixel is assigned said shade classification if the edge flag for said pixel and each pixel in a window of pixels about said pixel is not set.

23. A transform artifact reduction method for decoded video pixel data as in claim 22 wherein said window is a three pixels-by-three pixels window with said pixel centered in said three pixels-by-three pixels window.

24. A transform artifact reduction method for decoded video pixel data as in claim 22 wherein a pixel assigned said shade classification is filtered in a two-dimensional filter that processes said window of pixels.

25. A transform artifact reduction method for decoded video pixel data as in claim 24 where said two-dimensional filter is a low pass filter.

26. A transform artifact reduction method for decoded video pixel data, said method comprising:

digitally noise reducing a block of pixels to obtain a digitally noise reduced block of pixels;

filtering selected pixels in said digitally noise reduced block of pixels using a spatially-variant filter; and filtering said selected pixels from said spatially-variant filter using a coding parameter adaptive filter.

27. A transform artifact reduction method for decoded video pixel data as in claim 26 wherein said coding parameter adaptive filter processes a macroblock of said decoded video pixel data using a coding parameter for said macroblock.

28. A transform artifact reduction method for decoded video pixel data as in claim 26 further comprising:

adapting said coding parameter adaptive filter for a macroblock using a characteristic of said macroblock.

29. A transform artifact reduction method for decoded video pixel data as in claim 28 wherein said characteristic of said macroblock is whether said macroblock is a replenished macroblock.

30. A transform artifact reduction method for decoded video pixel data as in claim 26 wherein filtering said selected pixels from said spatially-variant filter using a coding parameter adaptive filter comprises:

filtering said selected pixels from said spatially-variant filter using a quantizer scale adaptive filter.

31. A transform artifact reducdeco method for decoded video pixel data as in claim 30 wherein said quantizer scale adaptive filter processes a macroblock of said decoded video pixel data using a quantizer scale for said macroblock.

32. A transform artifact reduction method for decoded video pixel data as in claim 30 further comprising:

adapting said quantizer scale adaptive filter for a macroblock using a characteristic of said macroblock.

33. A transform artifact reduction method for decoded video pixel data as in claim 32 wherein said characteristic of said macroblock is whether said macroblock is a replenished macroblock.

34. A transform artifact reduction method for decoded video pixel data, said method comprising:

digitally noise reducing a block of pixels in said decoded video pixel data to obtain a digitally noise reduced block of pixels; and filtering selected pixels in said digitally noise reduced block of pixels using a coding parameter adaptive filter, said filtering said selected pixels in said digitally noise reduced block of pixels using a quantizer scale adaptive filter.

35. A transform artifact reduction method for decoded video pixel data as in claim 34 wherein said coding parameter adaptive filter processes a macroblock of said decoded video pixel data using a coding parameter for said macroblock.

36. A transform artifact reduction method for decoded video pixel data as in claim 34 further comprising:

adapting said coding parameter adaptive filter for a macroblock using a characteristic of said macroblock.

37. A transform artifact reduction method for decoded video pixel data as in claim 36 wherein said characteristic of said macroblock is whether said macroblock is a replenished macroblock.

38. A transform artifact reduction method for decoded video pixel data as in claim 34 wherein said quantizer scale adaptive filter processes a macroblock of said decoded video pixel data using a quantizer scale for said macroblock.

39. A transform artifact reduction method for decoded video pixel data as in claim 34 further comprising:

adapting said quantizer scale adaptive filter for a macroblock using a characteristic of said macroblock.

40. A transform artifact reduction method for decoded video pixel data as in claim 39 wherein said characteristic of said macroblock is whether said macroblock is a replenished macroblock.

\* \* \* \* \*